United States Patent
Tokuchi

(10) Patent No.: US 10,853,011 B2
(45) Date of Patent: Dec. 1, 2020

(54) INFORMATION PROCESSING DEVICE, INFORMATION PROCESSING METHOD, AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/009,216

(22) Filed: Jun. 15, 2018

(65) Prior Publication Data
US 2019/0087139 A1 Mar. 21, 2019

(30) Foreign Application Priority Data
Sep. 15, 2017 (JP) ................. 2017-177496

(51) Int. Cl.
*G06F 3/12* (2006.01)

(52) U.S. Cl.
CPC .......... *G06F 3/1263* (2013.01); *G06F 3/1204* (2013.01); *G06F 3/126* (2013.01); *G06F 3/1207* (2013.01); *G06F 3/1226* (2013.01); *G06F 3/1292* (2013.01)

(58) Field of Classification Search
CPC .... G06F 3/1263; G06F 3/1207; G06F 3/1292; G06F 3/126; G06F 3/1226; G06F 3/1204; G06F 3/1268
See application file for complete search history.

(56) References Cited

U.S. PATENT DOCUMENTS

| | | | | |
|---|---|---|---|---|
| 6,278,525 B1* | 8/2001 | Watanabe | ................ | B41J 11/70 358/1.13 |
| 2010/0162106 A1* | 6/2010 | Ikazaki | ................ | H04N 1/0044 715/274 |
| 2013/0097483 A1* | 4/2013 | Aoki | ................ | G06F 40/14 715/234 |
| 2014/0293325 A1* | 10/2014 | Haapanen | ............ | G06F 3/1203 358/1.15 |
| 2015/0070725 A1* | 3/2015 | Monden | ................ | G06F 3/1232 358/1.15 |
| 2016/0162227 A1* | 6/2016 | Kato | ................ | G06F 3/1227 358/1.13 |
| 2017/0310845 A1 | 10/2017 | Miura | | |
| 2017/0322752 A1 | 11/2017 | Miura | | |

FOREIGN PATENT DOCUMENTS

| | | |
|---|---|---|
| JP | 2008089657 | 4/2008 |
| JP | 2016018285 | 2/2016 |
| JP | 2017010089 | 1/2017 |
| JP | 2017021615 | 1/2017 |
| JP | 2017027182 | 2/2017 |

* cited by examiner

*Primary Examiner* — Iriana Cruz
(74) *Attorney, Agent, or Firm* — JCIPRNET

(57) ABSTRACT

An information processing device includes a display that displays an image, a determination unit that determines an area which is a print target from the image displayed by the display, and a transmitter that transmits a print instruction to a printable printing device when a print instruction operation targeting the area is performed.

11 Claims, 42 Drawing Sheets

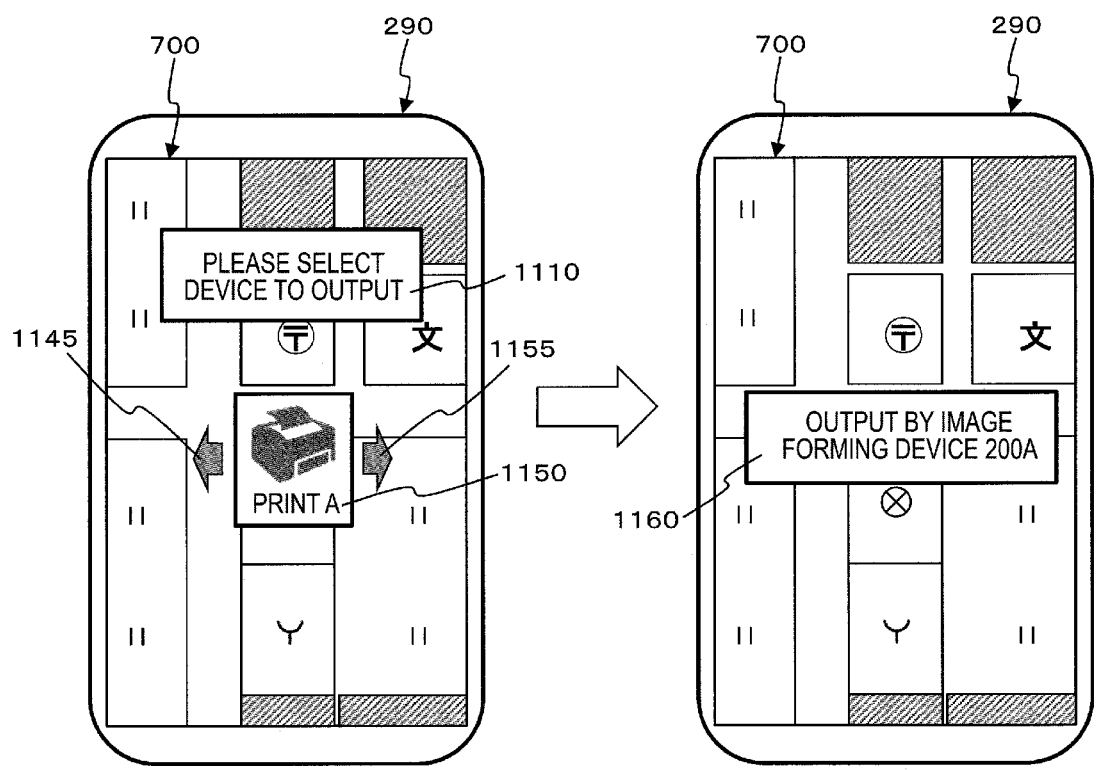

FIG. 26

| 2610 | 2620 | 2630 | 2640 | 2650 | 2660 | | | | 2600 |
|---|---|---|---|---|---|---|---|---|---|
| PRINT INSTRUCTION | PRINT DATA | PAPER SIZE | PRINT ORIENTATION | NUMBER OF COPIES | BORDERLESS PRINTING | | | | ... |
| | | | | | 2662 UPPER SIDE | 2664 RIGHT SIDE | 2666 LOWER SIDE | 2668 LEFT SIDE | |

FIG. 39

| DATE/TIME | NUMBER OF BORDERLESS PRINTING | | | | PAPER SIZE | MONOCHROME/ COLOR | USER |
|---|---|---|---|---|---|---|---|
| | UPPER SIDE | RIGHT SIDE | LOWER SIDE | LEFT SIDE | | | |
| | | | | | | | |

3910 DATE/TIME
3920 NUMBER OF BORDERLESS PRINTING
3922 UPPER SIDE
3924 RIGHT SIDE
3926 LOWER SIDE
3928 LEFT SIDE
3930 PAPER SIZE
3940 MONOCHROME/COLOR
3950 USER
3900

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-177496 filed Sep. 15, 2017.

BACKGROUND

Technical Field

The present invention relates to an information processing device, an information processing method, and a non-transitory computer readable medium.

SUMMARY

According to an aspect of the invention, an information processing device includes a display that displays an image, a determination unit that determines an area which is a print target from the image displayed by the display, and a transmitter that transmits a print instruction to a printable printing device when a print instruction operation targeting the area is performed.

BRIEF DESCRIPTION OF THE DRAWINGS

Exemplary embodiments of the present invention will be described in detail based on the following figures, wherein:

FIGS. 11A and 11B are explanatory views illustrating a process example according to the first exemplary embodiment;

FIG. 26 is an explanatory view illustrating an example of a data structure of a print instruction table;

FIG. 39 is an explanatory view illustrating an example of a data structure of a borderless printing log table;

DETAILED DESCRIPTION

Hereinafter, various exemplary embodiments suitable for implementing the present invention will be described with reference to the accompanying drawings.

First Exemplary Embodiment

Figure 1:
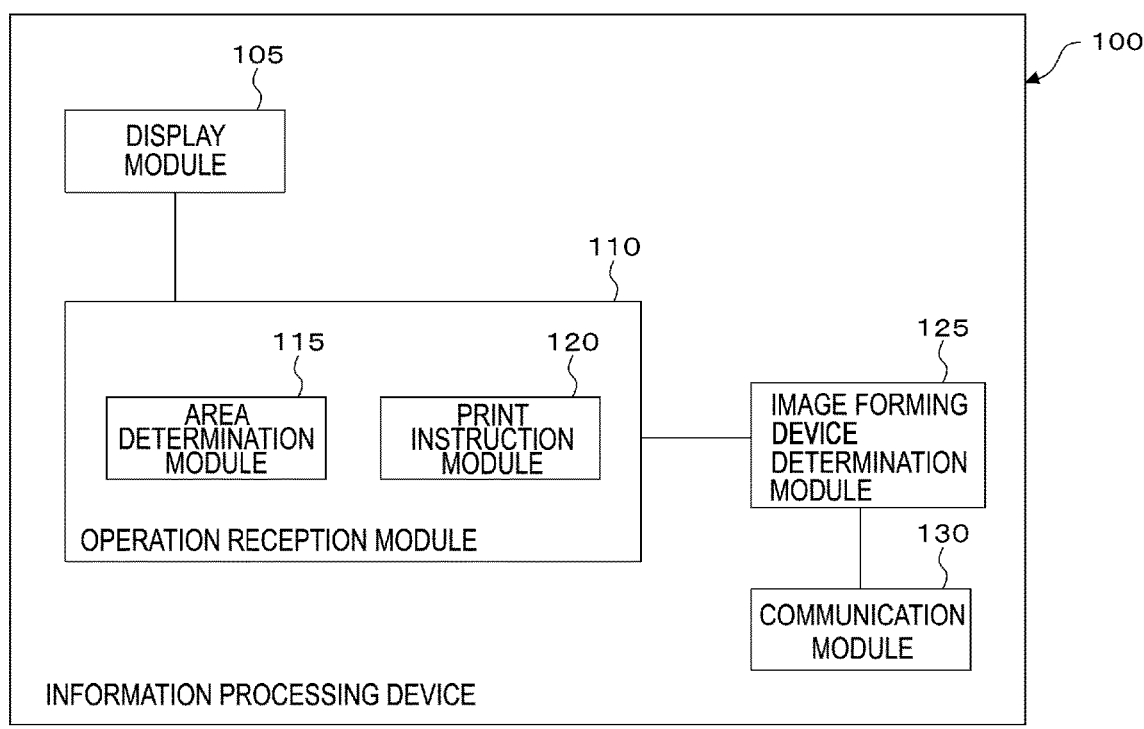
FIG. 1 is a conceptual module configuration diagram of a configuration example of a first exemplary embodiment.

FIG. 1 is a conceptual module configuration diagram of a configuration example of a first exemplary embodiment.

As used herein, the term "module" generally refers to a component such as software (computer program), hardware or the like that can be logically separated. Therefore, a module in this exemplary embodiment refers to not only a module for a computer program but also a module for a hardware configuration. Therefore, in this exemplary embodiment, a computer program for causing a computer to function as a module (a program for causing a computer to execute each procedure, a program for causing a computer to function as each unit, and a program for causing a computer to implement each function), a system and a method will be described. As used herein, the term "store,", "stored" or an equivalent wording refers to storing in a storage device or controlling to store in a storage device when an exemplary embodiment is directed to a computer program. In addition, although modules may be in the one-to-one correspondence with functions, in implementation, one module may be configured as one program, or plural modules may be configured as one program, or conversely, one module may be configured as plural programs. Further, plural modules may be executed by one computer, or one module may be executed by plural computers in a distributed or parallel environment. Further, one module may include other modules. As used herein, the term "connection" is intended to include not only a physical connection but also a logical connection (data exchange, instruction, reference relation between data, log-in, etc.). As used herein, the term "predetermined" refers to that an object is determined before a targeted process. Specifically, it includes the meaning that an object is determined not only before a process according to the present exemplary embodiment starts, but also before a targeted process even after the process according to the present exemplary embodiment starts, according to the situation/state at that time or according to the situation/state so far. When there are plural "predetermined values", they may be different values or may be two or more identical values (including the case where all the values are an identical value). In addition, a statement "do B when A" is used to mean "determine whether or not A is met and do B when it is determined that A is met." However, cases where it is unnecessary to determine whether or not A is met are excluded. Further, when enumerating objects like "A, B, C," etc., it is an example enumeration unless otherwise mentioned, including a case where only one of them is selected (e.g., only A only).

As used herein, the term "system or apparatus" is intended to include not only plural computers, hardware, devices and the like connected by a communication unit such as a network (including a one-to-one correspondence communication connection) or the like, but also a single computer, hardware and the like. The "device" and the "system" are used synonymously with each other. Of course, the "system" does not include things that are merely a social "structure" (social system) which is an artificial agreement.

In addition, for each process by each module or for each process when plural processes are performed in the module, target information is read from a storage device, the process is performed and then a result of the process is written in the storage device. Therefore, the description about reading from the storage device before processing and writing to the storage device after the processing may be omitted in some cases. The storage device used here may include a hard disk, a RAM (Random Access Memory), an external storage medium, a storage device via a communication line, a register in a CPU (Central Processing Unit), and the like.

An information processing device 100 according to the first exemplary embodiment is configured to issue a print instruction to an image forming device 200. As illustrated in the example of FIG. 1, the information processing device 100 includes a display module 105, an operation reception module 110, an image forming device determination module 125 and a communication module 130. The information processing device 100 used herein is, in particular, a portable information processing device and communication with the image forming device 200 may be wireless communication. Specifically, the information processing device 100 may be a smartphone or the like. Further, the communication may be WiFi communication, visible light communication, or the like. That is, the information processing device 100 and the image forming device 200 are not in a fixed relationship but the image forming device 200 may be changed depending on the position of an operator (or the information processing device 100) and there may be plural image forming devices 200.

The display module 105 is connected to the operation reception module 110. The display module 105 displays an image.

In addition, when there are plural printable image forming devices 200, the display module 105 displays the plural image forming devices 200 in a selectable manner.

Further, the display module 105 may display the image forming device 200 on a map in a selectable manner. For example, it becomes possible to select an image forming device 200 installed in a convenience store or other public space. Further, a temporarily-sharable image forming device 200 may be included. For example, an image forming device 200 installed in a company may be a display target. However, the condition for this is that, at the time of printing, the image forming device 200 is in a shared state, that is, a general user (operator) who is not a member of the company is also allowed to use the image forming device 200.

Further, the display module 105 may display the function or operation information of the image forming device 200 according to selection of the image forming device 200 by the operator. In particular, in a case where an image forming device 200 in a public space or the like is displayed, when the image forming device 200 is designated, the specifications and operation information of the image forming device 200 may be displayed. Then, a print instruction may be designated or a print reservation may be made.

In addition, the display module 105 may display plural image forming devices 200 in a ranked order according to predetermined rules.

The predetermined rules may include one or more of the followings:

(1) To increase the priority of the image forming device 200 to which the information processing device 100 is directed, (2) To increase the priority of the image forming device 200 having a good connection condition with the information processing device 100, (3) To increase the priority of the image forming device 200 having a short distance to the information processing device 100, and (4) To increase the priority of the image forming device 200 which will end printing of the print target earlier.

In addition, the display module 105 may use a rule stored in a relay device 298 that relays the information processing device 100 and the image forming device 200.

Further, the display module 105 may issue a warning when there is no printable image forming device 200. The warning may be character display, graphic display, blinking, sound output, vibration, or a combination thereof, indicating that there is no printable image forming device 200.

The operation reception module 110 includes an area determination module 115 and a print instruction module 120 and is connected to the display module 105 and the image forming device determination module 125. The operation reception module 110 receives an operation of determining an area as a print target in an image and a print instruction operation.

The area determination module 115 determines an area as a print target from an image displayed by the display module 105. Here, an example of the "print target" may include a map or the like displayed on the display of a smartphone. The print target may be enlarged and printed in printing. Here, the enlargement is to display the print target larger than the display on the display device of the information processing device 100. Therefore, the information processing device 100 may set an enlargement ratio in advance as the setting of the image forming device 200. In addition, here, the "determination" may include an operation of a screenshot. That is, an area as a print target is also determined only by the operation of the screenshot.

The print instruction module 120 receives a print instruction operation targeting the area determined by the area determination module 115. Here, the "print instruction operation" may or not be an explicit operation. The former corresponds to an operation such as selecting a print button. In the latter case, for example, the area may be determined by the area determination module 115. That is, the determination of the area by the area determination module 115 includes a print instruction of that area. Specifically, when the operation of the screenshot which is the determination of the area is performed on the information processing device 100, the image forming device 200 is selected and is caused to print the image of the screenshot.

The image forming device determination module 125 is connected to the operation reception module 110 and the communication module 130. The image forming device determination module 125 determines the printable image forming device 200 when a print instruction operation targeting the area determined by the area determination module 115 is performed by the print instruction module 120. Here, the "printable" includes "connectable" by communication. In addition to the communication connection, the "printable" may include that the image forming device 200 is provided with functions required by a user, such as stapling and punching. Further, as described later in a second exemplary embodiment, the "printable" may include that the image forming device 200 has a borderless printing function based on an image as a print target.

The communication module 130 is connected to the image forming device determination module 125. The communication module 130 transmits a print instruction to the image forming device 200 determined by the image forming device determination module 125.

In addition, when a print instruction operation is performed by the print instruction module 120, the communication module 130 may transmit a print instruction to the printable image forming device 200 without any selection operation of the image forming device 200 by the operator.

Further, when an area is determined consecutively by the area determination module 115 after the transmission of the print instruction, the communication module 130 may transmit a print instruction to the printable image forming device 200 without any print instruction operation by the operator. As a result, in a case of continuous printing, the print instruction operation can be made unnecessary. That is, it is possible to print on the second and subsequent occasions only by specifying an area. Further, when it is unnecessary to issue the second and subsequent print instructions, the condition for this may be that it is within a predetermined period from the previous transmission of the print instruction, that the information processing device 100 has not moved (that is, the user stops and operates it), or that a distance between the information processing device 100 and the image forming device 200 is less than or equal to a predetermined threshold value.

Further, when the setting of the image forming device 200 in printing is already performed, the communication module 130 may transmit a print instruction to the image forming device 200 to which the setting is applicable. As described above, the conditions of the transmission destination may include that the image forming device 200 is provided with the functions (such as the setting of the image forming device 200 that is already performed) required by the user, such as stapling and punching.

Figure 2A:
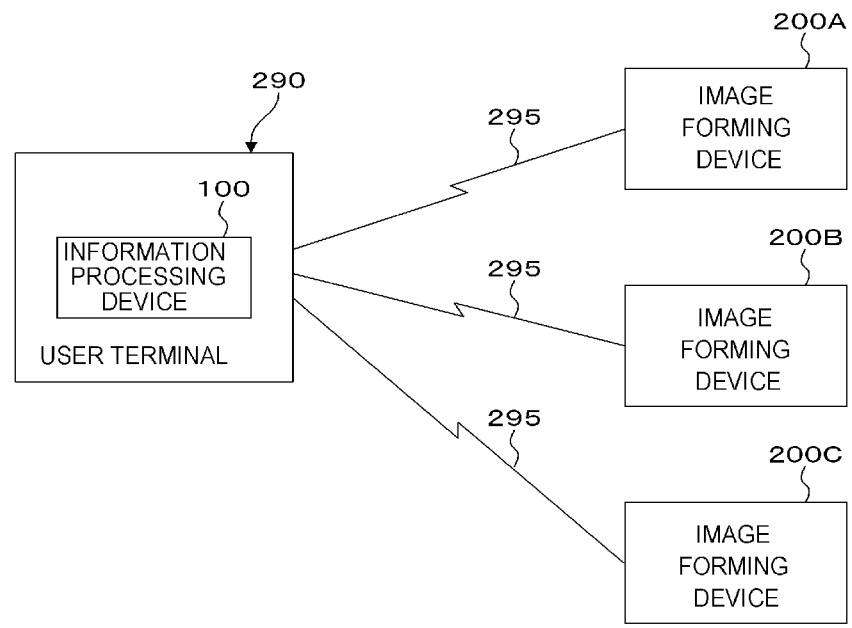
FIGS. 2A and 2B are explanatory views illustrating a system configuration example using the first exemplary embodiment.
Figure 2B:
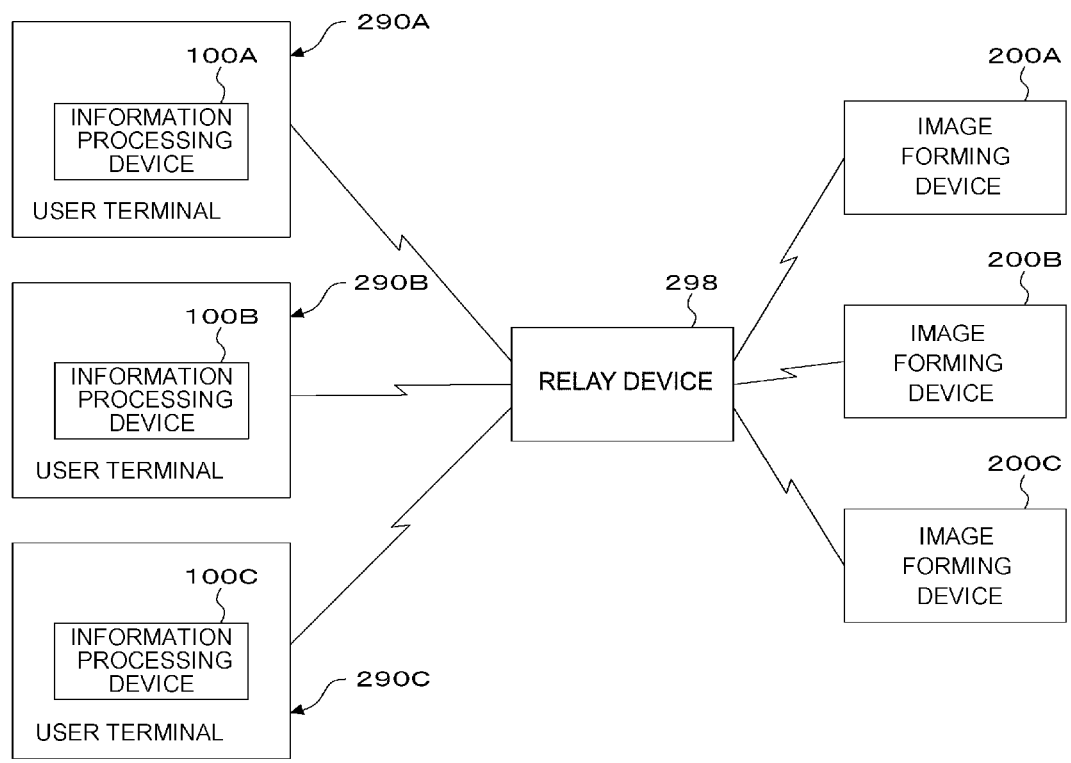

FIGS. 2A and 2B are explanatory views illustrating a system configuration example using the first exemplary embodiment.

As illustrated in the example of FIG. 2A, a user terminal 290 which is a portable information terminal has an information processing device 100. The user terminal 290 is connected to image forming devices 200 (an image forming device 200A, an image forming device 200B and an image forming device 200C) via a communication line 295. Here, the communication line 295 is a wireless communication line and includes, for example, Wi-Fi communication, optical communication (including infrared communication, visible light communication, etc.), and the like.

For example, in a case where the information processing device 100 according to the present exemplary embodiment is not used (in a case of using the related art technique), in order to perform a screenshot with a portable information terminal to issue a print instruction, it is necessary to (1) designate a print area, (2) select a printing application or a button for issuing a print instruction, and (3) go through plural steps before issuing a print instruction by setting a print attribute on a setting screen.

The information processing device 100 aims to improve user operability. In particular, in the information processing device 100, an instruction on which image forming device 200 to output can be omitted.

For example, when a screenshot is performed by a user's operation, the information processing device 100 transmits to the printable image forming device 200 a print instruction for printing an image (an image displayed on the display device of the information processing device 100) generated by the screenshot.

In the configuration illustrated in the example of FIG. 2B, the user terminal 290 and the image forming device 200 may be connected to a relay device 298 via a communication line. In general, wireless communication may be performed between the relay device 298 and the user terminal 290 and wireless communication or wired communication may be performed between the relay device 298 and the image forming device 200.

In this case, the user terminal 290 and the image forming device 200 are connected via the relay device 298. The relay device 298 manages the functions, processing conditions and the like of the image forming device 200 and may provide such information to the user terminal 290. In that case, the image forming devices 200 may be ranked according to a rule stored in the relay device 298.

Figure 3:
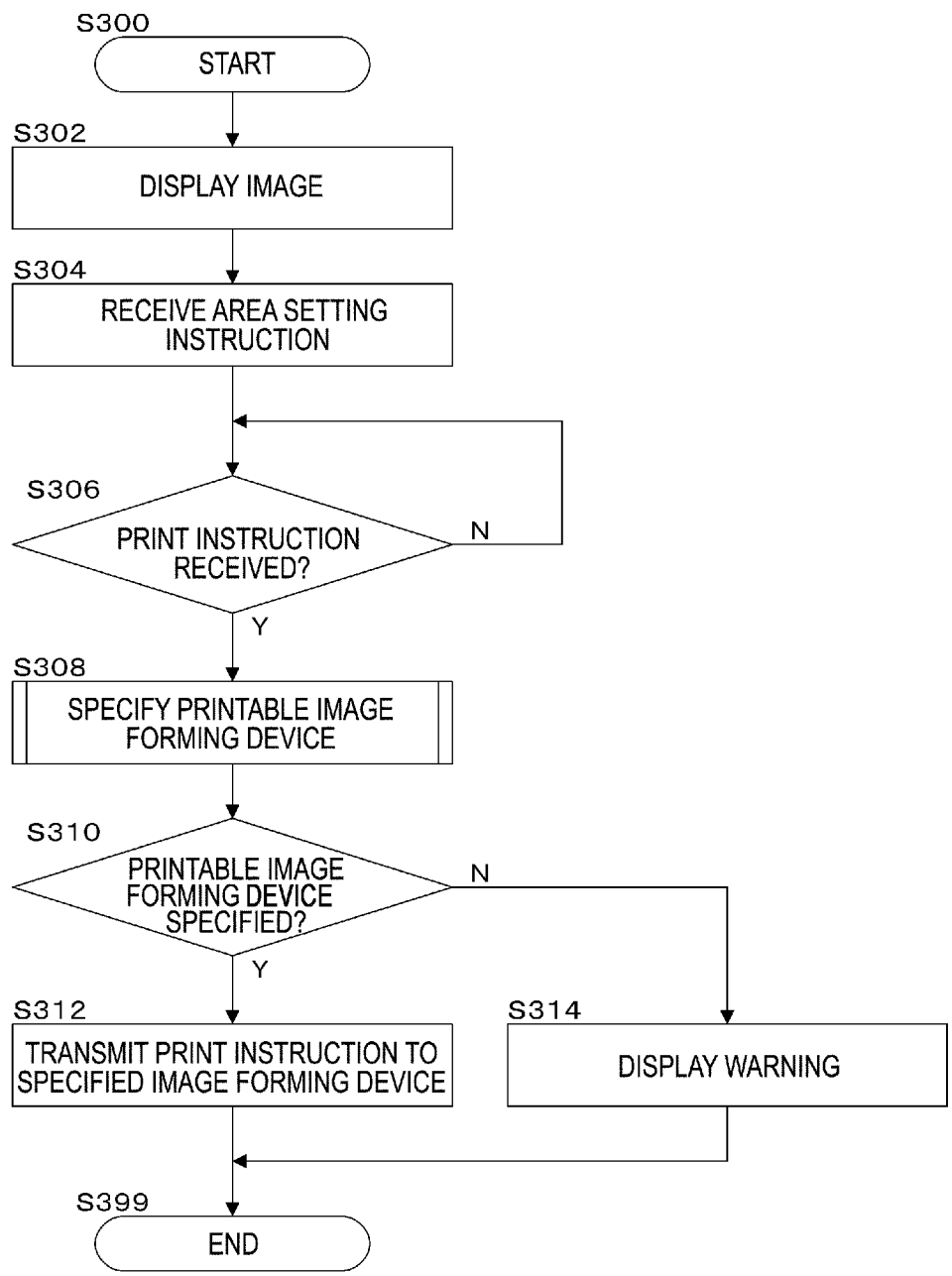
FIG. 3 is a flowchart illustrating a process example according to the first exemplary embodiment.

FIG. 3 is a flowchart illustrating an example of a process according to the first exemplary embodiment.

In step S302, the display module 105 displays an image.

In step S304, the area determination module 115 receives an area setting instruction.

In step S306, the print instruction module 120 determines whether or not a print instruction has been received. When a print instruction has been received, the process proceeds to step S308. Otherwise, the process waits until a print instruction is received.

In step S308, the image forming device determination module 125 specifies a printable image forming device 200. A detailed process in step S308 will be described later with reference to a flowchart illustrated in an example of FIG. 4 or FIG. 5.

In step S310, the image forming device determination module 125 determines whether or not the printable image forming device 200 has been specified. When the image forming device 200 has been specified, the process proceeds to step S312. Otherwise, the process proceeds to step S314.

In step S312, the communication module 130 transmits a print instruction to the specified image forming device 200.

In step S314, the display module 105 displays a warning.

Figure 4:
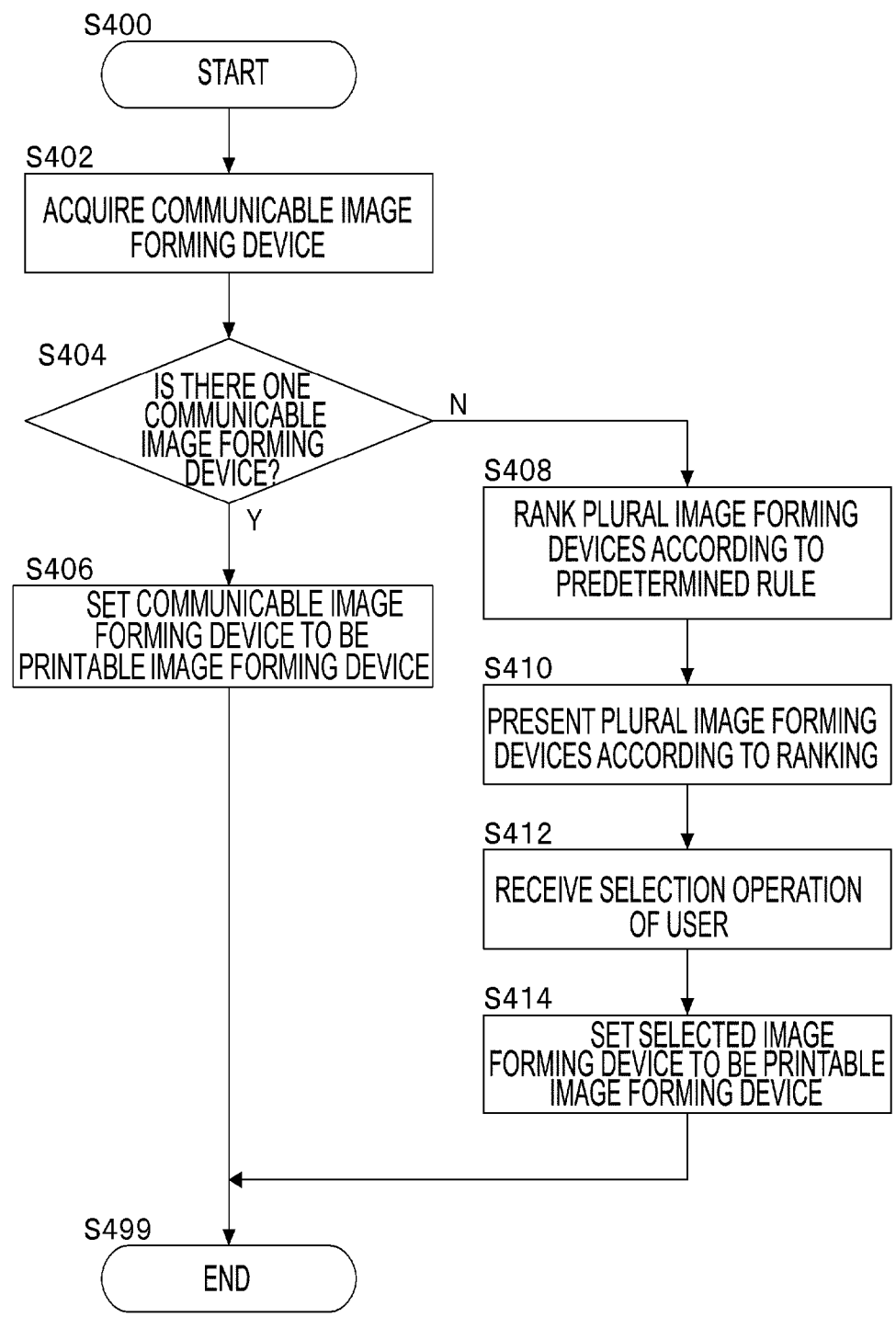
FIG. 4 is a flowchart illustrating a process example according to the first exemplary embodiment.

FIG. 4 is a flowchart illustrating an example of a process by the first exemplary embodiment (mainly the image forming device determination module 125).

In step S402, a communicable image forming device 200 is acquired.

In step S404, it is determined whether or not there is one communicable image forming device 200. When there is one communicable image forming device 200, the process proceeds to step S406. Otherwise, the process proceeds to step S408.

In step S406, the communicable image forming device 200 is set to be a printable image forming device 200.

In step S408, plural image forming devices 200 are ranked according to a predetermined rule. As described above, the predetermined rule may include one or more of:

(1) to increase the priority of the image forming device 200 to which the information processing device 100 is directed, (2) to increase the priority of the image forming device 200 having a good connection condition with the information processing device 100, (3) to increase the priority of the image forming device 200 having a short distance to the information processing device 100, and (4) to increase the priority of the image forming device 200 which will end printing of a print target earlier.

The orientation of the information processing device 100 may be detected using, for example, a magnetic sensor, a gyroscope sensor or the like in the information processing device 100. The position of the information processing device 100 is measured using GPS (Global Positioning System) in the information processing device 100. The position of the image forming device 200 may be acquired from the image forming device 200 or may be acquired from the relay device 298. Then, the position and orientation of the information processing device 100 and the position of the image forming device 200 may be used to specify the image forming device 200 to which the information processing device 100 is directed. The status of connection between the information processing device 100 and the image forming device 200 may be detected using the wireless communication function of the information processing device 100. As described above, the distance between the information processing device 100 and the image forming device 200 may be calculated from the positions of both. The end time of the printing of the printing target in the image forming device 200 may be calculated by acquiring the printing status (may include a printing reservation) and the printing speed in the image forming device 200.

In step S410, plural image forming devices 200 are presented in accordance with the ranking.

In step S412, a selection operation by a user is received.

In step S414, a selected image forming device 200 is set to be a printable image forming device 200.

Figure 5:
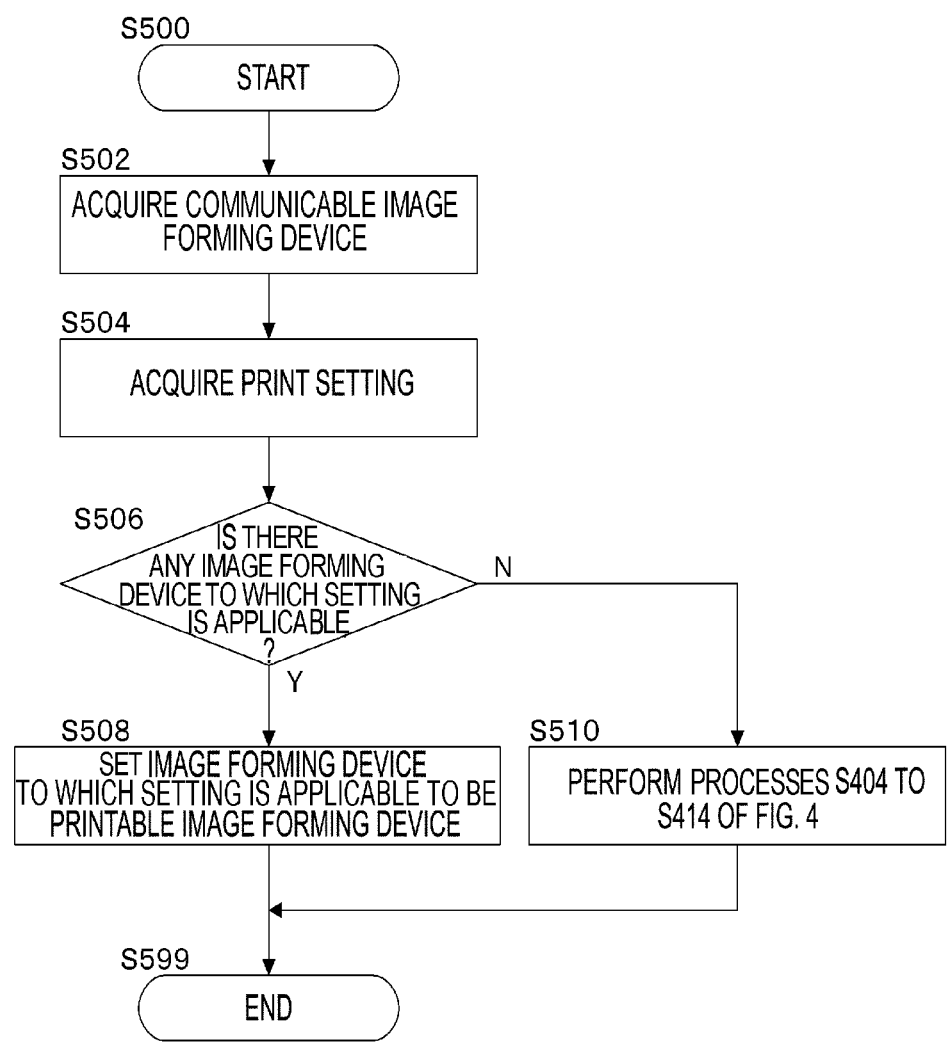
FIG. 5 is a flowchart illustrating a process example according to the first exemplary embodiment.

FIG. 5 is a flowchart illustrating an example of a process by the first exemplary embodiment (mainly the image forming device determination module 125).

In step S502, a communicable image forming device 200 is acquired.

In step S504, a print setting is acquired. As described above, settings such as stapling, punching, borderless printing and the like may be acquired.

In step S506, it is determined whether or not there is an image forming device 200 to which the setting is applicable. When there is an image forming device 200 to which the setting is applicable, the process proceeds to step S508. Otherwise, the process proceeds to step S510. For example, as to whether or not the setting is applicable to an image forming device 200, the image forming device 200 may be inquired about the function of the image forming device 200 or the relay device 298 may be inquired.

In step S508, the image forming device 200 to which the setting is applicable is set to be a printable image forming device 200.

In step S510, the steps from step S404 to step S414 of the flowchart illustrated in the example of FIG. 4 is performed.

Figure 6:
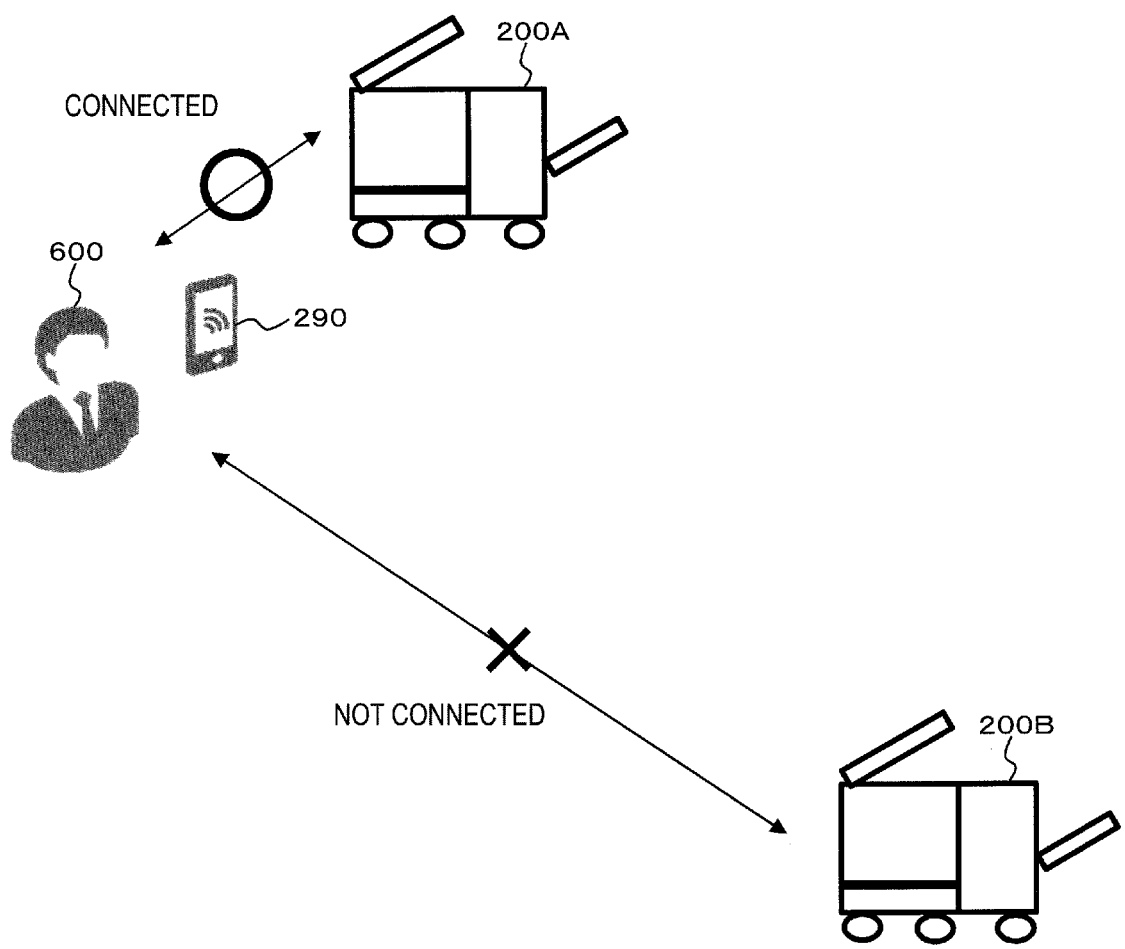
FIG. 6 is an explanatory view illustrating a process example according to the first exemplary embodiment.

FIG. 6 is an explanatory view illustrating an example of a process according to the first exemplary embodiment.

A user 600 is operating the user terminal 290. The user terminal 290 and the image forming device 200A are interconnected. The user terminal 290 and the image forming device 200B are not interconnected.

Figure 7A:
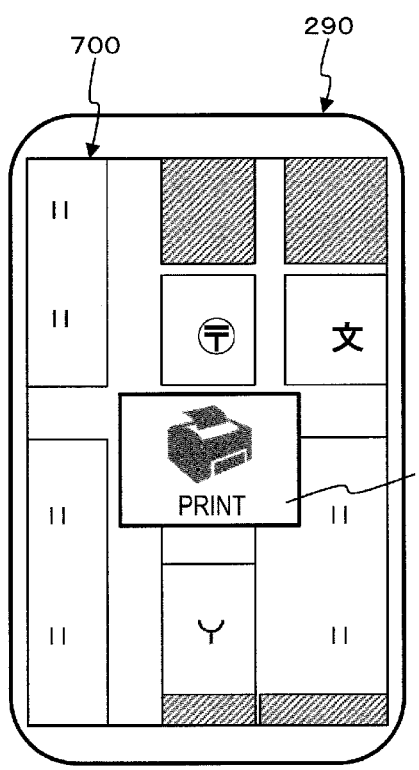
FIGS. 7A and 7B are explanatory views illustrating a process example according to the first exemplary embodiment.
Figure 7B:
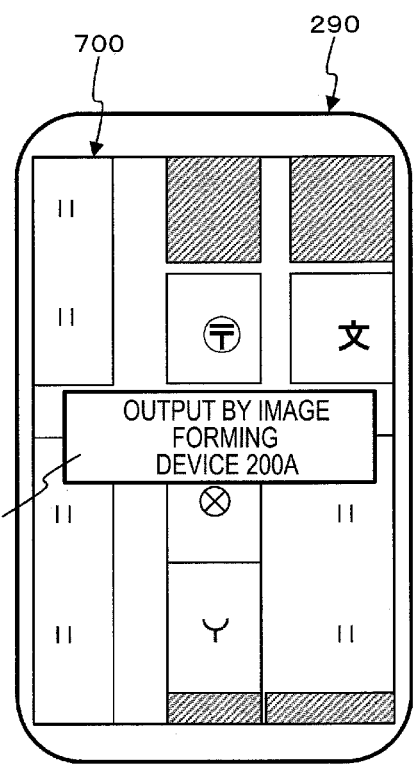

Here, the user 600 performs the operation as illustrated in the example of FIGS. 7A and 7B on the user terminal 290.

As illustrated in the example of FIG. 7A, a map image is displayed on a screen 700 of the user terminal 290 and an operation of screenshot is performed here. This operation of screenshot corresponds to "an operation of determining an area as a print target." Then, a print instruction button 750 is displayed. A case in which the print instruction button 750 is selected corresponds to "a case where a print instruction operation is performed." Therefore, the information processing device 100 searches for a printable image forming device 200. In this case, since the user terminal 290 and the image forming device 200A are interconnected, a display as illustrated in the example of FIG. 7B is performed. That is, a message area 760 is displayed on the screen 700, and a message of "output by the image forming device 200A" is displayed in the message area 760. Thereafter, the information processing device 100 may transmit the print instruction to the image forming device 200A or may display a "Yes" button, a "No" button, etc. to allow the user 600 to check it.

Figure 8:
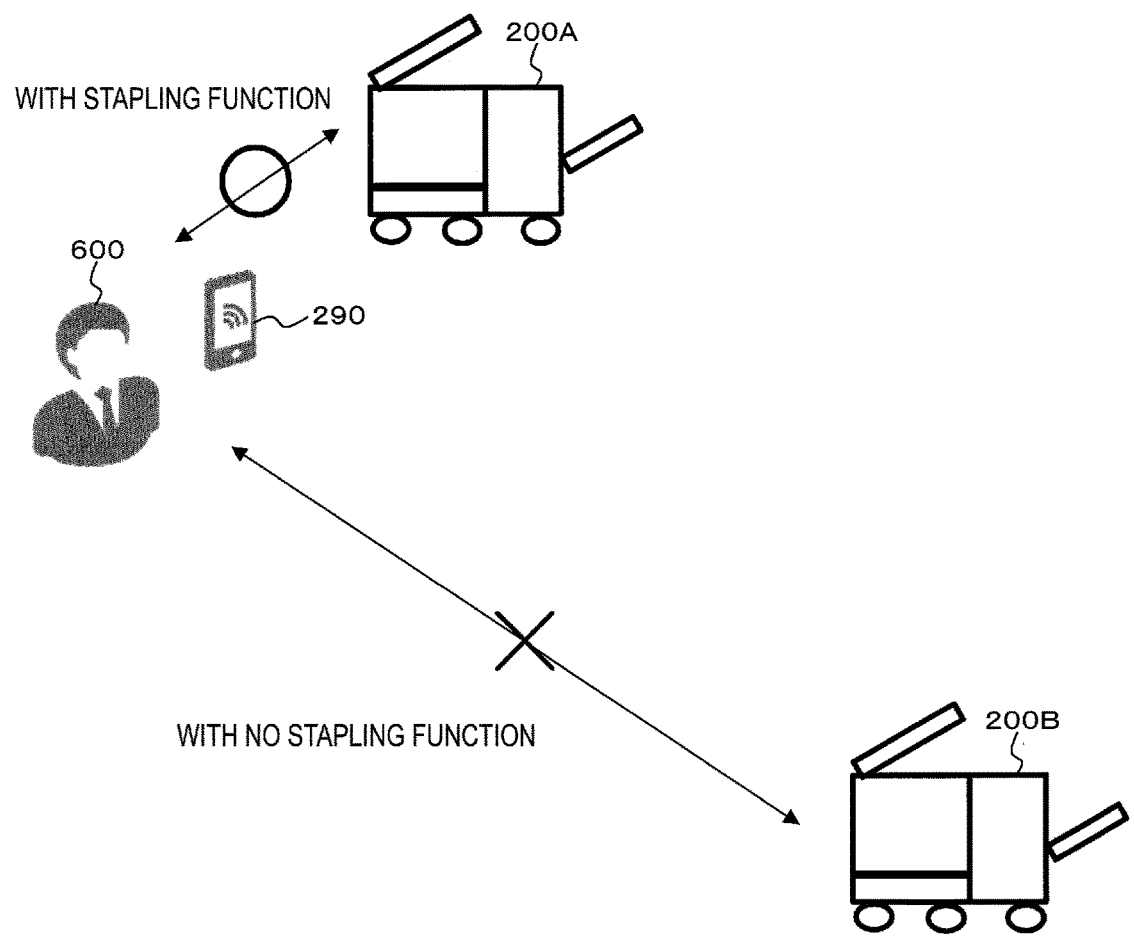
FIG. 8 is an explanatory view illustrating a process example according to the first exemplary embodiment.

FIG. 8 is an explanatory view illustrating an example of a process according to the first exemplary embodiment. FIG. 8 illustrates an example of a process in a case where "staple setting" in printing by the image forming device 200 has already been performed. That is, "staple setting" has already been performed before printing designation, and thereafter it becomes a printing instruction of "staple setting."

The image forming device 200A is "with a stapling function." The image forming device 200B is "with no stapling function."

Figure 9A:
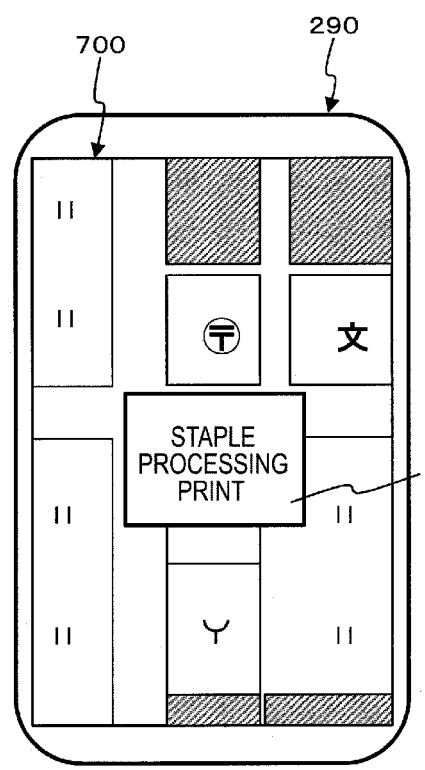
FIGS. 9A and 9B are explanatory views illustrating a process example according to the first exemplary embodiment.
Figure 9B:
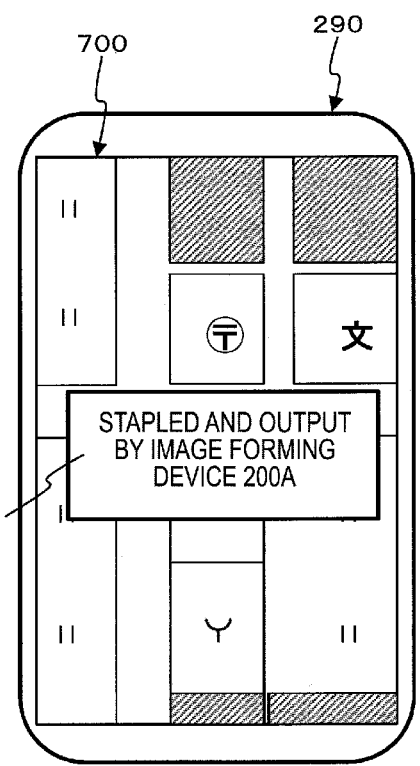

Here, the user 600 performs the operation as illustrated in the example of FIGS. 9A and 9B on the user terminal 290.

As illustrated in the example of FIG. 9A, a map image is displayed on the screen 700 of the user terminal 290 and the operation of screenshot is performed here. This operation of screenshot corresponds to "an operation of determining an area as a print target." Then, a staple processing print instruction button 950 is displayed. A case where the staple processing print instruction button 950 is selected corresponds to "a case where a print instruction operation is performed." When printing is performed, the user 600 sets in advance that it is staple processing print.

Next, the information processing device 100 searches for a printable image forming device 200. In this case, since the user terminal 290 and the image forming device 200A are interconnected and the image forming device 200A is capable of stapling, the display as illustrated in the example of FIG. 9B is performed. Even when the user terminal 290 and the image forming device 200B are interconnected, since the image forming device 200B is "with no stapling function", it is not determined that the image forming device 200B is a printable image forming device 200. Then, a message area 960 is displayed on the screen 700, and a message of "stapled and output by the image forming device 200A" is displayed in the message area 960. Thereafter, the information processing device 100 may transmit a print instruction (a print instruction with staple processing) to the image forming device 200A, or may display a "Yes" button, a "No" button or the like to allow the user 600 to check it.

Of course, in addition to the stapling function, when settings such as printing using a punching function, borderless printing and the like are beforehand performed, it may be determined whether or not the image forming device 200 is capable of printing using the punching function, borderless printing, etc. to select a possible image forming device 200.

Figure 10:
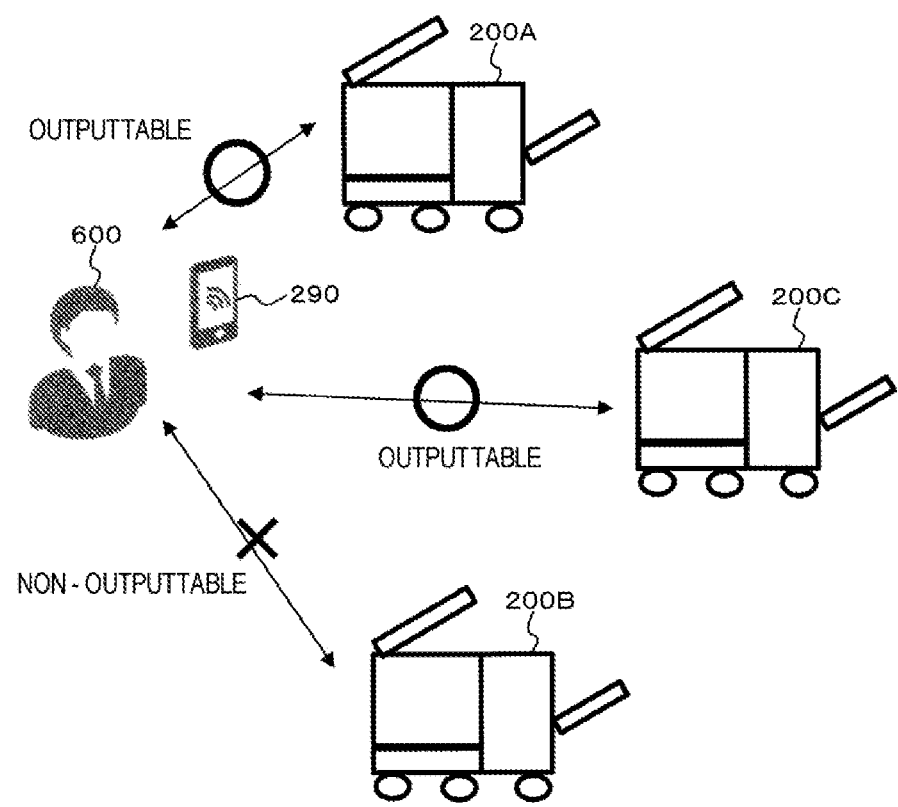
FIG. 10 is an explanatory view illustrating a process example according to the first exemplary embodiment.

FIG. 10 is an explanatory view illustrating an example of a process according to the first exemplary embodiment. FIG. 10 illustrates an example of a process in a case where there are plural printable image forming devices 200.

The user terminal 290 can print using the image forming device 200A. The user terminal 290 cannot print using the image forming device 200B. The user terminal 290 can print using the image forming device 200C. Display on the screen 700 of the user terminal 290 will be described with reference to the examples in FIGS. 11A, 11B, 12A, and 12B.

Here, the user 600 performs the operation as illustrated in the example of FIGS. 11A and 11B on the user terminal 290.

As illustrated in the example of FIG. 11A, a map image is displayed on the screen 700 of the user terminal 290 and the operation of screenshot is performed here. This operation of screenshot corresponds to "an operation of determining an area as a print target." Then, a message area 1110, a printer A instruction button 1150, an arrow button 1145 and an arrow button 1155 are displayed. A case where the printer A instruction button 1150 is selected corresponds to "a case where a print instruction operation is performed." Since there are plural printable image forming devices 200, a message of "please select a device to output" is displayed in the message area 1110. Then, in addition to the printer A instruction button 1150, the arrow button 1145 and the arrow button 1155 are displayed so that an image forming device 200 can be selected. When the arrow button 1145 and the arrow button 1155 are selected, a selection button of the image forming device 200C is displayed.

Then, when the printer A instruction button 1150 is selected, as illustrated in the example of FIG. 11B, a message area 1160 is displayed on the screen 700 and a message of "output by the image forming device 200A" is displayed in the message area 1160. Thereafter, the information processing device 100 may transmit the print instruction to the image forming device 200A or may display a "Yes" button, a "No" button, etc. to allow the user 600 to check it.

Figures 12A, 12B:
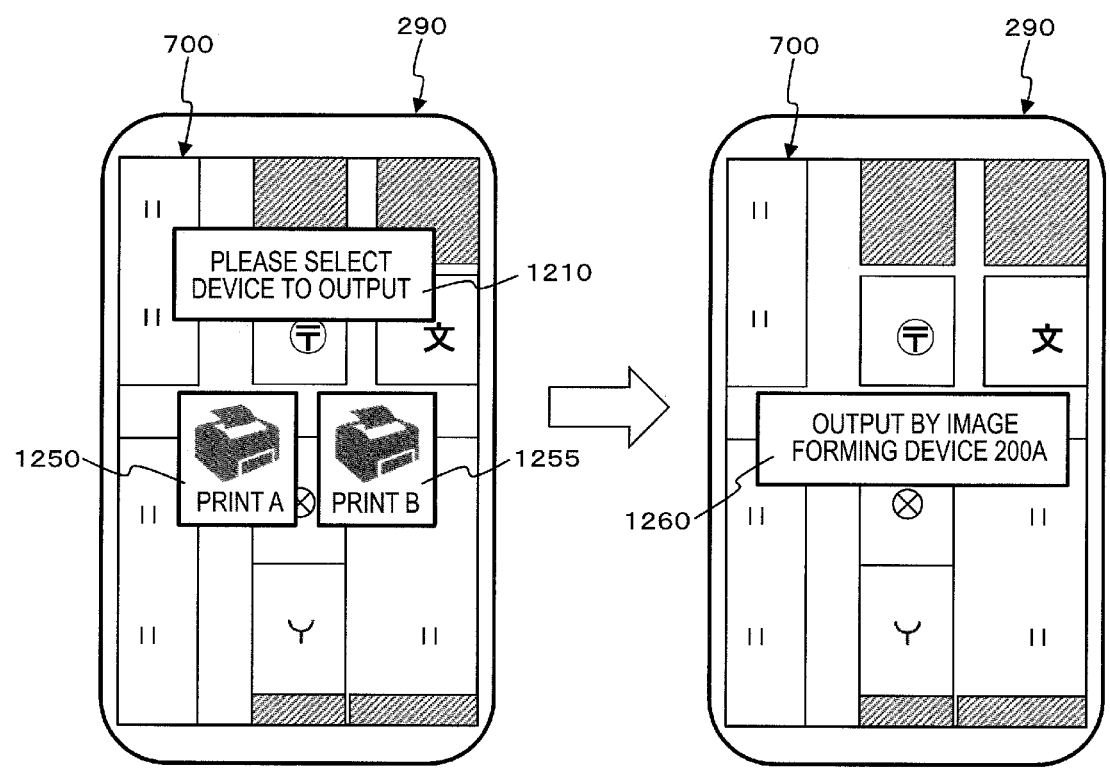
FIGS. 12A and 12B are explanatory views illustrating a process example according to the first exemplary embodiment.

In the state illustrated in the example of FIG. 10, the user 600 performs the operation illustrated in the example of FIGS. 12A and 12B on the user terminal 290.

As illustrated in the example of FIG. 12A, a map image is displayed on the screen 700 of the user terminal 290 and the operation of screenshot is performed here. This operation of screenshot corresponds to "an operation of determining an area as a print target." Then, a message area 1210, a printer A instruction button 1250 and a printer C instruction button 1255 are displayed. A case where the printer A instruction button 1250 or the printer C instruction button 1255 is selected corresponds to "a case where a printing instruction operation is performed." Since there are plural printable image forming devices 200, a message of "please select a device to output" is displayed in the message area 1210. Then, the printer A instruction button 1250 and the printer C instruction button 1255 are displayed so that an image forming device 200 can be selected.

Then, when the printer A instruction button 1250 is selected, as illustrated in the example of FIG. 12B, a message area 1260 is displayed on the screen 700 and a message of "output by the image forming device 200A" is displayed in the message area 1260. Thereafter, the information processing device 100 may transmit the print instruction to the image forming device 200A or may display a "Yes" button, a "No" button, etc. to allow the user 600 to check it.

Figure 13:
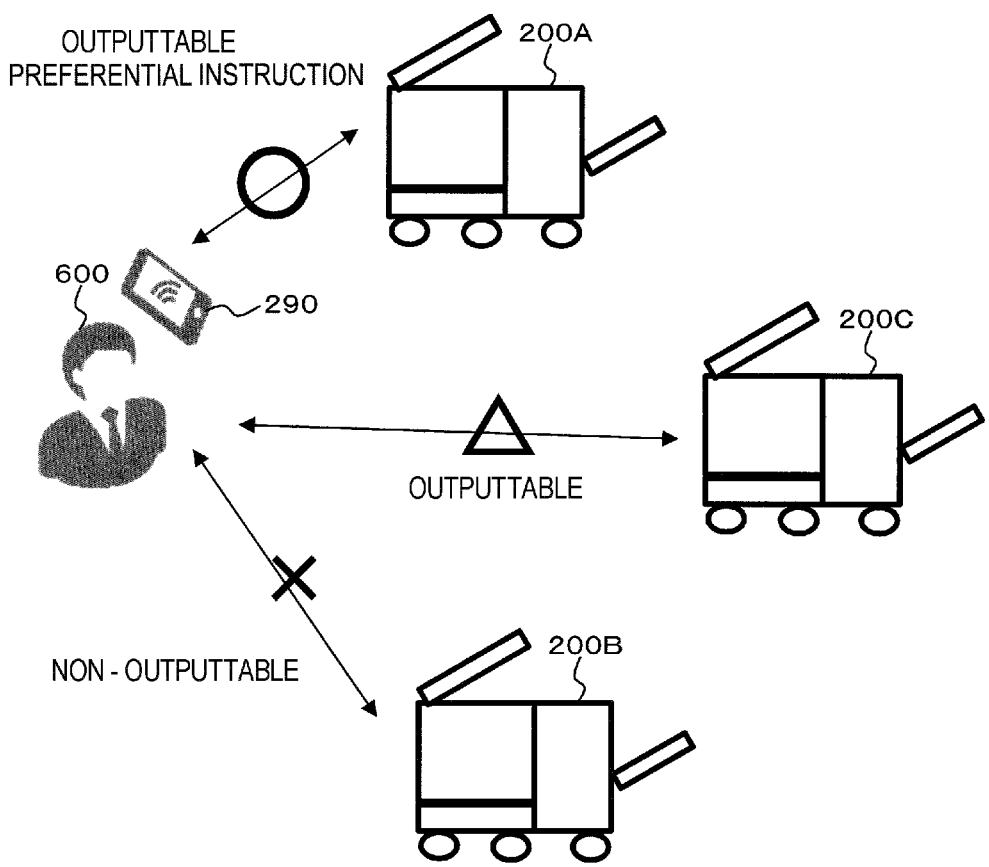
FIG. 13 is an explanatory view illustrating a process example according to the first exemplary embodiment.

FIG. 13 is an explanatory view illustrating an example of a process according to the first exemplary embodiment. FIG. 13 illustrates an example of a process in a case where there are plural printable image forming devices 200 which are displayed with prioritization (rank).

The user terminal 290 can print using the image forming device 200A and has a high priority. The user terminal 290 cannot print using the image forming device 200B. The user terminal 290 can print using the image forming device 200C but has a lower priority than that of the image forming device 200A.

Figures 14A, 14B:
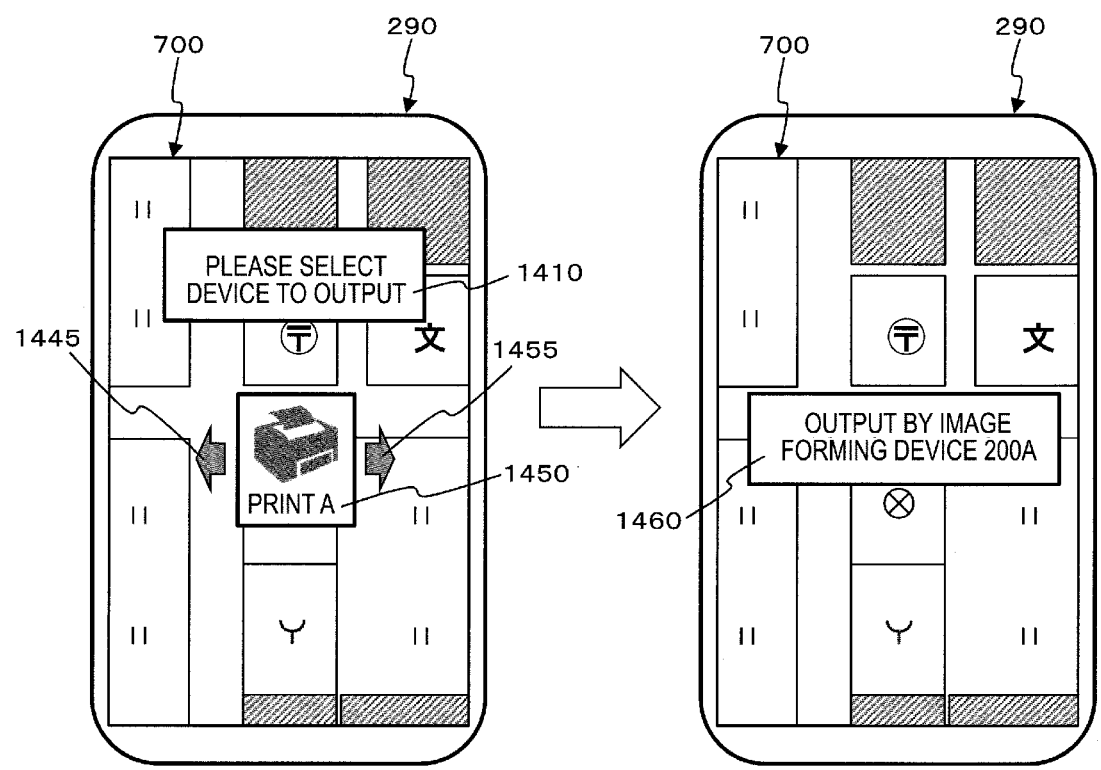
FIGS. 14A and 14B are explanatory views illustrating a process example according to the first exemplary embodiment.

Here, the user 600 performs the operation as illustrated in the example of FIGS. 14A and 14B on the user terminal 290.

As illustrated in the example of FIG. 14A, a map image is displayed on the screen 700 of the user terminal 290 and the operation of screenshot is performed here. This operation of screenshot corresponds to "an operation of determining an area as a print target." Then, a message area 1410, a printer A instruction button 1450, an arrow button 1445 and an arrow button 1455 are displayed. Here, the printer A instruction button 1450 with the highest priority is first displayed. That is, the image forming device 200A determined to be preferentially displayed is first displayed. Of course, it is also possible to omit the selection screen and issue a print instruction to the image forming device 200A with the highest priority. A case where the printer A instruction button 1450 is selected corresponds to "a case where a print instruction operation is performed." Since there are plural printable image forming devices 200, a message of "please select a device to output" is displayed in the message area 1410. Then, in addition to the printer A instruction button 1450, the arrow button 1445 and the arrow button 1455 are displayed so that an image forming device 200 can be selected. When the arrow button 1445 and the arrow button 1455 are selected, a selection button of the image forming device 200C with the next higher priority is displayed. When the arrow button 1455 is selected, a print button to the image forming device 200 with the higher priority may be displayed. When the arrow button 1445 is selected, a print button to the image forming device 200 with the lower priority may be displayed.

Then, when the printer A instruction button 1450 is selected, as illustrated in the example of FIG. 14B, a message area 1460 is displayed on the screen 700 and a message of "output by the image forming device 200A" is displayed in the message area 1460. Thereafter, the information processing device 100 may transmit the print instruction to the image forming device 200A or may display a "Yes" button, a "No" button, etc. to allow the user 600 to check it.

Figure 15:
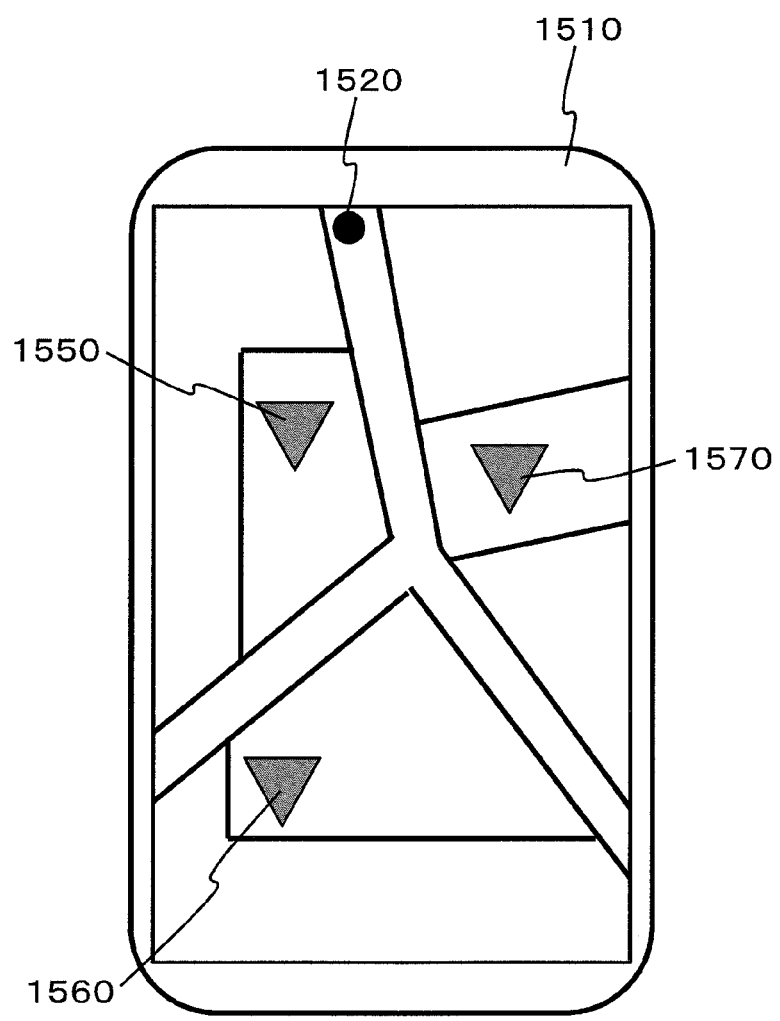
FIG. 15 is an explanatory view illustrating a process example according to the first exemplary embodiment.

When there are plural printable image forming devices 200, they are selectably displayed by the arrow button 1455 and the like in the example of FIG. 14A, and are displayed side by side in the example of FIG. 12A. However, as illustrated in the example of FIG. 15, the position of the user terminal 290 may be detected by the GPS in the user terminal 290, a map around the position is displayed, and each print button may be displayed at a position where an image forming device 200 is located on the map. That is, the user 600 can select an image forming device 200 that is close on the surrounding map. In the example of FIG. 15, there are three printable image forming devices 200 and a printer A instruction button 1550, a printer B instruction button 1560 and a printer C instruction button 1570 indicating the respective positions may be displayed together with a user position 1520.

In addition, as a print button, a photo image (thumbnail image) of the actual image forming device 200 may be displayed. The user 600 can identify the image forming device 200 actually used.

In addition, in particular, when the user terminal 290 is outside the company, a map around the user terminal 290 may be displayed and the image forming device 200 may be displayed on the map. This is because the user 600 holding the user terminal 290 often does not know where the image forming device 200 is located. Therefore, a range within the company is pre-registered in the user terminal 290 and it is determined whether or not a position detected by GPS in the user terminal 290 is out of the range. When the position is out of the range, as illustrated in the example of FIG. 15, a map around the user terminal 290 is displayed and an image forming device 200 is displayed on the map. When the position is within the range, the display as illustrated in the example of FIG. 12A is performed.

Figure 16:
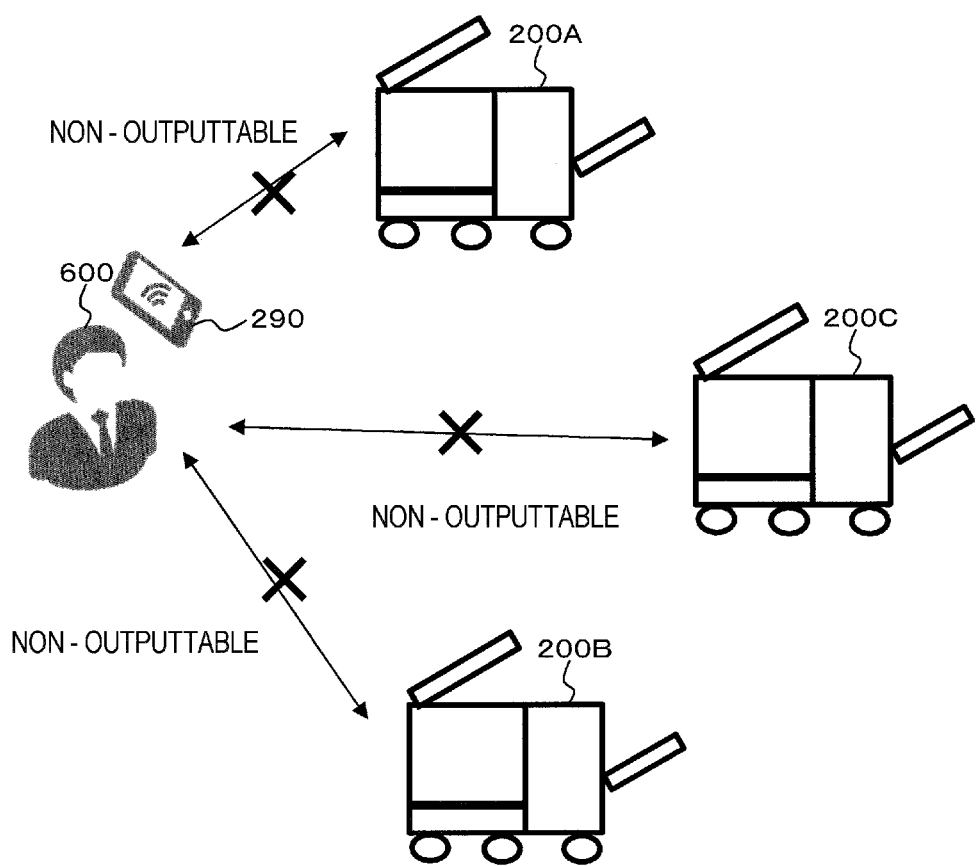
FIG. 16 is an explanatory view illustrating a process example according to the first exemplary embodiment.

FIG. 16 is an explanatory view illustrating an example of a process according to the first exemplary embodiment. FIG. 16 illustrates an example of a process of issuing a warning when there is no printable image forming device 200.

The user terminal 290 cannot print using the image forming device 200A. The user terminal 290 cannot print using the image forming device 200B. The user terminal 290 cannot print using the image forming device 200C.

Figures 17A, 17B:
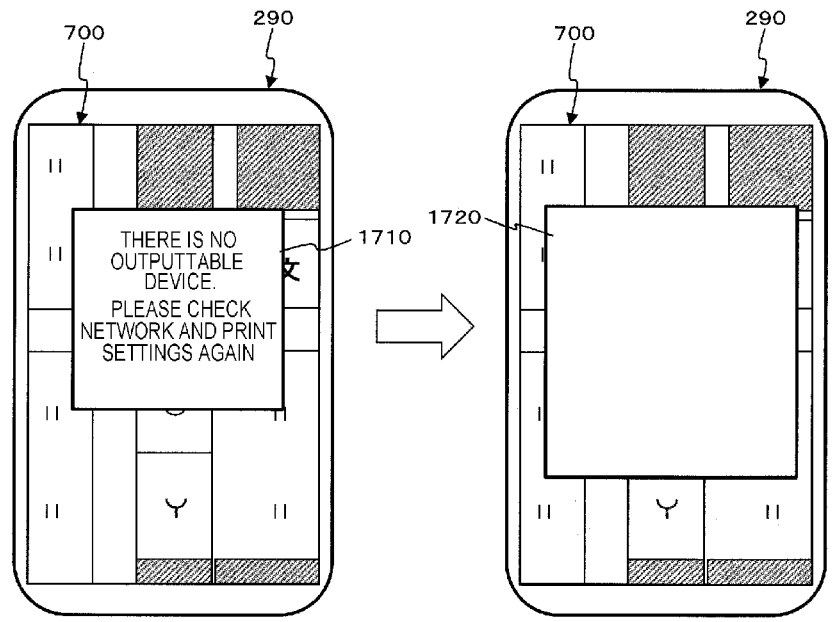
FIGS. 17A to 17C are explanatory views illustrating a process example according to the first exemplary embodiment.
Figure 17C:
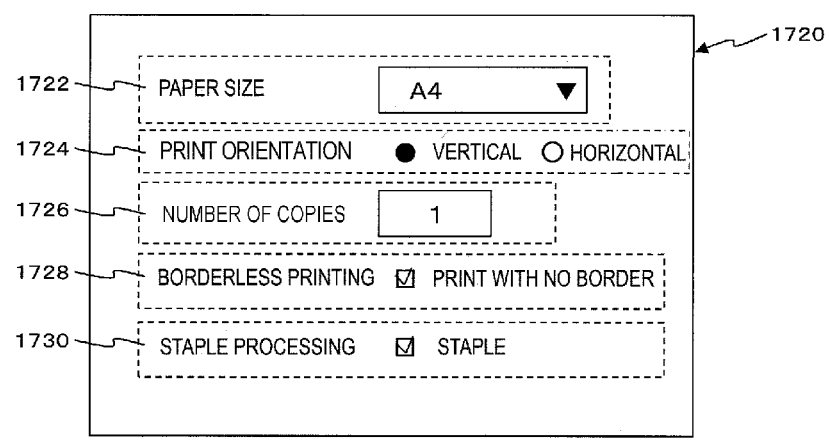

Here, the user 600 performs the operation as illustrated in the example of FIGS. 17A to 17C on the user terminal 290.

As illustrated in the example of FIG. 17A, a map image is displayed on the screen 700 of the user terminal 290 and the operation of screenshot is performed here. This operation of screenshot corresponds to "an operation of determining an area as a print target." Then, a message area 1710 is displayed. Since there is no printable image forming device 200, a message of "there is no outputtable device. Please check the network and print settings again." is displayed in the message area 1710. In addition to such character display, a warning may be issued by graphic display, blinking, sound output, vibration or a combination thereof.

Then, when the message area 1710 is selected or after a predetermined time has elapsed, a print setting area 1720 is displayed on the screen 700, as illustrated in the example of FIG. 17B. The details of the print setting area 1720 are illustrated in the example of FIG. 17C. The print setting area 1720 has a paper size designation field 1722, a print orientation designation field 1724, a number-of-copy designation field 1726, a borderless printing designation field 1728 and a staple processing designation field 1730. In this example, "A4" is designated for the paper size designation field 1722, "vertical" is designated for the print orientation designation field 1724, "1 copy" is designated for the number-of-copy designation field 1726, "borderless printing" is designated for the borderless printing designation field 1728, and "staple processing" is designated for the staple processing designation field 1730. When the settings are changed, there is a possibility that a printable image forming device 200 occurs in the print setting area 1720. Further, when communication is not possible, a warning may be issued to that effect.

Figure 18:
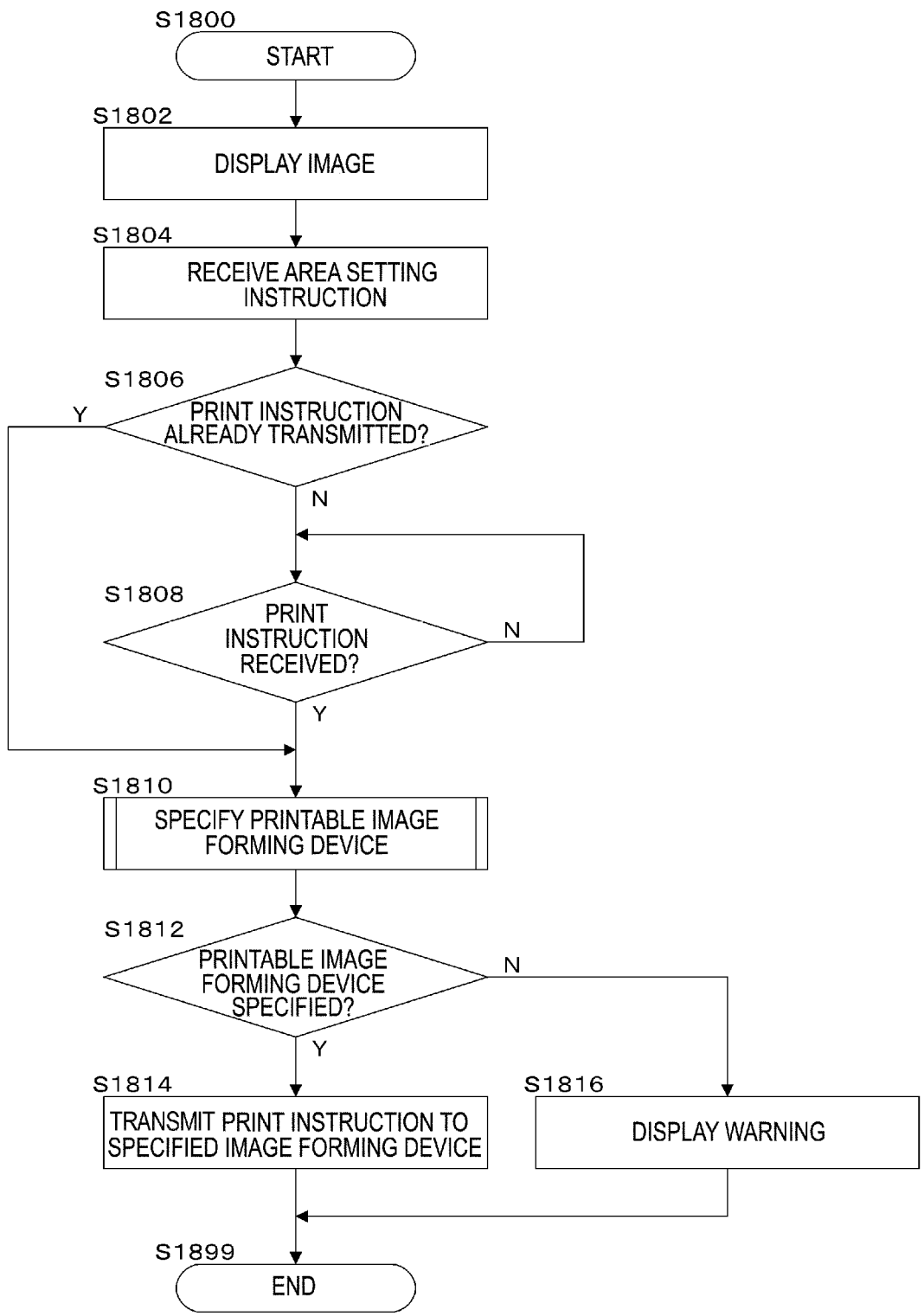
FIG. 18 is a flowchart illustrating a process example according to the first exemplary embodiment.

FIG. 18 is a flowchart illustrating an example of a process according to the first exemplary embodiment. The flowchart illustrated in the example of FIG. 3 may be modified to the flowchart as illustrated in the example of FIG. 18.

In step S1802, the display module 105 displays an image.

In step S1804, the area determination module 115 receives an area setting instruction.

In step S1806, the print instruction module 120 determines whether or not a print instruction has already been transmitted. When the print instruction has already been transmitted, the process proceeds to step S1810. Otherwise, the process proceeds to step S1808. Since there is a high possibility that a print instruction is subsequently issued, the second and subsequent print instructions are omitted. The condition for this may be that it is within a predetermined period from the previous transmission of the print instruction, that the user terminal 290 has not moved (that is, the user stops and operates it), or that a distance between the user terminal 290 and the image forming device 200 (the image forming device 200 that sent the previous print instruction) is less than or equal to a predetermined threshold value.

In step S1808, the print instruction module 120 determines whether or not a print instruction has been received. When the print instruction has been received, the process proceeds to step S1810. Otherwise, the process waits until a print instruction is received.

In step S1810, the image forming device determination module 125 specifies a printable image forming device 200. The detailed process in step S1810 has been described above with reference to the flowcharts illustrated in the example of FIG. 4 or FIG. 5.

In step S1812, the image forming device determination module 125 determines whether or not a printable image forming device 200 has been specified. When the image forming device 200 has been specified, the process proceeds to step S1814. Otherwise, the process proceeds to step S1816.

In step S1814, the communication module 130 transmits a print instruction to the specified image forming device 200.

In step S1816, the display module 105 displays a warning.

Second Exemplary Embodiment

Figure 19:
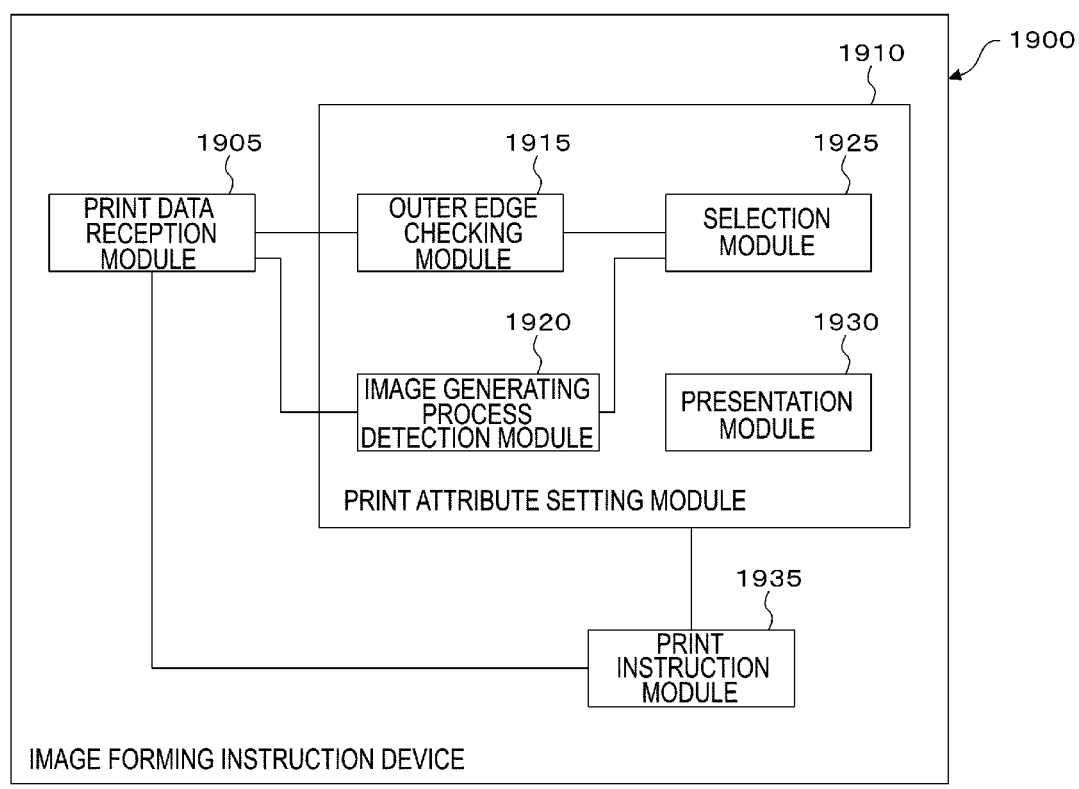
FIG. 19 is a conceptual module configuration diagram of a configuration example of a second exemplary embodiment.

An image forming instruction device 1900 according to a second exemplary embodiment is one to designate one of borderless printing and non-borderless printing (so-called border printing) for an image forming device 200 capable of performing both of the borderless printing and the non-borderless printing. As illustrated in FIG. 19, the image forming instruction device 1900 includes a print data reception module 1905, a print attribute setting module 1910 and a print instruction module 1935. The same parts as those of the first exemplary embodiment are denoted by the same reference numerals and explanation thereof will not be repeated.

For example, in a case where there are a borderless printing mode (setting) and a non-borderless printing mode (setting), if a user sets one of the modes each time printing is performed, the number of work steps increases to take time and labor for operation. Therefore, in order to save time and labor, the image forming instruction device 1900 determines which one of the borderless printing mode and the non-borderless printing mode is more effective setting, and preferentially sets the mode according to the determination result.

In the first exemplary embodiment, the image forming device 200 does not necessarily need to be capable of performing both of the borderless printing and the non-borderless printing (so-called border printing).

The print data reception module 1905 is connected to an outer edge checking module 1915 and an image generating process detection module 1920 of the print attribute setting module 1910, and the print instruction module 1935. The print data reception module 1905 receives print data to be printed by the image forming device 200 and passes the print data to the outer edge checking module 1915, the image generating process detection module 1920 and the print instruction module 1935. The phase "receiving print data" used herein is meant to include, for example, reading an image with a scanner, a camera or the like, receiving an image from an external device via a communication line with a facsimile or the like, reading out an image stored in a hard disk (including one connected to the image forming instruction device 1900 via a communication line and one built in the image forming instruction device 1900) or the like, etc. The print data may be either a binary image or a multivalued image (including a color image). The number of print data received may be one or more. Further, the contents of print data may include a document used for business, a pamphlet for advertisement promotion, or the like.

The print attribute setting module 1910 includes the outer edge checking module 1915, the image generating process detection module 1920, a selection module 1925 and a presentation module 1930 and is connected to the print instruction module 1935. The print attribute setting module 1910 is one to set a print attribute in a case where the image forming device 200 is caused to perform printing, and for example, one to set either the borderless printing or the non-borderless printing as a print attribute. Further, the print attribute setting module 1910 determines whether or not the image forming device 200 can be set to both of the borderless printing and the non-borderless printing. If both can be set, the print attribute setting module 1910 causes each module in the print attribute setting module 1910 to perform a process. If cannot (e.g., if the image forming device 200 can perform only one of the borderless printing and the non-borderless printing), the setting of the print attributes (e.g., the number of copies to be printed, paper size, monochrome/color printing, etc.) in a general printing device may be set.

The outer edge checking module 1915 is connected to the print data reception module 1905 and the selection module 1925. The outer edge checking module 1915 checks whether or not there is an image to be printed on the outer edge of the print data received by the print data reception module 1905. The term "outer edge of the print data" used herein refers to a peripheral portion of the print data, which corresponds to an edge of a medium when the print data is printed on the medium. That is, it is determined by the positional relationship between the area of the print data and the medium on which it is printed.

The area of the print data need not be limited to a rectangle, but when it is a rectangle, the outer edge is the edge portion of four sides of the rectangle. The following description will be given with a rectangle as an example. Specifically, the following description will be made using the example of FIGS. 23A to 23C. Further, the term "medium" used herein is meant to include one on which printing is performed (one onto which print data is transferred), such as paper, resin, or cloth, which is generally referred to as a sheet.

The image generating process detection module 1920 is connected to the print data reception module 1905 and the selection module 1925. The image generating process detection module 1920 detects a process of generating the print data received by the print data reception module 1905. The generating process may include generating print data by taking a screenshot. As a detection method, for example, when an image generating process is included as an attribute of the print data, the image generating process may be extracted. Further, it is not limited to the attribute of the print data but may be extracted from other data or the like. For example, the generating process may be detected from a print data generating operation (e.g., an operation of a finger on a touch panel or an operation of a pointer such as a mouse) from a print data generating device (which may be included in the image forming instruction device 1900). Further, the generating process may be detected from an operation log (operation history) for generating print data.

The selection module 1925 is connected to the outer edge checking module 1915 and the image generating process detection module 1920. The selection module 1925 selects either a setting for borderless printing or a setting for non-borderless printing, based on the print data.

In addition, based on an image on the outer edge of the print data, the selection module 1925 may select either the setting for borderless printing or the setting for non-borderless printing. The phrase "based on an image on the outer edge of the print data" used herein means a result of detection by the outer edge checking module 1915.

Further, when there is an image on the outer edge of the print data, the selection module 1925 may select the setting for borderless printing. The phrase "when there is an image on the outer edge of the print data" used herein refers to a case where there is print data to be printed on the outer edge of a medium.

Further, when there is no image on the outer edge of the print data, the selection module 1925 may select the setting for non-borderless printing.

In addition, the selection module 1925 may select the setting for borderless printing or the setting for non-borderless printing for each edge of the print data. When the print data is rectangular, the selection module 1925 may select the setting for borderless printing or the setting for non-borderless printing for each side (each of the four sides).

In addition, the selection module 1925 may select one of the setting for borderless printing and the setting for non-borderless printing based on the print data generating process.

Further, when the print data is an image generated by taking a screenshot, the selection module 1925 may select the setting for borderless printing. Then, when the print data is generated by a method other than taking a screenshot (e.g., in a case where the print data is a document or the like created by a document creation program), the selection module 1925 may select the setting for non-borderless printing.

The presentation module 1930 presents the selection result by the selection module 1925. As the selection result, there is one of the setting for borderless printing and the setting for non-borderless printing.

In addition, the presentation module 1930 may present the selection result by the selection module 1925 in such a manner that it can be changed by an operator. Specifically, the operation to change by the operator may include changing the setting for borderless printing, which is the selection result by the selection module 1925, to the setting for non-borderless printing and conversely, changing the setting for non-borderless printing, which is the selection result by the selection module 1925, to the setting for borderless printing.

The print instruction module 1935 is connected to the print data reception module 1905 and the print attribute setting module 1910. In accordance with the setting of the print attribute by the print attribute setting module 1910, the print instruction module 1935 generates a print instruction (also referred to as a print job) that causes the image forming device 200 to print the print data received by the print data reception module 1905 and passes the print instruction to the image forming device 200.

Further, in a case where the setting for borderless printing and the setting for non-borderless printing are mixed in the print data, the print instruction module 1935 may generate an image having a leading edge that is set to the setting for non-borderless printing. When the print data is rectangular, the print instruction module 1935 may generate an image having a leading side that is set to the setting for non-borderless printing.

In addition, the print instruction module 1935 may rotate the print data so as to generate an image having a leading edge that is set to the setting for non-borderless printing. When the print data is rectangular, the print instruction module 1935 may generate an image having a leading side that is set to the setting for non-borderless printing.

Figure 20A:
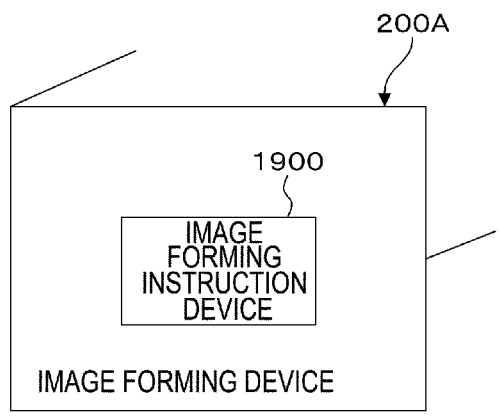
FIGS. 20A and 20B are explanatory views illustrating a system configuration example using the second exemplary embodiment.
Figure 20B:
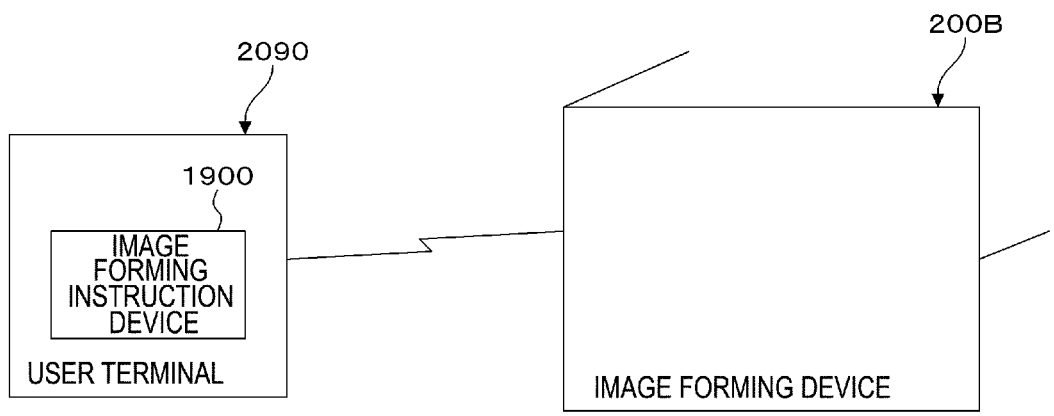

FIGS. 20A and 20B are explanatory views illustrating a system configuration example using the second exemplary embodiment. Here, the image forming device 200 is a printing device capable of performing both of the borderless printing and the non-borderless printing. The image forming device 200 will be described later with reference to FIG. 31 and subsequent figures.

An image forming device 200A illustrated in the example of FIG. 20A includes an image forming instruction device 1900. That is, FIG. 20A illustrates a case where the image forming instruction device 1900 is incorporated as a part of a control unit of an operation panel of the image forming device 200. The image forming device 200A performs printing in accordance with a print instruction from the image forming instruction device 1900.

A user terminal 2090 illustrated in the example of FIG. 20B includes an image forming instruction device 1900. An image forming device 200B and the user terminal 2090 are interconnected via a communication line. Here, the communication line may be wireless, wired or a combination thereof, and examples thereof include the Internet as an infrastructure for communication, an intranet, etc. The user terminal 2090 may be, for example, a notebook PC, a portable information communication terminal or the like. The image forming device 200B performs printing in accordance with a print instruction from the user terminal 2090.

Figure 21:
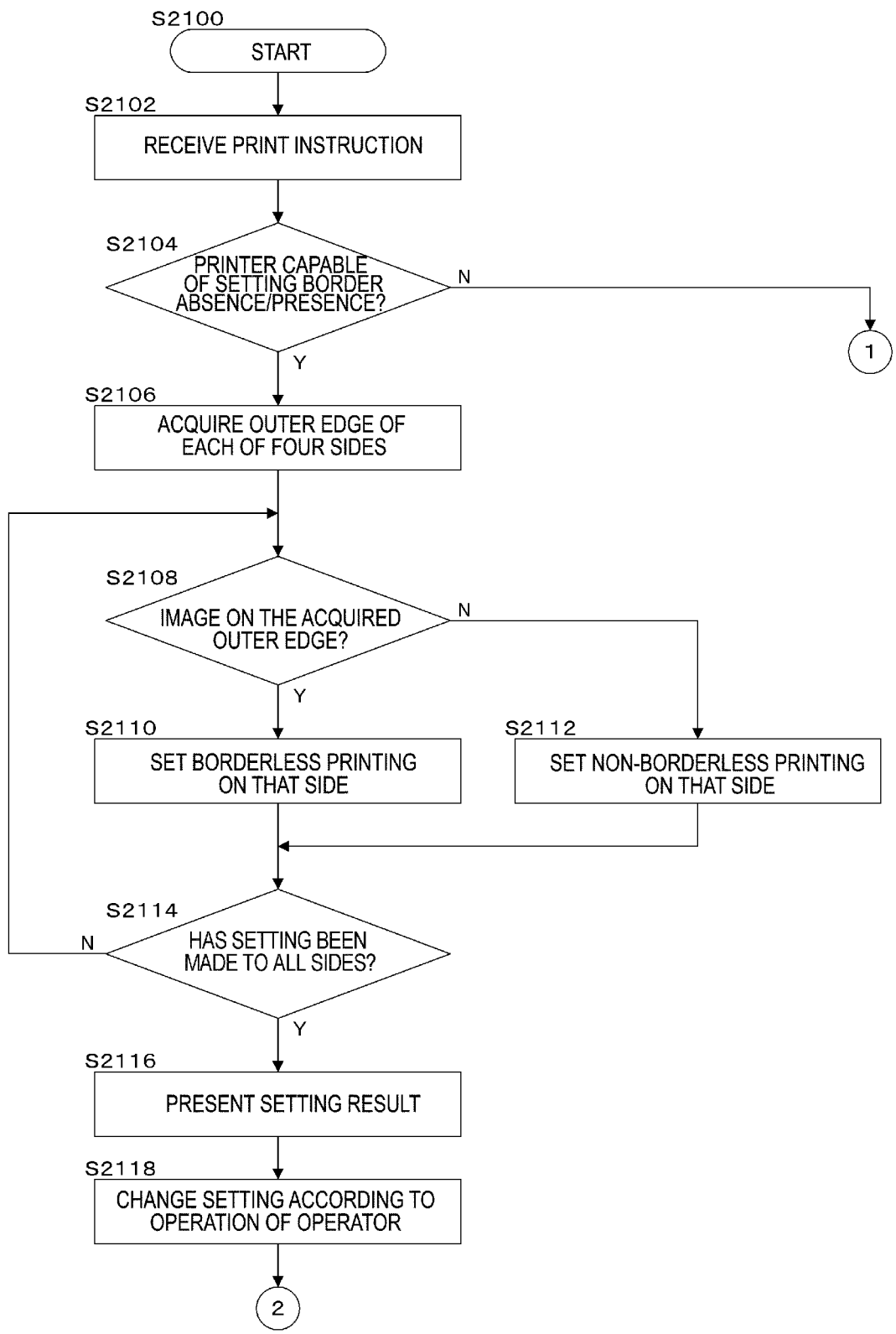
FIG. 21 is a flowchart illustrating a process example according to the second exemplary embodiment.
Figure 22:
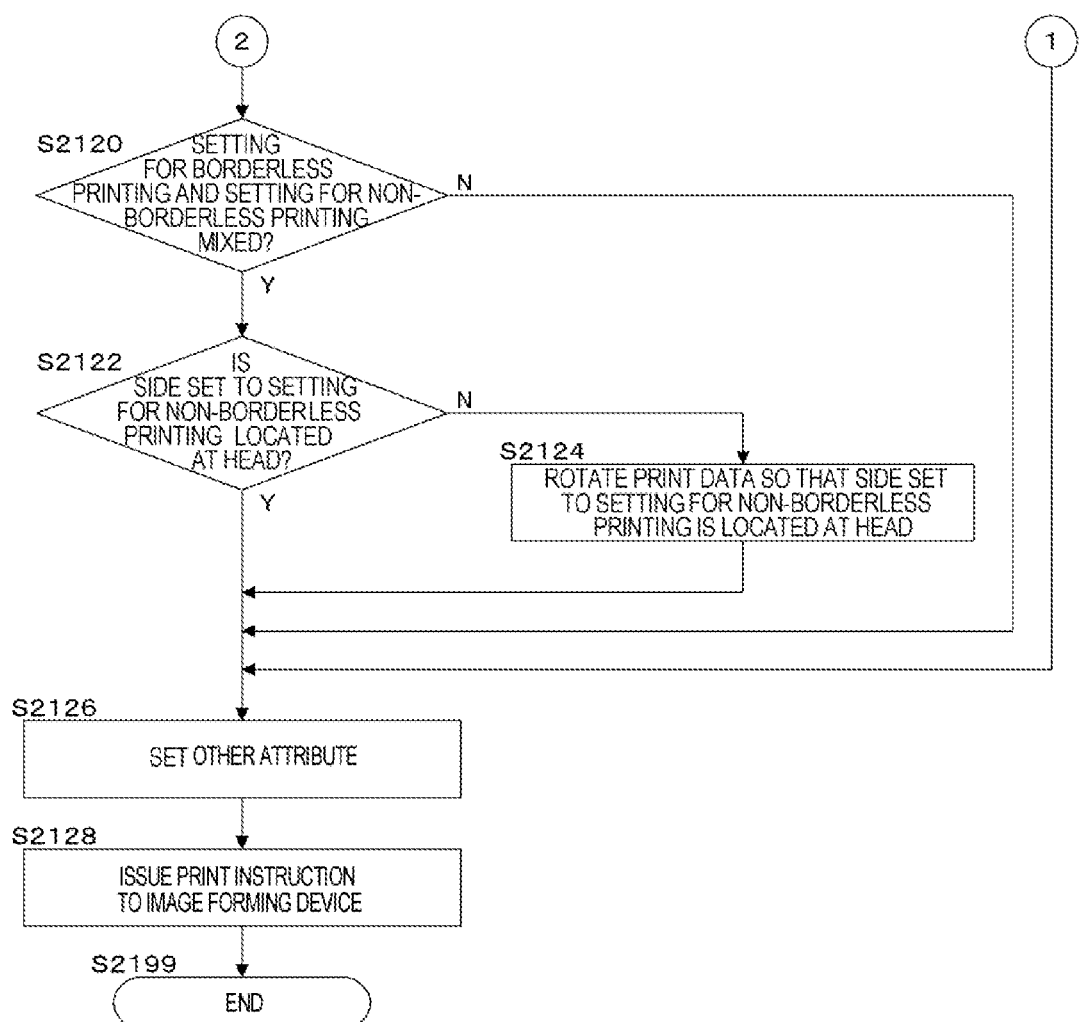
FIG. 22 is a flowchart illustrating a process example according to the second exemplary embodiment.

FIGS. 21 and 22 are flowcharts illustrating an example of a process according to the second exemplary embodiment.

In step S2102, the print data reception module 1905 receives a print instruction.

In step S2104, the print attribute setting module 1910 determines whether or not an image forming device is a printing device capable of setting border absence/presence (borderless printing/non-borderless printing). When it is determined that the image forming device is a printer capable of setting border absence/presence, the process proceeds to step S2106. Otherwise, the process proceeds to step S2126.

Figure 23A:
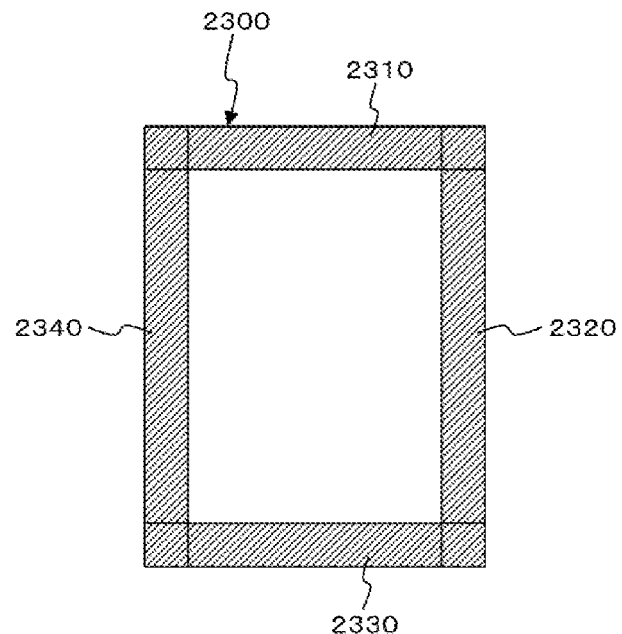
FIGS. 23A to 23C are explanatory views illustrating an example of an outer edge of an object to be processed according to the second exemplary embodiment.
Figure 23B:
Figure 23C:
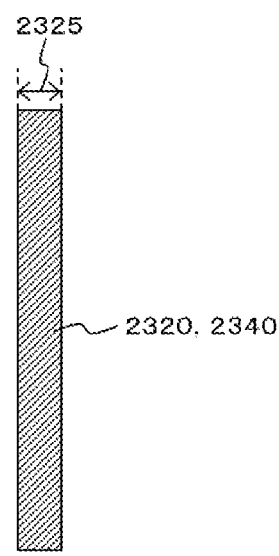

In step S2106, the outer edge checking module 1915 acquires the outer edge of each of the four sides. For example, FIGS. 23A to 23C are explanatory views illustrating an example of the outer edge of a processing target according to the second exemplary embodiment. As illustrated in the example of FIG. 23A, print data 2300 includes an outer edge 2310, an outer edge 2320, an outer edge 2330 and an outer edge 2340. As illustrated in the examples of FIGS. 23B and 23C, widths 2315 of the outer edge 2310 and the outer edge 2330 and widths 2325 of the outer edge 2320 and the outer edge 2340 are the widths of edge portions for non-borderless printing. In the example of FIG. 23B, the width 2315 of the outer edge 2310 and the width 2315 of the outer edge 2330 are the same, but may have different values. Similarly, in the example of FIG. 23C, the width 2325 of the outer edge 2320 and the width 2325 of the outer edge 2340 are the same, but may have different values.

In step S2108, the outer edge checking module 1915 determines whether or not there is an image on the acquired outer edge. When it is determined that there is an image, the process proceeds to step S2110. Otherwise, the process proceeds to step S2112. In the example of FIGS. 23A to 23C, it may be determined whether or not there are images to be printed on the outer edge 2310, the outer edge 2320, the outer edge 2330 and the outer edge 2340. The outer edge 2310, the outer edge 2320, the outer edge 2330 and the outer edge 2340 may be areas in a medium to be printed.

In step S2110, the selection module 1925 sets the borderless printing on that side.

In step S2112, the selection module 1925 sets the non-borderless printing on that side.

In step S2114, the selection module 1925 determines whether or not the setting has been made to all sides. When it is determined that the setting has been made to all sides, the process proceeds to step S2116. Otherwise, the process returns to step S2108.

In step S2116, the presentation module 1930 presents the setting result. For example, the presentation module 1930 makes presentation as illustrated in FIG. 24 or FIG. 25.

Figure 24:
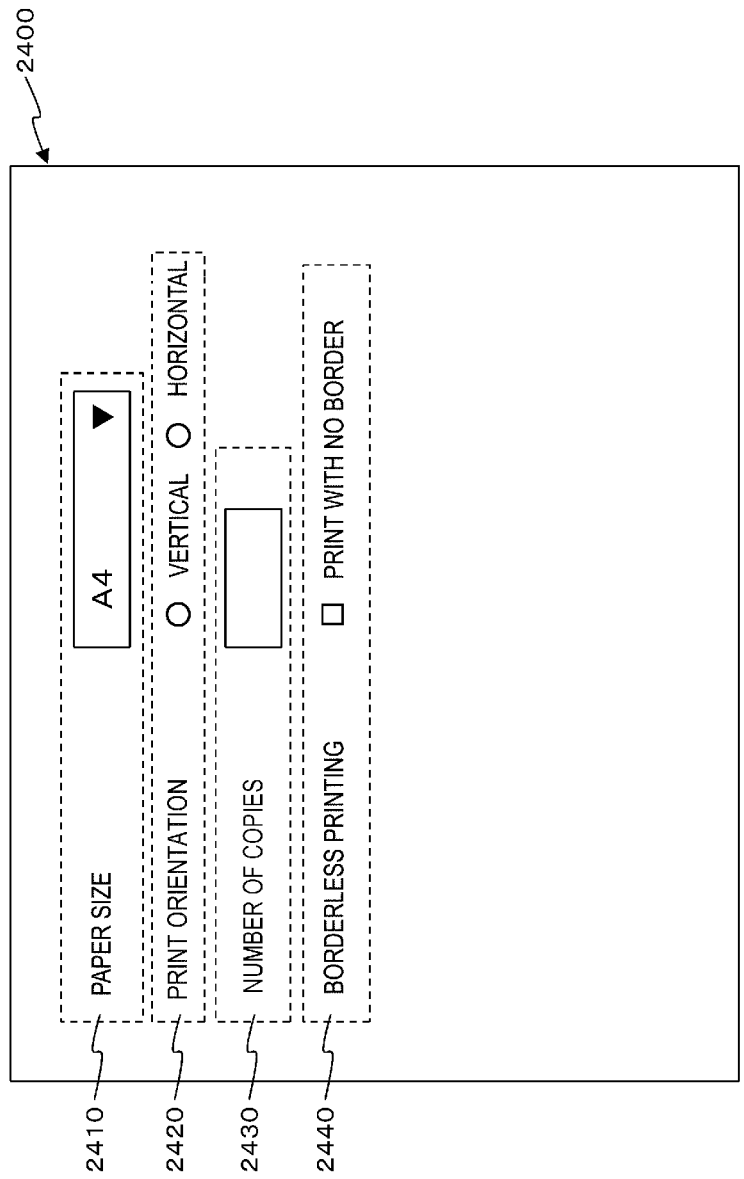
FIG. 24 is an explanatory view illustrating an example of presentation of a screen according to the second exemplary embodiment.

FIG. 24 is an explanatory diagram illustrating an example of the display of a screen 2400 according to the second exemplary embodiment. This example illustrates an example of presentation in a case where all sides are set to the non-borderless printing.

A paper size designation field 2410, a print orientation designation field 2420, a number-of-copy designation field 2430 and a borderless printing designation field 2440 are displayed on the screen 2400. In the borderless printing designation field 2440, since all sides are set to the non-borderless printing, "borderless printing" is not selected.

Figure 25:
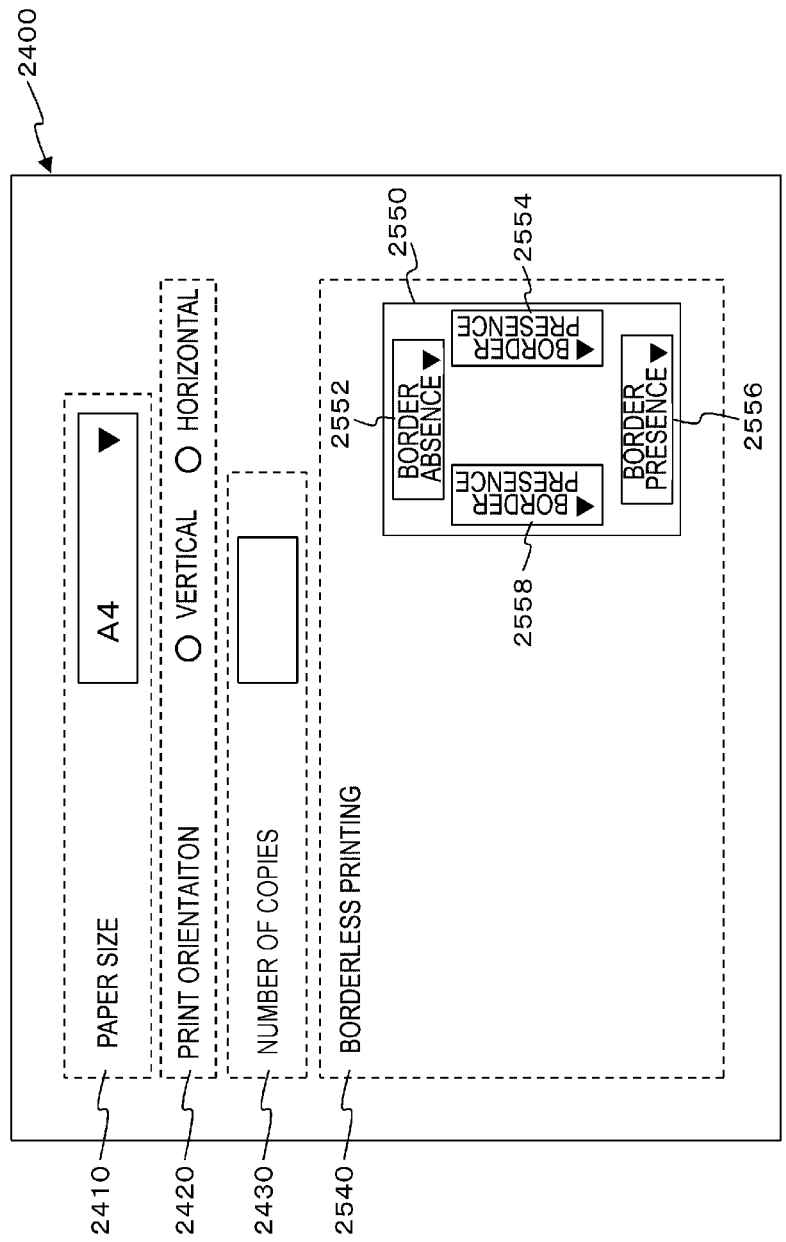
FIG. 25 is an explanatory view illustrating an example of presentation of a screen according to the second exemplary embodiment.

FIG. 25 is an explanatory diagram illustrating an example of the display of a screen 2400 according to the second exemplary embodiment. This example illustrates an example of presentation in a case where a side set to the borderless printing and a side set to the non-borderless printing are mixed.

A paper size designation field 2410, a print orientation designation field 2420, a number-of-copy designation field 2430 and a borderless printing designation field 2540 are displayed on the screen 2400. A thumbnail image 2550 of print data is displayed in the borderless printing designation field 2540. The thumbnail image 2550 has a border absence/presence setting area 2552, a border absence/presence setting area 2554, a border absence/presence setting area 2556 and a border absence/presence setting area 2558. Here, the border absence/presence setting area 2552 (upper side) is set to "border absence," the border absence/presence setting area 2554 (right side) is set to "border absence," the border absence/presence setting area 2556 (lower side) is set to "border presence," and the border absence/presence setting area 2558 (left side) is set to "border presence."

In step S2118, the presentation module 1930 changes the setting according to the operation of the operator. In the example of FIG. 24, a selection of "borderless printing" may be received in response to a user's operation in the borderless printing designation field 2440. That is, even after it is determined that "non-borderless printing" is appropriate, "non-borderless printing" may be changed to "borderless printing" by the user's operation. In the example of FIG. 25, a change in the selection of "borderless printing" or "non-borderless printing" for each side can be received in response to the user's operation. That is, for each side, even after it is determined that "borderless printing" or "non-borderless printing" is appropriate, a change from "non-borderless printing" to "borderless printing" or from "borderless printing" to "non-borderless printing" for each side is performed by the user's operation.

In step S2120, the print instruction module 1935 determines whether or not the setting for borderless printing and the setting for non-borderless printing are mixed in one medium. When it is determined that they are mixed, the process proceeds to step S2122. Otherwise, the process proceeds to step S2126.

In step S2122, the print instruction module 1935 determines whether or not a side that is set to the setting for non-borderless printing is located at the head. When it is determined that the side that is set to the setting for non-borderless printing is located at the head, the process proceeds to step S2126. Otherwise, the process proceeds to step S2124. Here, the head refers to a side on which an image is first formed in a medium to be printed.

In step S2124, the print instruction module 1935 rotates the print data so that the side that is set to the setting for non-borderless printing is located at the head. In a case where a side that is set to the setting for borderless printing is located at the head, there is a possibility that contamination of an image (e.g., contamination caused by toner sticking out from the edge of a medium) spreads over the entire medium. Therefore, the print data is rotated so that a side that is set to the setting for non-borderless printing is located at the head.

In step S2126, the print attribute setting module 1910 sets other attributes. The settings for the paper size designation field 2410, the print orientation designation field 2420, the number-of-copy designation field 2430 and the like illustrated in the example of FIG. 24 correspond to the other attributes.

In step S2128, the print instruction module 1935 issues a print instruction to the image forming device 200. For example, the print instruction module 1935 generates a print instruction table 2600 and passes it to the image forming device 200 as a print job. FIG. 26 is an explanatory view illustrating an example of the data structure of the print instruction table 2600. The print instruction table 2600 has a print instruction field 2610, a print data field 2620, a paper size field 2630, a print orientation field 2640, a number-of-copy field 2650, a borderless printing field 2660 and the like. The borderless printing field 2660 has an upper side field 2662, a right side field 2664, a lower side field 2666 and a left side field 2668.

The print instruction field 2610 stores a print instruction. The print data field 2620 stores print data to be printed. The paper size field 2630 stores the size of a paper to be printed. The print orientation field 2640 stores a print orientation. The number-of-copy field 2650 stores the number of copies to be printed. The borderless printing field 2660 stores information as to whether or not the borderless printing is set. The upper side field 2662 stores information as to whether or not the upper side is borderless printing. The right side field 2664 stores information as to whether or not the right side is borderless printing. The lower side field 2666 stores information as to whether or not the lower side is borderless printing. The left side field 2668 stores information as to whether or not the left side is borderless printing. Of course, information as to whether or not the entire paper, rather than each side, is set to the setting for borderless printing (information indicating borderless printing when there is borderless printing even on one side) may be stored.

Figure 27:
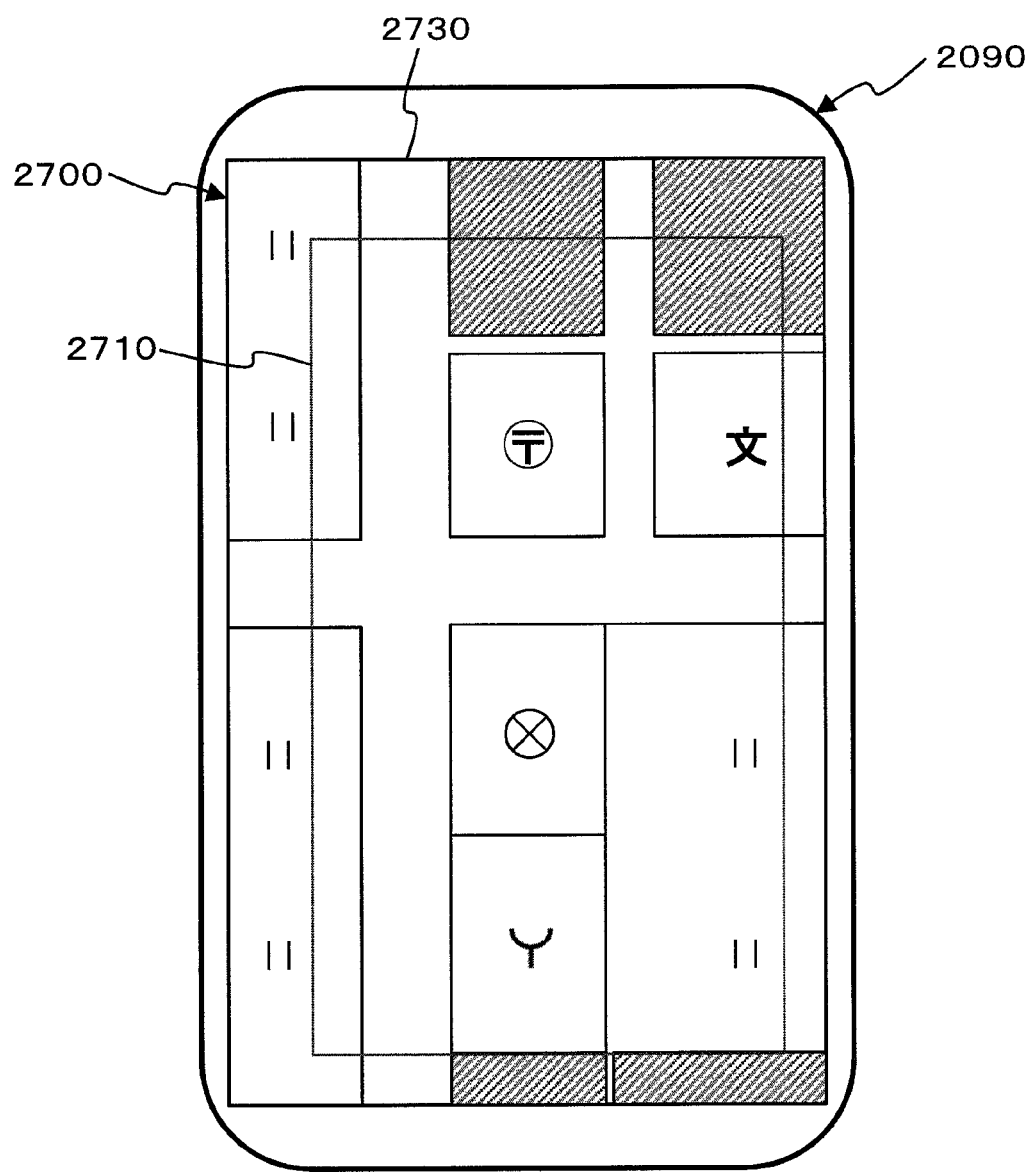
FIG. 27 is an explanatory view illustrating a process example according to the second exemplary embodiment.

FIG. 27 is an explanatory view illustrating an example of a process according to the second exemplary embodiment.

When a user clips a portion of an image displayed on a screen 2700 of the user terminal 2090, which is a PC, a smartphone or the like, is clipped and gives an instruction to print, most of the clipped data has an image up to the edge portions thereof. In the example of FIG. 27, when a print instruction area 2710 is designated, there are images at the edges of the print instruction area 2710, respectively, and the borderless printing should be set. That is, by preferentially setting the setting for borderless printing and outputting a print setting screen, it is possible to reduce the operation until a print instruction is issued. As a matter of course, if no print instruction area 2710 is designated, the entire image displayed on the screen 2700 may be taken as a print target.

In particular, when the print data is generated by taking a screenshot, since the above is often applicable (there are images up to the edge portions), the setting for borderless printing may be defaulted. Specifically, instead of the processing from step S2106 to step S2114 in the flowcharts illustrated in the examples of FIGS. 21 and 22, it is determined whether or not the print data is generated by taking a screenshot. When it is determined that the print data is generated by taking a screenshot, the setting for borderless printing may be selected. When it is determined that the print data is not generated by taking a screenshot, the setting for non-borderless printing may be selected.

Figure 28:
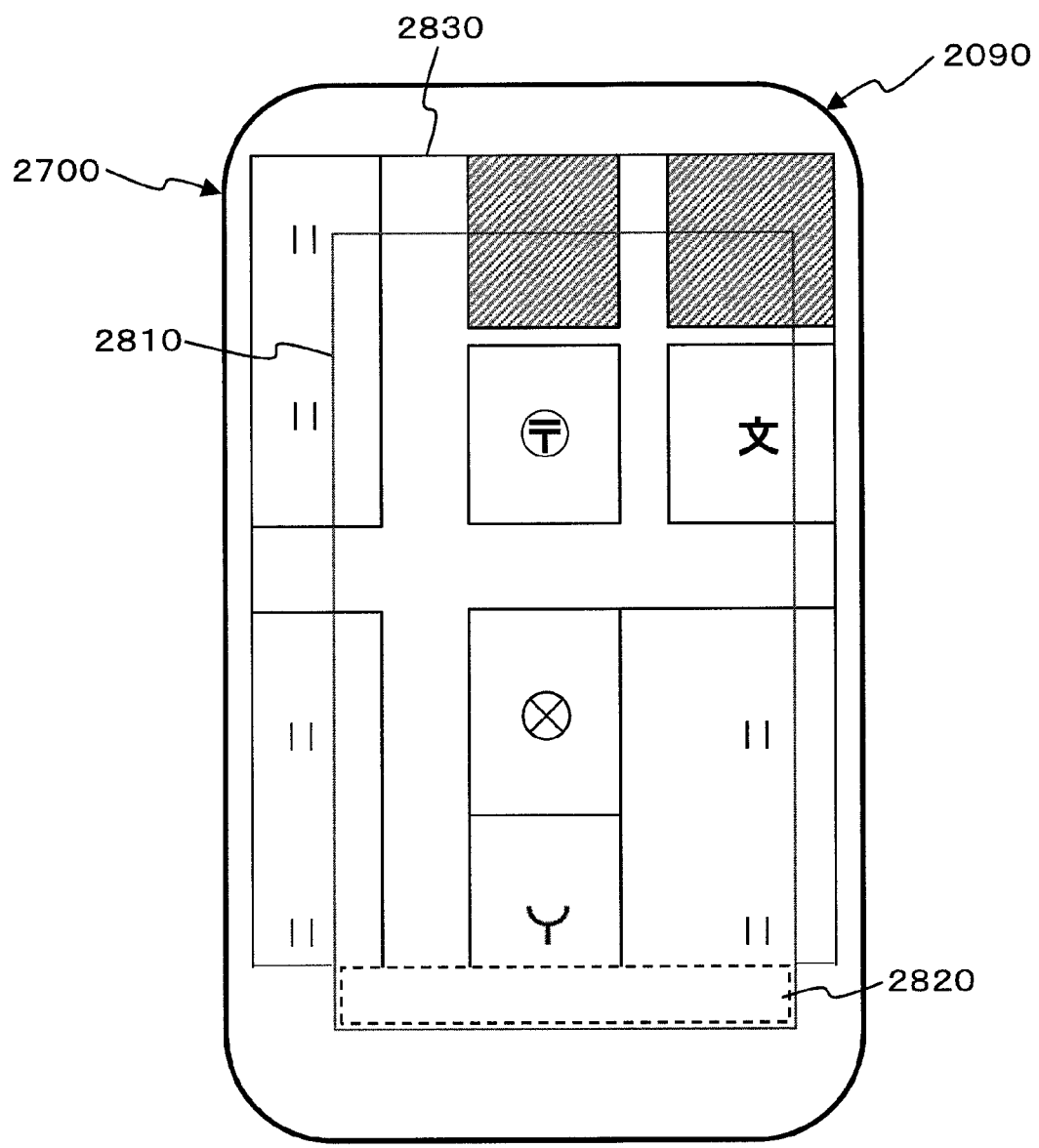
FIG. 28 is an explanatory view illustrating a process example according to the second exemplary embodiment.

FIG. 28 is an explanatory view illustrating an example of a process according to the second exemplary embodiment. When the image forming device 200 can perform "borderless printing" or "non-borderless printing" for each side, the "setting for borderless printing" or the "setting for non-borderless printing" may be made for each side.

In the example of FIG. 28, when a print instruction area 2810 is designated for an image 2830 displayed on the screen 2700, there are images on three sides (upper side, right side and left side) of the print instruction area 2810, and there is a blank area 2820 on the lower side. In this case, a print instruction is issued with only the lower side (trailing end) being set to the setting for non-borderless printing and the other sides being set to the setting for borderless printing.

Figure 29:
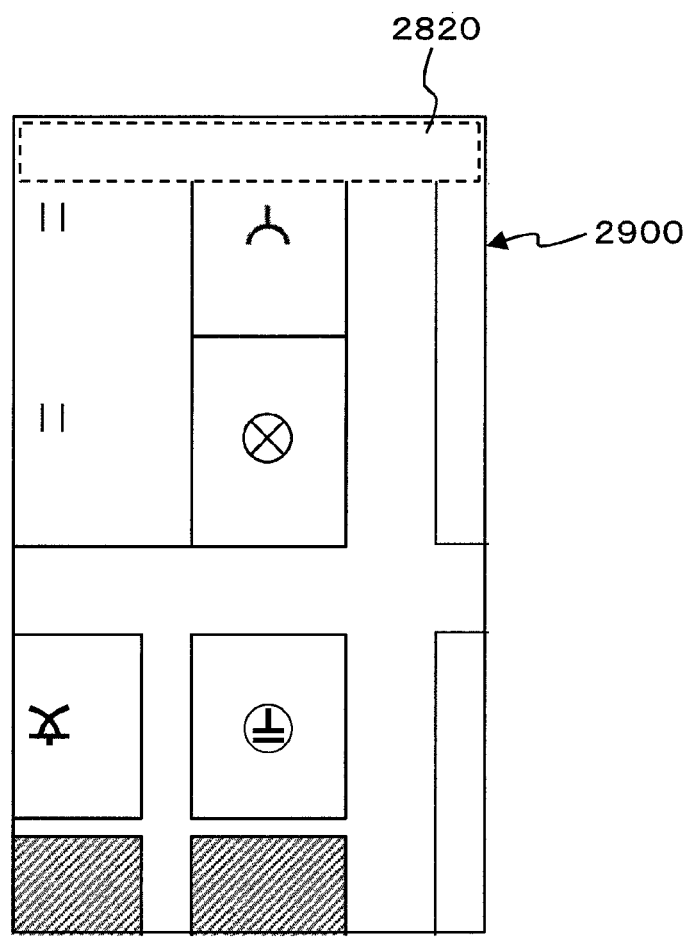
FIG. 29 is an explanatory view illustrating a process example according to the second exemplary embodiment.

FIG. 29 is an explanatory view illustrating an example of a process according to the second exemplary embodiment. In the example of FIG. 28, only the lower side (trailing end) is set to the setting for non-borderless printing and the others sides are set to the setting for borderless printing. However, as described above, when the upper side (leading end) is set to the setting for borderless printing, contamination tends to occur in the entire medium (particularly the leading end portion thereof) due to toner sticking out from the edge. Therefore, in a case where sides that are set to the setting for borderless printing is set and sides that are set to the setting for non-borderless printing are mixed, the print data is rotated so that a side that is set to the setting for non-borderless printing is located at the leading end.

Print data 2900 illustrated in the example of FIG. 29 is obtained by rotating the image 2830 in the print instruction area 2810 illustrated in FIG. 28 by 180 degrees. Therefore, the blank area 2820 is located at the upper portion of the print data 2900. As a result, since non-borderless printing is performed at the upper end, the toner sticking out from the edge of the upper end becomes smaller than that in at least the borderless printing, thereby preventing contamination.

Figure 30:
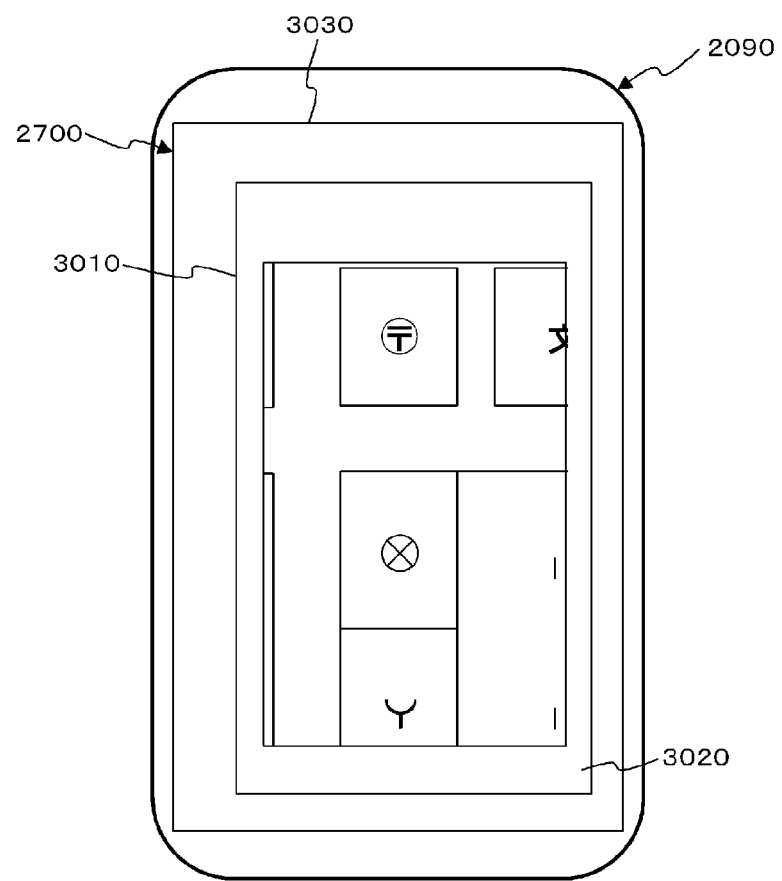
FIG. 30 is an explanatory view illustrating a process example according to the second exemplary embodiment.

FIG. 30 is an explanatory view illustrating an example of a process according to the second exemplary embodiment. When there are no images on all sides, the setting for non-borderless printing is set. In the example of FIG. 30, when a print instruction area 3010 is designated for an image 3030 displayed on the screen 2700, since there is no image on each side of the print instruction area 3010 (surrounded by a blank area 3020), a print instruction is issued with the setting for non-borderless printing.

The image forming device 200 according to the second exemplary embodiment has a printing function and generally corresponds to a printer, a copying machine, a multi-function peripheral (an image processing device having at least one function of a printer and a copying machine and having plural functions such as a scanner and a facsimile), and the like.

Figure 31:
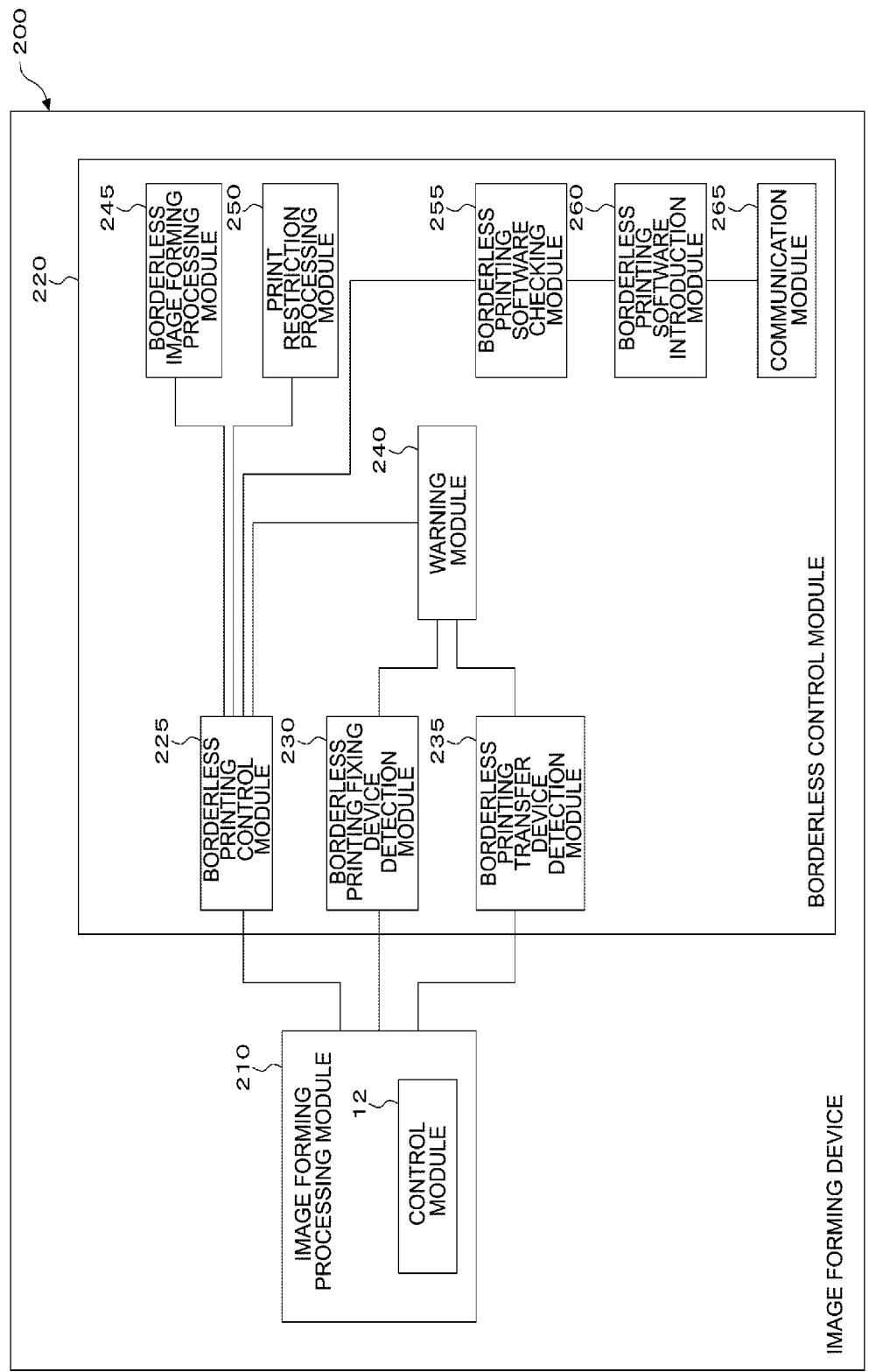
FIG. 31 is a conceptual module configuration diagram of a configuration example of the second exemplary embodiment.

As illustrated in the example of FIG. 31, the image forming device 200 has an image forming processing module 210 and a borderless control module 220. In the image forming device 200, a fixing device for borderless printing or a transfer device for borderless printing is replaceable. Only the fixing device for borderless printing may be replaceable, or only the transfer device for borderless printing may be replaceable, or both of the fixing device for borderless printing and the transfer device for borderless printing may be replaceable. The phrase "replacing (setting or mounting) a fixing device for borderless printing" means replacing a fixing device not for borderless printing (a general fixing device for non-borderless printing) with a fixing device for borderless printing and vice versa. The phrase "replacing a transfer device for borderless printing" means replacing a transfer device not for borderless printing (a general transfer device for non-borderless printing) with a transfer device for borderless printing and vice versa.

The image forming device 200 is capable of performing the borderless printing. In a case where a fixing device for borderless printing and a transfer device for borderless printing are attached to the image forming device 200, the borderless printing can be performed with a high image quality. Even when one or more of a fixing device for borderless printing and a transfer device for borderless printing are not attached to the image forming device 200, the borderless printing itself is possible. However, as compared with the case where both of them are attached, this may cause reduction of the image quality or damage of the image forming device 200. Further, it is difficult to recognize from the outside whether or not a fixing device for borderless printing and a transfer device for borderless printing are attached to the image forming device 200. An example of a difference between a fixing device for borderless printing or a transfer device for borderless printing and a general fixing device or a general transfer device is a cleaning mechanism.

In a case where designation is made to use the borderless printing function, the image forming device 200 determines whether or not the fixing device or the transfer device is one for borderless printing, and issues a warning when the fixing device or the transfer device is not for borderless printing. Of course, depending on the user's operation, the borderless printing is performed despite the warning.

The image forming processing module 210 has a control module 12 and is connected to a borderless printing control module 225, a borderless printing fixing device detection module 230 and a borderless printing transfer device detection module 235 of the borderless control module 220. The image forming processing module 210 performs image forming processing in the image forming device 200. Specifically, a printing process is performed in accordance with a user's operation, a print instruction from the user terminal 2090 or the like. When the print instruction includes designation of the borderless printing, the borderless control module 220 is caused to perform the process. Each side of a medium to be printed may be set to the borderless printing. Therefore, the setting for borderless printing and the setting for non-borderless printing may be mixed. In that case, a fixing device for borderless printing or a transfer device for borderless printing may be used.

The control module 12 controls the image forming processing module 210 to perform the image forming processing.

The detailed process (particularly, borderless printing process) of the image forming processing module 210 and the control module 12 will be described later with reference to examples of FIG. 33 to FIG. 35C.

The borderless control module 220 includes the borderless printing control module 225, the borderless printing fixing device detection module 230, the borderless printing transfer device detection module 235, a warning module 240, a borderless image forming processing module 245, a print restriction processing module 250, a borderless printing software checking module 255, a borderless printing software introduction module 260 and a communication module 265. The borderless control module 220 executes a process for a case where designation of borderless printing is included in the print instruction.

The borderless printing control module 225 is connected to the image forming processing module 210, the warning module 240, the borderless image forming processing module 245, the print restriction processing module 250 and the borderless printing software checking module 255. The borderless printing control module 225 controls the modules in the borderless control module 220 according to an instruction from the image forming processing module 210.

The borderless printing fixing device detection module 230 is connected to the image forming processing module 210 and the warning module 240. The borderless printing fixing device detection module 230 detects whether or not there is a fixing device for borderless printing in the image forming processing module 210. Further, as a fixing device for borderless printing, a cleaner unit attached to the fixing device may be detected.

The borderless printing transfer device detection module 235 is connected to the image forming processing module 210 and the warning module 240. The borderless printing transfer device detection module 235 detects whether or not there is a transfer device for borderless printing in the image forming processing module 210. Further, as a transfer device for borderless printing, a cleaner unit attached to the transfer device may be detected.

The borderless printing fixing device detection module 230 and the borderless printing transfer device detection module 235 may make the detections depending on whether or not information (flag or attribute information) indicating that a fixing device for borderless printing and a transfer device for borderless printing are set is stored in a predetermined memory area. This memory area may be in a memory unit provided in the fixing device or the transfer device or may be in a memory unit in the image forming device 200. In addition, whether or not a fixing device for borderless printing and a transfer device for borderless printing are set may be detected by a sensor. Examples of the sensor include an optical sensor, a magnetic sensor, a mechanical switch or the like. When the fixing device for borderless printing and the transfer device for borderless printing are set, the sensor is turned ON (or OFF). Upon reception of this, the determination may be made. Particularly, in a case where the above described memory area is not provided, the detections may be made by the sensor.

The warning module 240 is connected to the borderless printing control module 225, the borderless printing fixing device detection module 230, and the borderless printing transfer device detection module 235. The warning module 240 issues a warning when the borderless printing function is used and when the fixing device or the transfer device is not for borderless printing. The phrase "when the borderless printing function is used" corresponds to a case of receiving a print instruction including designation of the borderless printing from the user's operation, the user terminal 2090 or the like, as described above. The phrase "when the fixing device or the transfer device is not for borderless printing" corresponds to when the borderless printing fixing device detection module 230 does not detect that the fixing device for borderless printing is set or when the borderless printing transfer device detection module 235 does not detect that the transfer device for borderless printing is set. Variations of "when the fixing device or the transfer device is not for borderless printing" include "when the fixing device is not for borderless printing," "when the transfer device is not for borderless printing" and "when both of the fixing device and the transfer device are not for borderless printing." In a case where the image forming device 200 itself can execute the borderless printing of a high image quality with only the fixing device for borderless printing (not a transfer device for borderless printing but a general transfer device), only "when the fixing device is not for borderless printing" is sufficient. In a case where the image forming device 200 itself can perform the borderless printing of a high image quality with only the transfer device for borderless printing (not a fixing device for borderless printing but a general fixing device), only "when the transfer device is not for borderless printing" is sufficient. Alternatively, when only the fixing device for borderless printing is replaceable in the image forming device 200 (the transfer device cannot be replaced), only "when the fixing device is not for borderless printing" is sufficient. When only the transfer device for borderless printing is replaceable in the image forming device 200 (the fixing device cannot be replaced), only "when the transfer device is not for borderless printing" is sufficient.

The warning may include an output as a 3D (Dimensions) image in addition to displaying the warning content on a display device such as a liquid crystal display and may further include outputting of an alarm sound (including a warning voice) to a sound output device such as a speaker, a vibration, or a combination thereof.

The borderless image forming processing module 245 is connected to the borderless printing control module 225. When a fixing device for borderless printing or a transfer device for borderless printing is not attached and when a designation of the borderless printing function is received, the borderless image forming processing module 245 executes another image forming process different from that in the case where the fixing device for borderless printing and the transfer device for borderless printing are attached. The determination about "a fixing device for borderless printing or a transfer device for borderless printing is not attached" may be made based on the detection results by the borderless printing fixing device detection module 230 and the borderless printing transfer device detection module 235, as described above. The phrase "when a designation of a borderless printing function is received" corresponds to a case where a print instruction including a designation of the borderless printing is received from the user's operation, the user terminal 2090, etc. as described above.

The "different image forming process" may include lowering the density of an image of a peripheral portion which is an edge. The peripheral portion corresponds to four sides of a paper (portions having a predetermined width from the edge) which are not printed in general printing (non-borderless printing). By lowering the density of an image printed on the peripheral portion, the amount of toner that needs cleaning is reduced. For example, the density is reduced to 80% of the original density. Further, instead of uniformly lowering the density of the peripheral portion, the amount of lowered density may be increased toward the edge. Furthermore, instead of lowering the density of all the four sides, the density of only an edge portion of a leading end portion in a paper transport direction or the four sides which are side edges of a paper may be selectively lowered. Further, when the density of the images of the four sides is equal to or less than a predetermined density, the process of lowering the density may not be performed.

Further, as the "different image forming process," the cleaning of the transfer device or the fixing device may execute more frequently than in the case where the fixing device for borderless printing and the transfer device for borderless printing are mounted. For example, in the case of borderless printing, the number of times of cleaning may be increased. In addition, in order to increase the number of times of cleaning, only the paper may be transported without image formation after the borderless printing (the paper may be processed by the fixing device and the transfer device so that the paper adsorbs the residual toner, which is the cause of contamination). Of course, when it is not possible to make idle rotation without image formation, an image close to the ground color of the paper (a white image for a white paper) or a transparent clear image may be formed and a cleaning operation may be performed with the formed image. Further, it is also possible to use a paper of a size larger than the size of a paper for which the borderless printing is performed. This is because the borderless printing is to print an image that sticks out from the paper. Further, the cleaning process may be performed for each borderless printing or for each print job.

Further, when the borderless printing is performed continuously with the same size, it may be controlled not to perform an increased cleaning process. However, after the last printing, an increased cleaning process is performed. Further, when the next borderless printing is performed with a size smaller than the paper size of the previous borderless printing, it may be controlled not to perform an increased cleaning process. However, after the last printing, an increased cleaning process is performed. Conversely, when the next borderless printing is performed with a size larger than the paper size of the previous borderless printing, it may be controlled to perform the increased cleaning process.

The print restriction processing module 250 is connected to the borderless printing control module 225. When a warning is issued by the warning module 240, the print restriction processing module 250 restricts the use of the borderless printing function. The "restriction on the use of the borderless printing function" may be the restriction on the number of times of use or the restriction on the user. The restriction on the number of times of use is to control not to permit "the use of the borderless printing function" when the number of times the borderless printing function is used is equal to or more than a predetermined threshold value. The restriction on the number of times of use includes, for example, the restriction on the number of printed copies, the restriction on the number of times of use for each paper size, the restriction on the number of times of use per monochrome/color, and the like. The restriction on the user is to control so that "the use of the borderless printing function" is permitted for only a predetermined user. The restriction on the user includes, for example, identification by a user ID (Identification), identification by a user's role (specifically, a group leader, a designer, etc.), and the like. A combination of the restriction on the number of times of use and the restriction on the user may be used. For example, the restriction on the number of times of use may be set for each user ID.

The borderless printing software checking module 255 is connected to the borderless printing control module 225 and the borderless printing software introduction module 260. When the fixing device for borderless printing and the transfer device for borderless printing are attached, the borderless printing software checking module 255 checks whether or not software (program) usable for the borderless printing is introduced. As described above, the determination on whether or not the fixing device for borderless printing and the transfer device for borderless printing are attached (or whether or not they have been attached) may be made based on the detection results by the borderless printing fixing device detection module 230 and the borderless printing transfer device detection module 235. Whether or not software usable for borderless printing is introduced may be determined by checking whether or not information (flag or attribute information) indicating that the software is introduced is stored in a predetermined memory area or checking whether or not a software ID usable for borderless printing is acquired from a software storage server 3210 and is introduced in the image forming processing module 210.

The borderless printing software introduction module 260 is connected to the borderless printing software checking module 255 and the communication module 265. In accordance with the checking result by the borderless printing software checking module 255, the borderless printing software introduction module 260 introduces the software via a communication line when software usable for borderless printing is not introduced. Specifically, software may be searched from the software storage server 3210 with a model of the image forming device 200 as a search key (in some cases, including device IDs of the fixing device for borderless printing and the transfer device for borderless printing, in the search key).

The communication module 265 is connected to the borderless printing software introduction module 260. The communication module 265 communicates with the software storage server 3210. Specifically, in accordance with an instruction from the borderless printing software introduction module 260, the communication module 265 transmits a request for software usable for borderless printing and receives the software.

Figure 32:
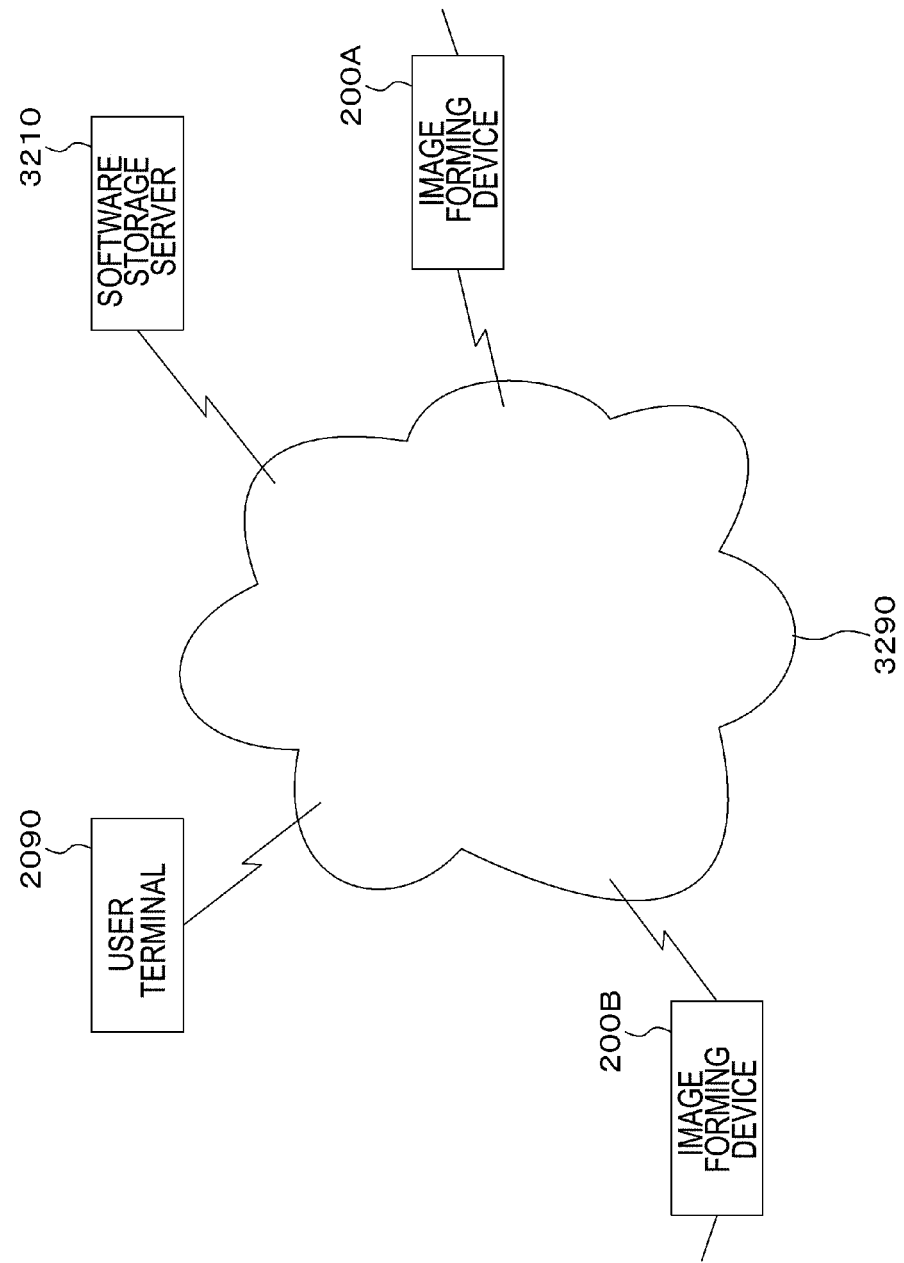
FIG. 32 is an explanatory view illustrating a system configuration example using the second exemplary embodiment.

FIG. 32 is an explanatory view illustrating a system configuration example using the second exemplary embodiment.

The image forming device 200A, the image forming device 200B, the software storage server 3210 and the user terminal 2090 are connected via a communication line 3290. The communication line 3290 may be wireless, wired, or a combination thereof. The communication line 3290 may be, for example, the Internet, as an infrastructure for communication, an intranet, etc. The user terminal 2090 may be, for example, a personal computer (notebook PC) having a communication function, a portable terminal or the like and instructs the image forming device 200 to print in response to a user's operation. Further, the function of the software storage server 3210 may be implemented as a cloud service.

Upon receiving from the user terminal 2090 a print instruction including designation of the borderless printing, the image forming device 200 performs different processes depending on whether or not a fixing device for borderless printing or a transfer device for borderless printing is set in the image forming device 200. In addition, the image forming device 200 downloads software usable for borderless printing from the software storage server 3210.

Figure 33:
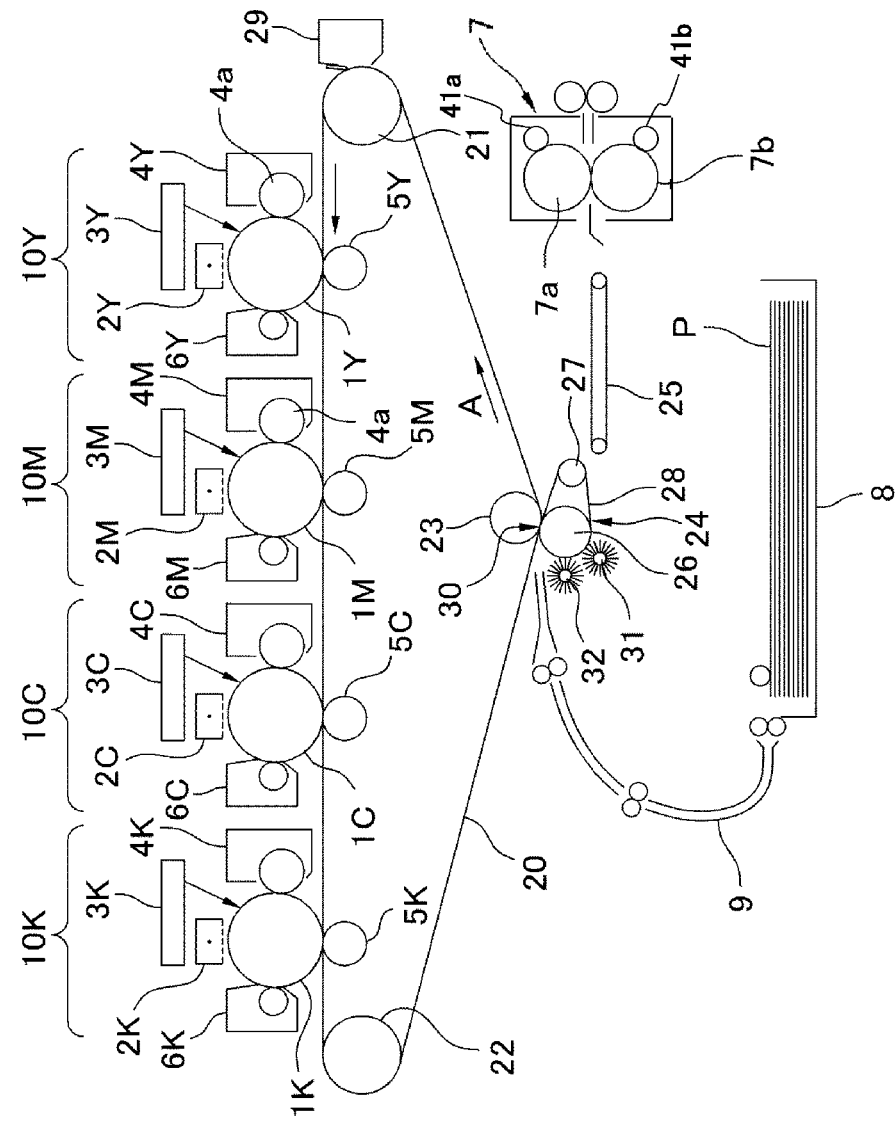
FIG. 33 is a schematic configuration diagram of an image forming processing module.
Figure 34:
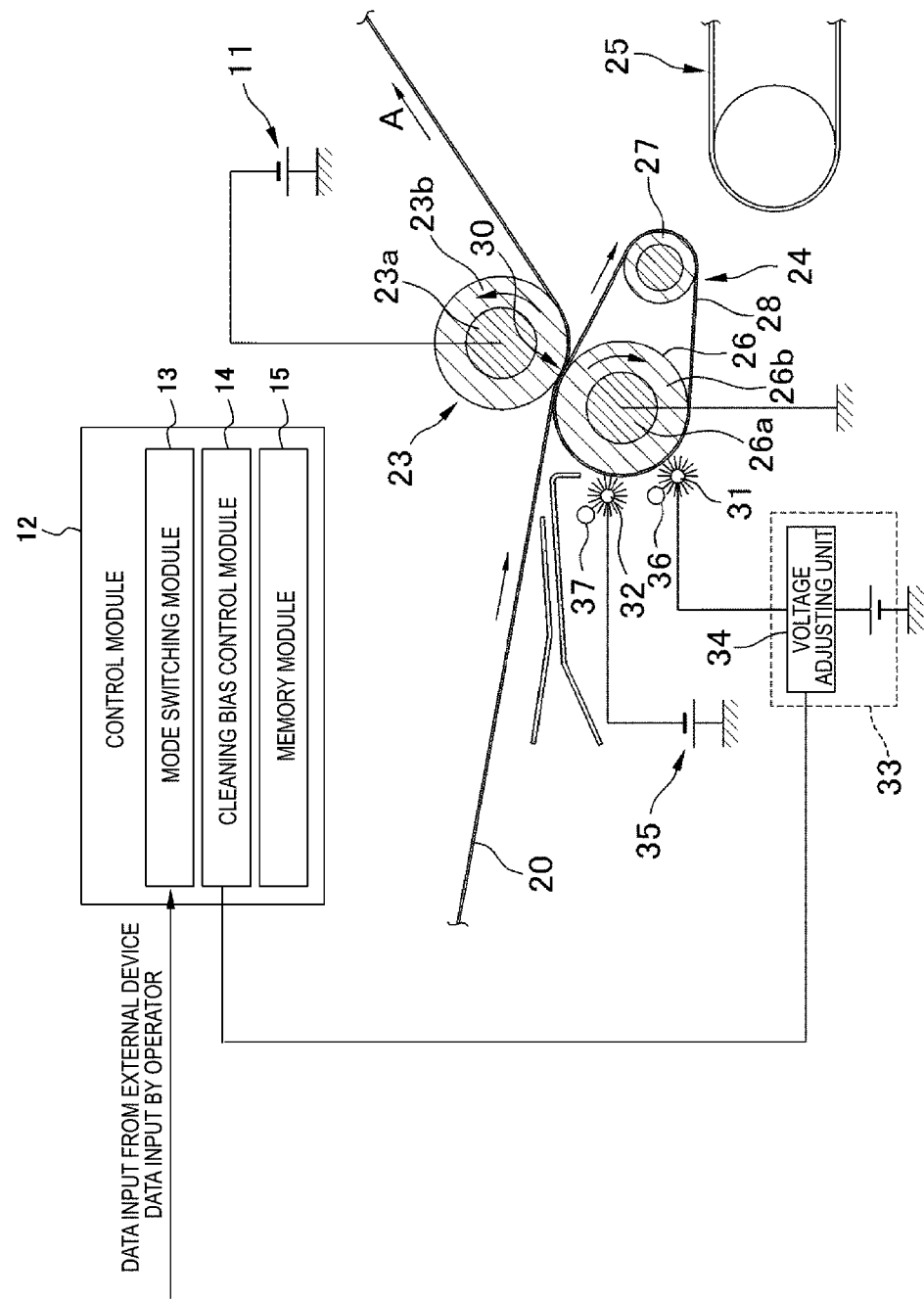
FIG. 34 is a view illustrating a configuration in the vicinity of a position where a secondary transfer of the image forming processing module is performed and a configuration for controlling a bias voltage applied between a secondary transfer member and a cleaning member.

FIG. 33 is a schematic configuration diagram of the image forming processing module 210. Further, FIG. 34 is a view illustrating a configuration in the vicinity of a position where the secondary transfer of the image forming processing module 210 illustrated in FIG. 33 is performed and a configuration for controlling a bias voltage applied between a secondary transfer member and a cleaning member.

In an image forming device that transfers powdery toner to a latent image by an electrostatic potential difference to form a toner image, the toner image is formed by depositing toner on an endless peripheral surface of a latent image carrying member on which a latent image is formed. Then, the formed toner image is directly transferred from the latent image carrying member onto a recording medium, or is primarily transferred from the latent image carrying member onto an intermediate transfer body and secondarily transferred onto the recording medium. As a transfer member for transferring the toner image onto the recording medium, a transfer roller provided so as to be in contact with the circumferential surface of the latent image carrying member or the intermediate transfer body and having a circulatively-moving endless peripheral surface or a transfer belt stretched around plural roller-shaped members is generally used. Such a transfer member sandwiches the recording medium fed to a transfer area which is a position facing the latent image carrying member or the intermediate transfer body and passes the recording medium in contact with the rear surface of the recording medium. Then, an electric field is formed between the transfer member and the latent image carrying member or the intermediate transfer body by applying a transfer bias voltage, and the toner image is transferred onto the recording medium within this electric field.

In such an image forming device, normal printing in which a toner image is transferred while leaving a margin on the outer circumference of a recording medium is common. However, a device capable of transferring a toner image onto the entire surface of a recording medium, that is, a so-called borderless printing device, has been developed. In the borderless printing, the toner image is formed in a range larger than the size of the recording medium, and the toner image is transferred to the entire surface of the recording medium while sticking out from the recording medium to its surrounding. Therefore, when the borderless printing is executed, in a transfer area, the toner sticking out from the recording medium is transferred onto the peripheral surface of the transfer member.

In addition, so-called fogging toner adheres slightly to the latent image carrying member even outside the area where the toner image is formed. In a device for directly transferring the toner image from the latent image carrying member onto the recording medium, the fogging toner is transferred from an area not facing the recording medium at the transfer position onto the peripheral surface of the transfer member. Further, in a device for primarily transferring a toner image from the latent image carrying member onto the intermediate transfer body and secondarily transferring the toner image from the intermediate transfer body onto the recording medium, the fogging toner is transferred onto the intermediate transfer body at a primary transfer position and is transferred from an area not facing the recording medium onto the peripheral surface of the transfer member at a secondary transfer position.

When the toner circulates while adhering to the peripheral surface of the transfer member in this manner, the toner adheres to the rear surface of the recording medium fed to the transfer area, which contaminates the rear surface of the recording medium. To deal with this, for example, JP-A-2008-89657 proposes an image forming device in which a cleaning device for cleaning the peripheral surface of a transfer member is provided and a toner transferred onto the peripheral surface of the transfer member is removed.

The amount of toner transferred onto the peripheral surface of the transfer member in the transfer area in which the latent image carrying member or the intermediate transfer body and the transfer member are opposed to each other greatly varies between the normal printing and the borderless printing. Further, it may be considered that the amount of transferred toner varies depending on temperature, humidity and the like. When the toner cannot be sufficiently removed from the peripheral surface of the transfer member with respect to the amount of transferred toner which varies in this way, the rear surface of the recording medium would be contaminated.

The image forming processing module 210 prevents contamination from occurring on the rear surface of the recording medium onto which the toner image is transferred. Then, a case where a fixing device for borderless printing and a transfer device for borderless printing are set will be described.

The image forming device 200 is, for example, an image forming device that forms a color image using toners of four colors. The image forming device 200 includes electrophotographic type image forming units 10Y, 10M, 10C and 10K that output images of yellow (Y), magenta (M), cyan (C) and black (K), respectively, and an intermediate transfer belt 20 that faces these units. The intermediate transfer belt 20 functions as an image carrier and stretches so as to face each of the image forming units 10. The peripheral surface of the intermediate transfer belt 20 is circulatively driven. On the downstream side of the position where the image forming units 10 face the intermediate transfer belt 20 in the circulative movement direction of the intermediate transfer belt 20, a secondary transfer member 24 for secondary transfer is disposed so as to face the intermediate transfer belt 20. The secondary transfer member 24 functions as a transfer member. A sheet-shaped recording medium P is fed from a sheet accommodating unit 8 through a transport path 9 to a secondary transfer position 30 where the secondary transfer member 24 is opposed to the intermediate transfer belt 20, and a toner image on the intermediate transfer belt 20 is transferred onto the recording medium. A transport device 25 for the recording medium onto which the toner image is transferred and a fixing device 7 that fixes the toner image on the recording medium by heating and pressing the toner image are provided downstream of the secondary transfer position 30 in the transport path of the recording medium. Further, a discharged paper holding unit (not illustrated) that holds the recording medium having the toner image fixed thereon is provided downstream thereof.

Meanwhile, a cleaning device 29 for the intermediate transfer belt that collects the toner remaining on the intermediate transfer belt 20 after the secondary transfer is provided on downstream of the secondary transfer position 30 in the circulative movement direction of the intermediate transfer belt 20. Further, in order to collect the toner transferred from the intermediate transfer belt 20 to the secondary transfer member 24 at the secondary transfer position 30, a first cleaning member 31 and a second cleaning member 32 for the secondary transfer member are disposed at a position facing the endless peripheral surface of the secondary transfer member 24.

The image forming device 200 has plural printing modes including a normal printing mode M1 for forming a toner image while leaving a margin on the outer periphery of the recording medium and a borderless printing mode M2 for forming a toner image on the entire surface of the recording medium. Switching between these printing modes is executed by the control module 12 based on data input from an external device or data input by an operator from an operation panel or the like.

The image forming units 10 are arranged in an order of the image forming unit 10Y for forming a yellow toner image, the image forming unit 10M for forming a magenta toner image, the image forming unit 10C for forming a cyan toner image, and the image forming unit 10K for forming a black toner image from the upstream side in the circulative movement direction of the intermediate transfer belt 20. Each of the image forming units 10 has a photoconductor drum 1 on which an electrostatic latent image is to be formed. Each of the image forming units 10 includes a charging device 2 that charges the surface of the photoconductor drum 1, a developing device 4 that selectively transfers a toner to a latent image formed on the photoconductor drum 1 to form a toner image, a primary transfer roller 5 that primarily transfers the toner image on the photoconductor drum 1 onto the intermediate transfer belt 20, and a cleaning device 6 for a photoconductor body that removes the toner remaining on the photoconductor drum after the transfer. Further, an exposure device 3 that generates image light based on an image signal is provided for each photoconductor drum 1. The exposure device 3 irradiates the photoconductor drum 1 with the image light on the upstream side of a position where the developing device 4 faces, thereby writing an electrostatic latent image.

The photoconductor drum 1 is formed by stacking organic photoconductive layers on the peripheral surface of a metal cylindrical member. A metal portion thereof is electrically grounded. Further, a bias voltage may be applied thereto.

The charging device 2 includes an electrode wire stretching to have a gap with respect to the peripheral surface of the photoconductor drum 1 which is a member to be charged. The charging device 2 applies a voltage between the electrode wire and the photoconductor drum 1 to generate corona discharge to charge the surface of the photoconductor drum 1.

In the second exemplary embodiment, as described above, a device that charges the surface of the photoconductor drum 1 by the corona discharge is used. Alternatively, a solid discharger or a contact or non-contact charging device having a roller shape or a blade shape may be used.

The exposure device 3 generates a laser beam blinking based on the image signal and scans the photoconductor drum 1, which is rotated, with the laser beam in the main scanning direction (axial direction) of the photoconductor drum 1 by using a polygon mirror. As a result, an electrostatic latent image corresponding to each color image is formed on the surface of each photoconductor drum 1.

The developing device 4 uses a two-component developer containing a toner and a magnetic carrier. The developing device 4 has a rotating developing roller 4a at a position facing the photoconductor drum 1. A layer of the two-component developer is formed on the peripheral surface of the developing roller 4a. The toner is transferred from the peripheral surface of the developing roller 4a onto the photoconductor drum 1 to visualize an electrostatic latent image. In addition, the toner consumed with the image formation is supplemented according to the amount of consumption.

In the second exemplary embodiment, the photoconductor drum 1 is charged with a negative polarity by the charging device 2, and the negatively-charged toner is transferred onto a portion where the charged potential is attenuated by exposure.

The primary transfer rollers 5 are disposed on the rear surface side of the intermediate transfer belt 20 at positions facing the photoconductor drums 1Y, 1M, 1C and 1K with respect to the image forming units 10Y, 10M, 10C and 10K, respectively. Then, a bias voltage for primary transfer is applied between the primary transfer rollers 5Y, 5M, 5C and 5K and the photoconductor drums 1Y, 1M, 1C and 1K, and the toner images on the photoconductor drums are electrostatically transferred onto the passing intermediate transfer belt 20 at the primary transfer positions at which the primary transfer rollers 5Y, 5M, 5C and 5K and the photoconductor drums 1Y, 1M, 1C and 1K face with each other.

The cleaning device 6 for photoconductor body removes the toner remaining on the photoconductor drum 1 after the transfer, by a cleaning blade disposed to be in contact with the peripheral surface of the photoconductor drum 1.

The intermediate transfer belt 20 is a film shaped member formed in an endless shape by stacking plural layers. The intermediate transfer belt 20 functions as an image carrier. The intermediate transfer belt 20 is circulatively moved in the direction of arrow A illustrated in FIG. 33. The intermediate transfer belt 20 stretches over a driving roller 21 that is rotationally driven, an adjusting roller 22 that adjusts the bias of the intermediate transfer belt 20 in the width direction, and an opposing roller 23 supported at a position facing the secondary transfer member 24.

The secondary transfer member 24 disposed at a position facing the opposing roller 23 with the intermediate transfer belt 20 sandwiched therebetween includes a secondary transfer roller 26, an assist roller 27 and a secondary transfer belt 28 stretching over these rollers 26 and 27. The secondary transfer belt 28 is sandwiched between the opposing roller 23 and the secondary transfer roller 26 in a state of being overlapped with the intermediate transfer belt 20 and is circulatively moved as the intermediate transfer belt 20 is circulatively driven. Further, when a recording medium is fed between the intermediate transfer belt 20 and the secondary transfer belt 28, the recording medium is transported with being sandwiched therebetween.

The secondary transfer roller 26 includes a metal core member 26a and an outer peripheral layer 26b of a rubber material added with conductive particles which is formed on the outer peripheral surface of the metal core member 26a. Further, the opposing roller 23 includes a metal core member 23a and an outer peripheral layer 23b formed on the outer peripheral surface of the metal core member 23a. The outer peripheral layer 23b may be formed of a single layer or plural layers.

As illustrated in FIG. 34, a bias voltage for secondary transfer is applied between the secondary transfer roller 26 and the opposing roller 23 from a power supply 11 for transfer bias to form an electric field for transfer at the secondary transfer position 30.

The fixing device 7 heats and pressurizes the recording medium onto which the toner image has been transferred at the secondary transfer position 30 to fix the toner image on the recording medium. The fixing device 7 includes a heating roller 7a having a heating source therein, and a pressure roller 7b pressed against the heating roller 7a. The recording medium onto which the toner image has been transferred is fed to a contact portion between the heating roller 7a and the pressure roller 7b and the toner image is fixed on the recording medium by being heated and pressurized between the heating roller 7a and the pressure roller 7b which are rotationally driven. In addition, in order to collect the toner transferred onto the heating roller 7a and the pressure roller 7b, a cleaning member 41a is disposed on the heating roller 7a and a cleaning member 41b is disposed on the pressure roller 7b. The cleaning members 41a and 41b perform cleaning in the transfer device. In addition, the cleaning members 41a and 41b may be rollers or blades.

The cleaning device 29 for the intermediate transfer belt removes the residual toner remaining from the peripheral surface of the intermediate transfer belt 20 after the transfer onto the recording medium at the secondary transfer position 30. The cleaning device 29 has a cleaning blade which is in contact with the peripheral surface of the intermediate transfer belt 20. This cleaning blade is used to scrape off (i.e., remove) the toner adhering to the peripheral surface of the intermediate transfer belt 20.

The first cleaning member 31 and the second cleaning member 32 are disposed so as to be in contact with the peripheral surface of the secondary transfer belt 28. Each of the cleaning members 31 and 32 is formed by attaching brush bristles radially around a rotation shaft made of metal. The brush bristles are formed of a resin material mixed with particles for imparting conductivity. Then, a voltage is applied to the brush bristles from the rotation shaft to form an electric field between the brush bristles and the secondary transfer roller 26. That is, between the first cleaning member 31 contacting on the upstream side in the circulative movement direction of the secondary transfer belt 28 and the electrically-grounded secondary transfer roller 26, a cleaning bias voltage is applied from a first cleaning bias power supply 33 to give a positive polarity potential to the first cleaning member 31. Further, between the second cleaning member 32 contacting on the downstream side and the secondary transfer roller 26, a cleaning bias voltage is applied from a second cleaning bias power supply 35 such that the potential of the second cleaning member 32 has the negative polarity. Therefore, the toner charged mainly to the negative polarity is removed from the peripheral surface of the secondary transfer belt 28 by the first cleaning member 31 to which the bias voltage is applied so as to be on the positive polarity side, and the toner charged mainly to the positive polarity is removed by the second cleaning member 32 to which the voltage of the negative polarity is applied.

Reference numerals 36 and 37 in FIG. 34 denote brushing members that brush off the adsorbed toner from the peripheral surface of the secondary transfer belt 28 by contacting the brush bristles of the first cleaning member 31 and the second cleaning member 32.

The first cleaning member 31 functions as a cleaning member. The first cleaning bias power supply 33 that applies a cleaning bias voltage to the first cleaning member 31 functions as a cleaning bias applying unit. Then, a voltage applied from the first cleaning bias power supply 33 to the first cleaning member 31 is controlled by the control module 12.

The control module 12 includes a mode switching module 13 that switches to a printing mode selected from plural printing modes that the image forming device 200 has and a cleaning bias control module 14 that controls the cleaning bias voltage to be applied to the first cleaning member 31. In addition, the control module 12 has a function of controlling the operation of the image forming device 200 to form an image on a recording medium.

The mode switching module 13 functioning as a printing mode switching unit that selects one from the plural printing modes including the normal printing mode M1 and the borderless printing mode M2 based on information input from an external device or information input by an operator using an operation panel or the like, and switches control so that an image is formed according to each mode.

The cleaning bias control module 14 functions as a bias voltage controller. The cleaning bias control module 14 controls a voltage applied from the first cleaning bias power supply 33 to the first cleaning member 31 based on the printing mode switched in the mode switching module 13. That is, the cleaning bias control module 14 makes a voltage adjusting unit 34 of the first cleaning bias power supply 33 to apply a first bias voltage V1 when the printing mode is switched to the normal printing mode M1 and to apply a second bias voltage V2 when the printing mode is switched to the borderless printing mode M2.

The first bias voltage V1 and the second bias voltage V2 are preset and stored in a memory module 15. The second bias voltage V2 which is applied when the borderless printing mode M2 is executed is set to make a potential difference between the secondary transfer roller 26 and the first cleaning member 31 larger than the first bias voltage V1 which is applied when the normal printing mode M1 is executed.

In the second exemplary embodiment, the first bias voltage V1 and the second bias voltage V2 are preset constant values. Alternatively, the bias voltages may be controlled based on environmental conditions such as temperature and humidity and other conditions in addition to the print mode to be executed. However, under the same environmental conditions, the second bias voltage V2 in the borderless printing mode M2 is controlled to make the potential difference larger than the first bias voltage V1 in the normal printing mode M1.

The image forming device 200 operates as follows.

Electrostatic latent images are formed on the four respective photoconductor drums 1, and the toner is transferred from the developing device 4 to form toner images. These toner images are transferred onto the intermediate transfer belt 20 at positions facing the primary transfer roller 5 and are superimposed on the intermediate transfer belt 20 to form a color toner image. This toner image is transported to the secondary transfer position 30 by the circulative movement of the intermediate transfer belt 20 and is transferred from the intermediate transfer belt 20 onto the recording medium P.

When such an image forming operation is executed in the normal printing mode M1, the color toner image is formed in an area smaller than the size of the recording medium and is transferred at the secondary transfer position 30 while leaving a margin on the outer peripheral portion of the recording medium. A so-called fogging toner often adheres somewhat to a portion outside a range where the intermediate transfer belt 20 carries the toner image, for example, a non-image area between an area where the image is carried and an area where a next image is carried. The toner adhering to an area not facing the recording medium at the secondary transfer position 30 is transferred onto the secondary transfer belt 28 at the secondary transfer position 30. The secondary transfer belt 28 is circulatively moved and passes through a position facing the first cleaning member 31 to which the first bias voltage V1 is applied and a position facing the second cleaning member 32, while some of the toner is removed by these cleaning members 31 and 32. Further, some toner remains on the secondary transfer belt 28 without being removed by the cleaning members 31 and 32, but the amount of toner adhering to the non-image area is small, so that the rear surface of the recording medium is not immediately contaminated.

Meanwhile, when image formation is executed in the borderless printing mode M2, the toner image is formed in a range larger than the size of the recording medium. When the image is transferred onto the recording medium at the secondary transfer position 30, the toner image sticks out from the outer edge of the recording medium and is transferred onto the secondary transfer belt 28. At this time, the amount of toner adhering to the secondary transfer belt 28 is remarkably larger than that of the fogging toner in the normal printing mode. In addition, from the non-image area, the fogging toner adheres to the secondary transfer belt 28 in the same manner as in the execution of the normal printing mode M1. Then, the secondary transfer belt 28 is circulatively moved and passes through the position facing the first cleaning member 31 and the second cleaning member 32, while some of the toner is removed by these cleaning members 31 and 32. At this time, the second bias voltage V2 making the potential difference between the first cleaning member 31 and the secondary transfer roller 26 larger than that when the first bias voltage V1 is applied is applied to the first cleaning member 31. The first cleaning member 31 is charged to the positive polarity. Therefore, a large amount of negatively-charged toner adhering to the secondary transfer belt 28 is mainly removed by the first cleaning member 31. The cleaning of the fixing device is executed by the cleaning members 31 and 32. Further, the cleaning members 31 and 32 may be brushes, rollers or blades.

In the case where the borderless printing mode M2 is executed, the toner that sticks out from the outer edge of the recording medium passing through the secondary transfer position 30 and adheres to the secondary transfer belt 28 may adhere to the rear surface of the recording medium if not removed by single cleaning operation, which may cause toner contamination.

Figure 35A:
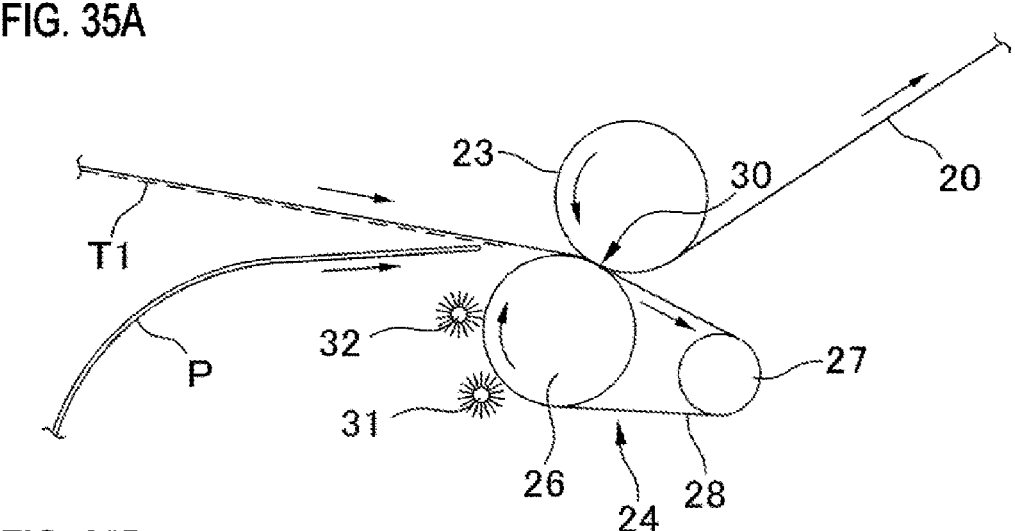
FIGS. 35A to 35C are views for explaining a state in which contamination occurs on a rear surface of a recording medium by a toner image formed to stick out from the recording medium in borderless printing.
Figure 35B:
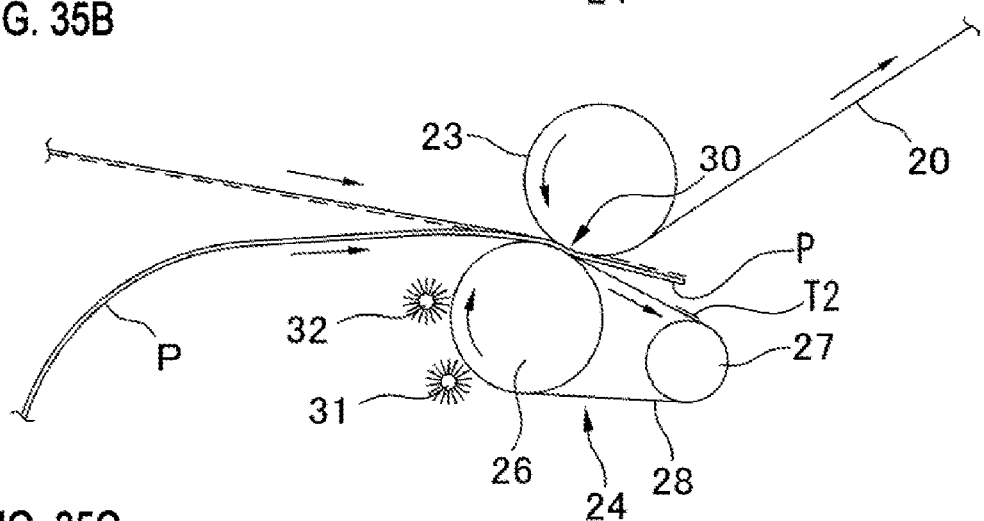
Figure 35C:
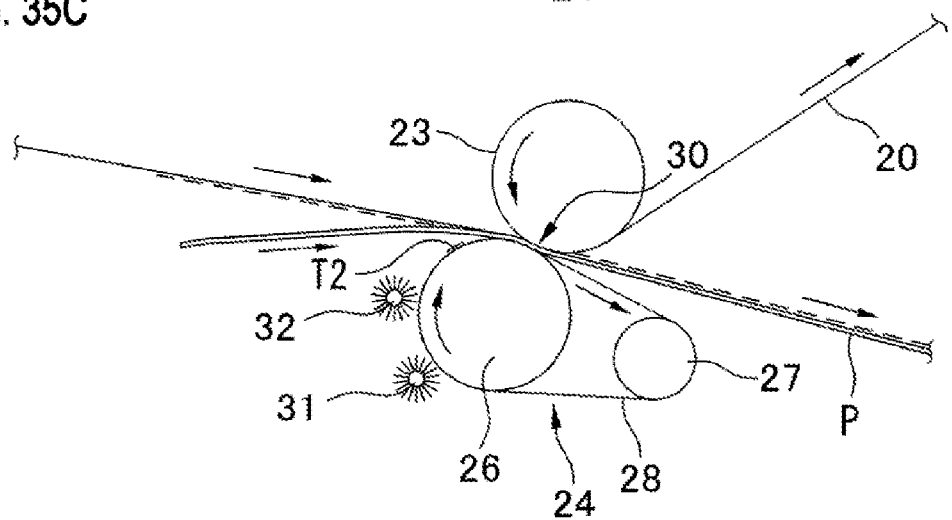

FIGS. 35A to 35C are views for explaining a state in which contamination occurs on the rear surface of a recording medium by a toner image formed to stick out from the recording medium in the borderless printing.

As illustrated in FIG. 35A, when the borderless printing mode M2 is executed, at the secondary transfer position 30 where the toner image is transferred with the recording medium P being sandwiched therebetween, a toner image T1 carried on the intermediate transfer belt 20 is larger than the size of the recording medium P and sticks forward from the leading edge of the recording medium P on the leading end side. When this portion passes through the secondary transfer position 30, the toner image is transferred onto the secondary transfer belt 28 as illustrated in FIG. 35B. Then, as the secondary transfer belt 28 is circulatively driven, the toner passes through the positions facing the first cleaning member 31 and the second cleaning member 32. However, when a toner all of which cannot be removed by these cleaning members 31 and 32 remains, the residual toner T2 reaches the secondary transfer position 30 again. In a case where the circumferential length of the secondary transfer belt 28 is shorter than the length of the recording medium P in the transport direction, as illustrated in FIG. 35C, when the residual toner T2 reaches the secondary transfer position 30, the trailing portion of the recording medium P in the transport direction is still located at the secondary transfer position 30. Thus, the residual toner T2 adheres to the rear surface of the recording medium P.

Therefore, in the case of the borderless printing mode M2, the toner T2 that sticks out from the leading end of the recording medium P and adheres to the secondary transfer belt 28 has to be removed only by passing through the positions facing the first cleaning member 31 and the second cleaning member 32 once to the extent that toner contamination on the rear surface of the recording medium P can be tolerated.

Figure 36:
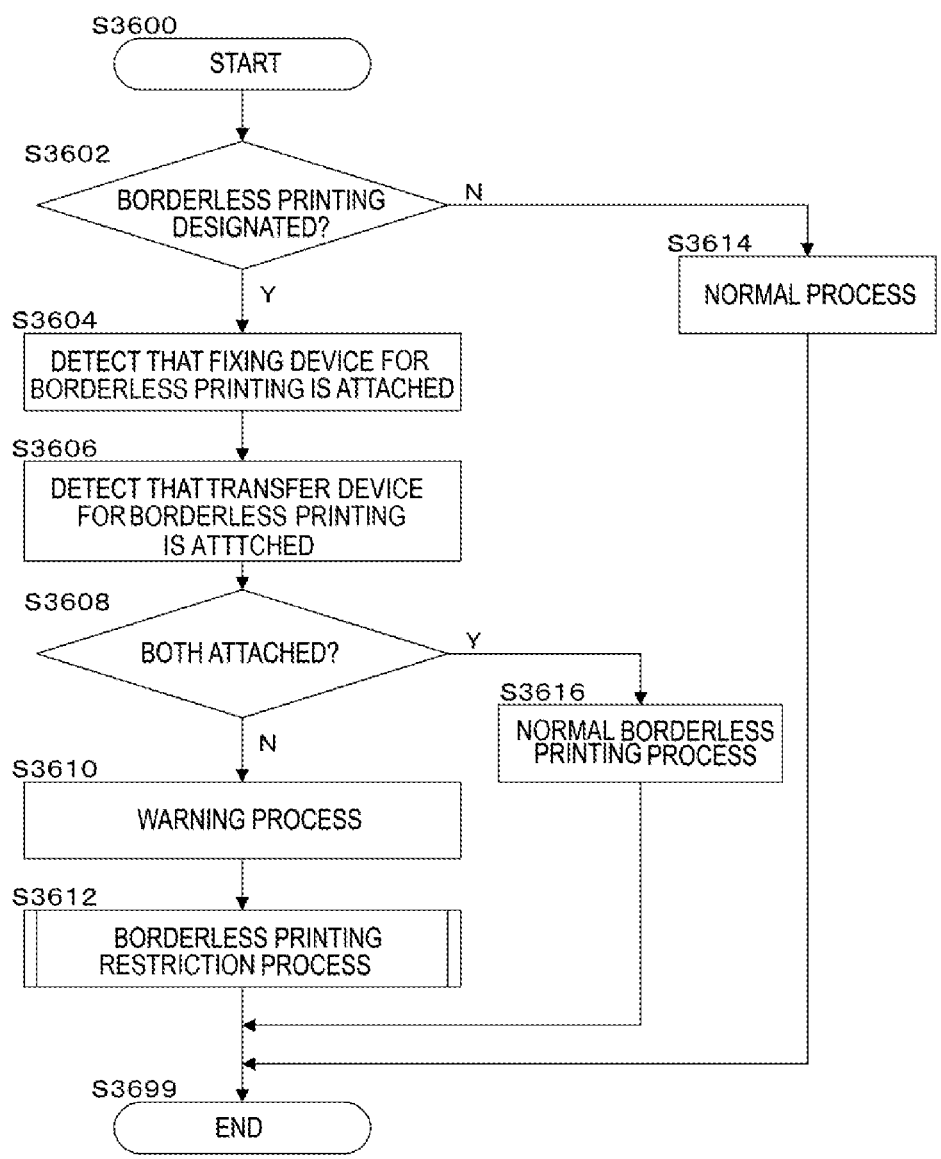
FIG. 36 is a flowchart illustrating a process example according to the second exemplary embodiment.

FIG. 36 is a flowchart illustrating an example of a process by the second exemplary embodiment (particularly, the borderless control module 220).

In step S3602, the borderless printing control module 225 determines whether or not borderless printing is designated. When it is determined that the borderless printing is designated, the process proceeds to step S3604. Otherwise, the process proceeds to step S3614.

In step S3604, the borderless printing fixing device detection module 230 detects that a fixing device for borderless printing is attached.

In step S3606, the borderless printing transfer device detection module 235 detects that a transfer device for borderless printing is attached.

In step S3608, the warning module 240 determines whether or not both the fixing device for borderless printing and the transfer device for borderless printing are attached. When it is determined that both are attached, the process proceeds to step S3616. Otherwise, the process proceeds to step S3610.

In step S3610, the warning module 240 executes a warning process.

In step S3612, a borderless printing restriction process is executed. The detailed process of step S3612 will be described later with reference to a flowchart illustrated in an example of FIG. 38.

In step S3614, the image forming processing module 210 executes the normal process. For example, a non-borderless printing process is executed.

In step S3616, the image forming processing module 210 executes the normal borderless printing process described above.

Figure 37A:
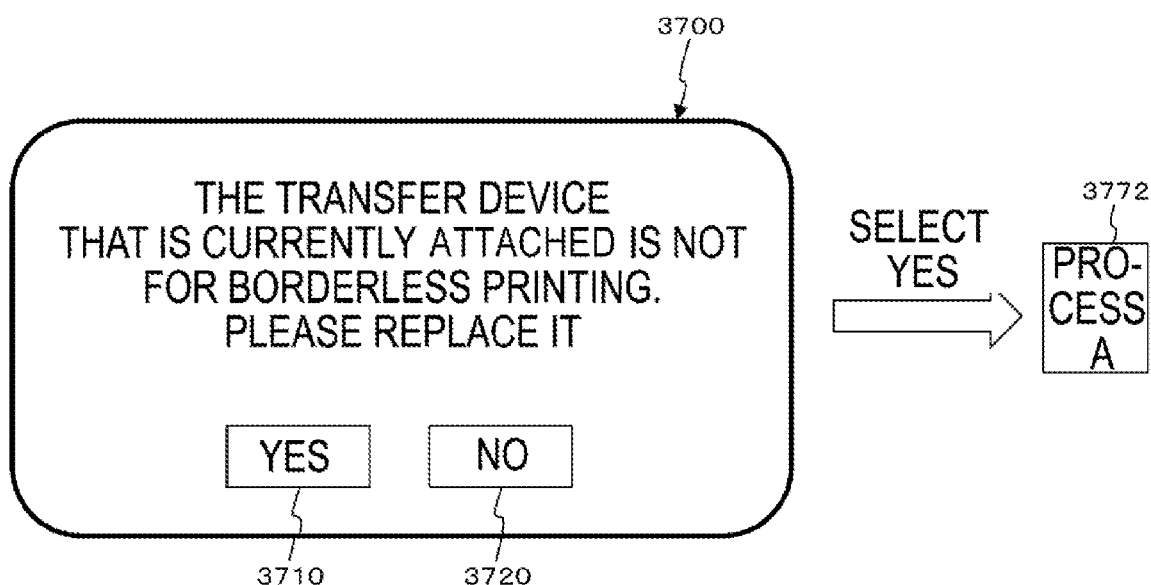
FIGS. 37A and 37B are explanatory views illustrating a process example according to the second exemplary embodiment.
Figure 37B:
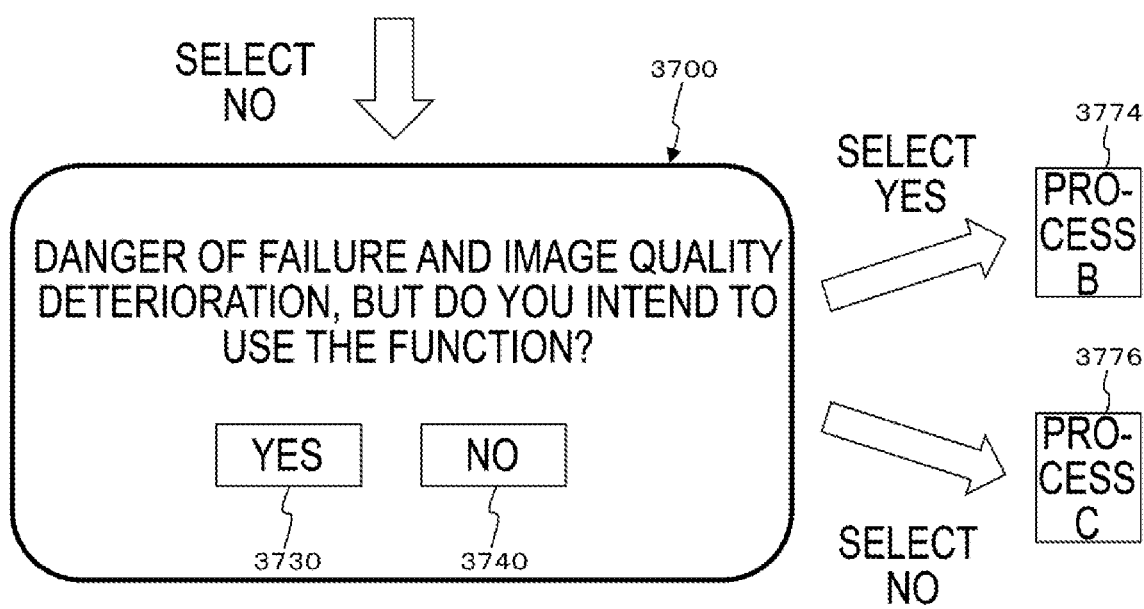

FIGS. 37A and 37B are explanatory views illustrating an example of a process according to the second exemplary embodiment. Particularly, the process example of step S3610 in the flowchart illustrated in the example of FIG. 36 is illustrated.

In the example of FIG. 37A, a message "The transfer device that is currently attached is not for borderless printing. Please replace it" is displayed on a screen 3700 and a Yes button 3710 and a No button 3720 are displayed so as to allow a user to select. Then, when the user selects the Yes button 3710, a process A 3772 is executed. When the No button 3720 is selected, the display illustrated in the example of FIG. 37B is executed.

As the process A 3772, a process of "do not display an error if there is no problem by replacing, or display that it is ready to use and make the function of borderless printing available" is executed. With the flowchart illustrated in the example of FIG. 36, after being determined as "Y" in step S3608, the process of step S3616 is executed.

In the example of FIG. 37B, a message "There are danger of failure and image quality deterioration, but do you intend to use the function?" is displayed on the screen 3700 and a Yes button 3730 and a No button 3740 are displayed so as to allow the user to select. Then, when the user selects the Yes button 3730, a process B 3774 is executed. When the No button 3740 is selected, a process C 3776 is executed.

As the process B 3774, a process of "the function of borderless printing is enabled in a limited manner. As the limited manner, for example, there is a case where the borderless printing is permitted only for this job or that user. Then, when the printing process by this job or by a user's operation is completed, the borderless printing is made unusable" is executed. With the flowchart illustrated in the example of FIG. 36, the process of step S3612 is executed. As the process C 3776, a process of "return to the home screen. Or display a warning screen again" is executed.

In the case where one of the fixing device for borderless printing and the transfer device for borderless printing is set (the other is not set), the borderless printing may be enabled in the limited manner (the borderless printing is permitted). When both are not set, the borderless printing may be prohibited.

Figure 38:
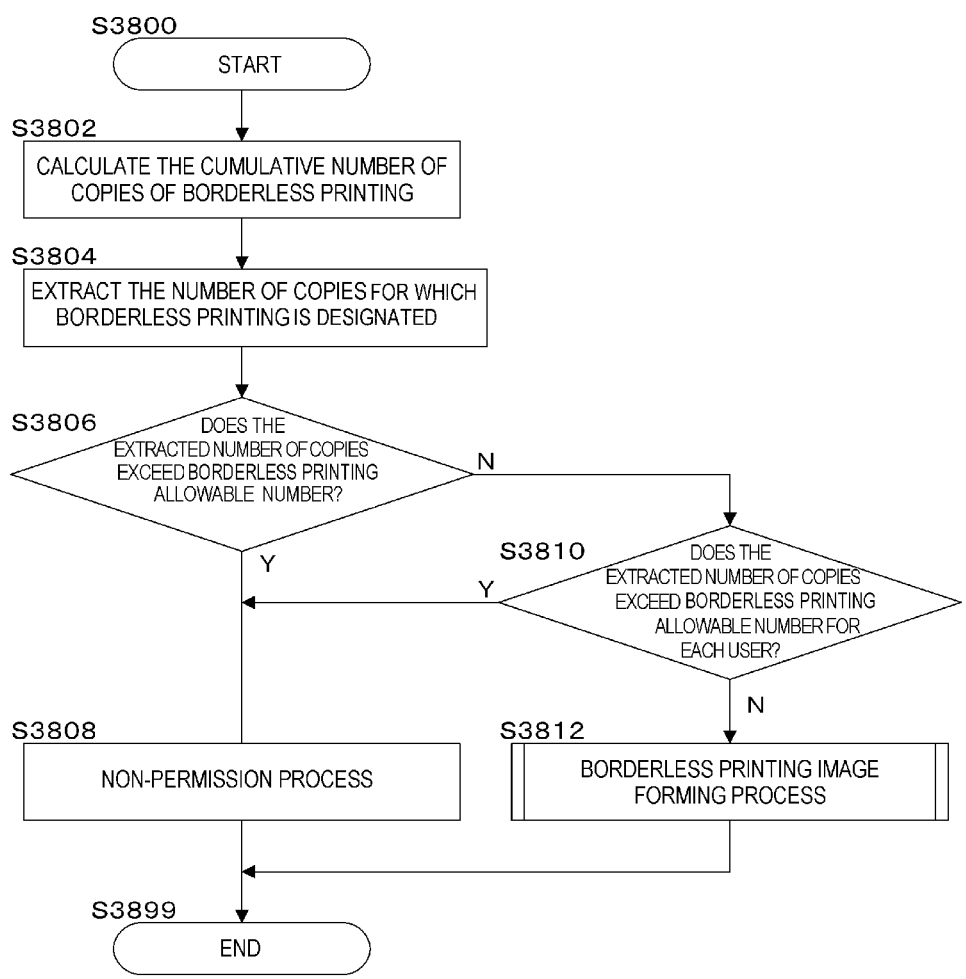
FIG. 38 is a flowchart illustrating a process example according to the second exemplary embodiment.

FIG. 38 is a flowchart illustrating an example of a process according to the second exemplary embodiment.

In step S3802, the cumulative number of copies of the borderless printing is calculated. As described above, the cumulative number of copies may be calculated for each user, each paper size or the like. For example, it may be calculated using a borderless printing log table 3900. FIG. 39 is an explanatory view illustrating an example of the data structure of the borderless printing log table 3900. The borderless printing log table 3900 has a date/time field 3910, a borderless printing number field 3920, a paper size field 3930, a monochrome/color field 3940 and a user field 3950. The borderless printing log table 3900 stores a history (log) of the borderless printing in a state in which a fixing device for borderless printing or a transfer device for borderless printing is not set. The borderless printing number field 3920 has an upper side field 3922, a right side field 3924, a lower side field 3926 and a left side field 3928. The date/time field 3910 stores date and time when the borderless printing is executed. The borderless printing number field 3920 stores the number of copies of the borderless printing. The upper side field 3922 stores the number of copies of the borderless printing on the upper side. The right side field 3924 stores the number of copies of the borderless printing on the right side. The lower side field 3926 stores the number of copies of the borderless printing on the lower side. The left side field 3928 stores the number of copies of the borderless printing on the left side. As a matter of course, it is also possible to store the number of copies of the borderless printing on the entire paper, not for each side (the number of copies counted as the borderless printing in the case of executing the borderless printing even on one side). The paper size field 3930 stores the paper size in the borderless printing. The monochrome/color field 3940 stores information indicating whether the borderless printing is monochrome printing or color printing. The user field 3950 stores a user (user ID) who executes the borderless printing.

In step S3804, the number of copies for which the borderless printing is designated is extracted. In this process, the number of copies may be counted for each side.

In step S3806, it is determined whether or not the extracted number of copies exceeds the borderless printing allowable number of copies. When it is determined that it exceeds the allowable number of copies, the process proceeds to step S3808. Otherwise, the process proceeds to step S3810. In the image forming device 200, the preset number of copies (the number of copies that can be borderless-printed in a state in which the fixing device for borderless printing or the transfer device for borderless printing is not set) is set as a threshold value. This process may be executed for each side.

In step S3808, a non-permission process is executed. For example, a message indicating that borderless printing cannot be executed is displayed.

Figure 40:
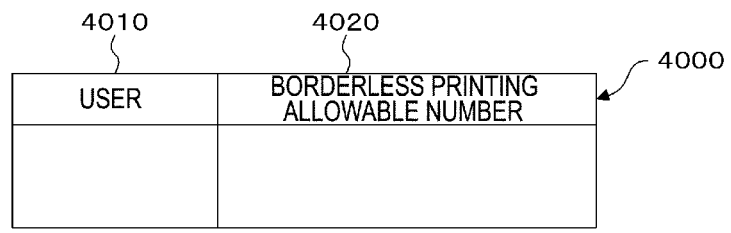
FIG. 40 is an explanatory view illustrating an example of a data structure of a per-user allowable number table.

In step S3810, it is determined whether or not the extracted number of copies exceeds the borderless printing allowable number of copies for each user. When it is determined that it exceeds the allowable number of copies, the process proceeds to step S3808. Otherwise, the process proceeds to step S3812. For example, the allowable number of copies may be determined using a per-user allowable number table 4000. FIG. 40 is an explanatory view illustrating an example of the data structure of the per-user allowable number table 4000. The per-user allowable number table 4000 has a user field 4010 and a borderless printing allowable number field 4020. The user field 4010 stores a user. The borderless printing allowable number field 4020 stores the borderless printing allowable number of copies for the user. In this example, the allowable number of copies is set for each user. Alternatively, the allowable number of copies may be set for each paper size or the like.

When the borderless printing can be designated for each side, the borderless printing allowable number field 4020 may be the number of sides that can be borderless-printed. Furthermore, the borderless printing allowable number field 4020 may be the number of sides that can be borderless-printed for each of the upper side, the right side, the lower side and the left side. Then, the process of step S3810 may be executed for each side.

In step S3812, a borderless printing image forming process is performed. The detailed process of step S3812 will be described later with reference to a flowchart illustrated in an example of FIG. 41.

Figure 41:
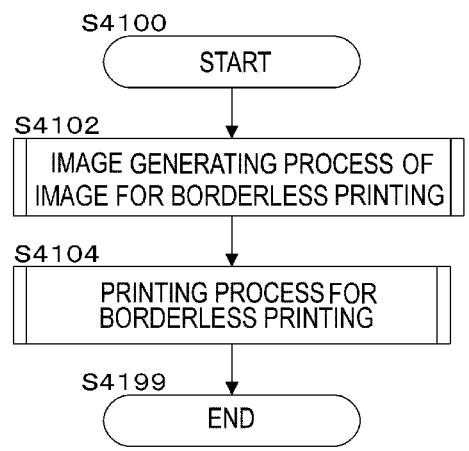
FIG. 41 is a flowchart illustrating a process example according to the second exemplary embodiment.

FIG. 41 is a flowchart illustrating an example of a process according to the second exemplary embodiment.

In step S4102, an image generating process of an image for borderless printing is executed. The detailed process of step S4102 will be described later with reference to a flowchart illustrated in an example of FIG. 42.

In step S4104, a printing process for borderless printing is executed. The detailed process of step S4104 will be described later with reference to a flowchart illustrated in an example of FIG. 43.

Figure 42:
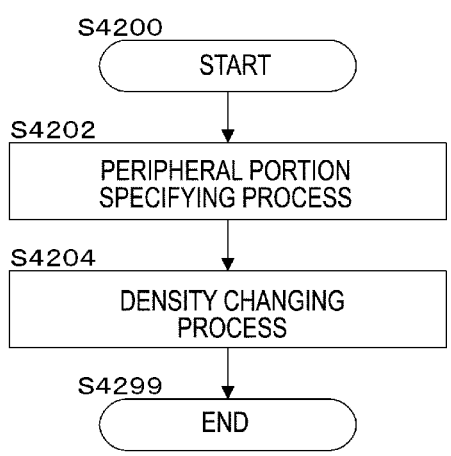
FIG. 42 is a flowchart illustrating a process example according to the second exemplary embodiment.

FIG. 42 is a flowchart illustrating an example of a process according to the second exemplary embodiment.

In step S4202, a peripheral portion specifying process is executed. For example, a predetermined area (a portion having a predetermined width from an edge) is specified.

In step S4204, a density changing process is executed. For example, rather than uniformly lowering the density of the peripheral portion, the amount of lowered density may be increased toward the edge.

Figure 43:
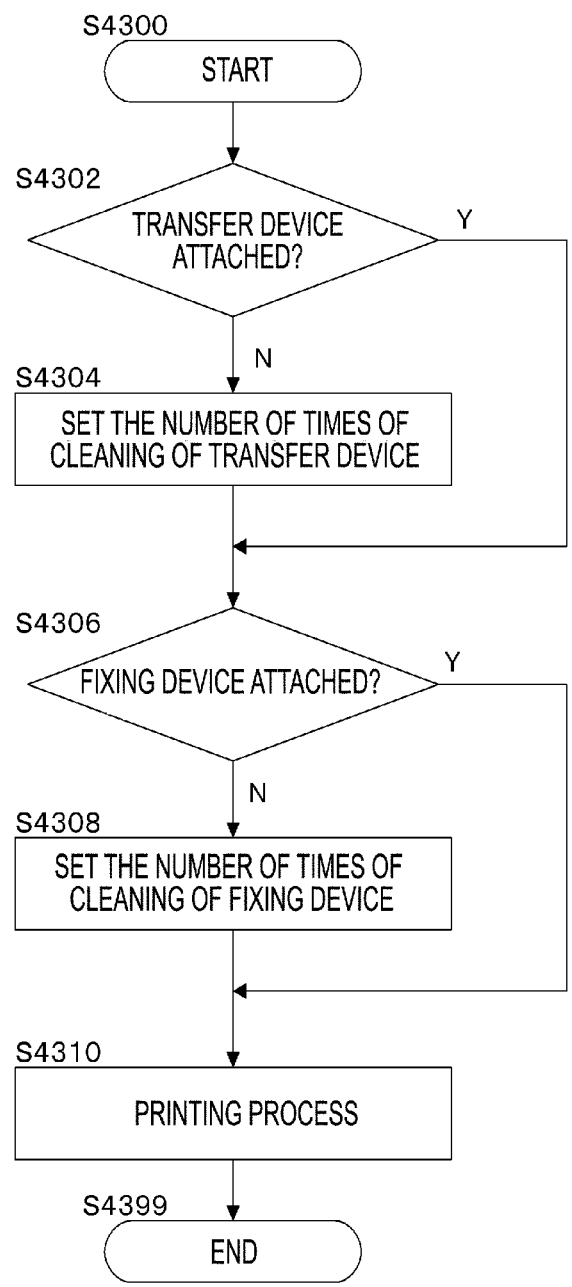
FIG. 43 is a flowchart illustrating a process example according to the second exemplary embodiment.

FIG. 43 is a flowchart illustrating an example of a process according to the second exemplary embodiment.

In step S4302, it is determined whether or not a transfer device is attached. When it is determined that a transfer device is not attached, the process proceeds to step S4304. Otherwise, the process proceeds to step S4306.

In step S4304, the number of times of cleaning of the transfer device is set.

In step S4306, it is determined whether or not a fixing device is attached. When it is determined that a fixing device is not attached, the process proceeds to step S4308. Otherwise, the process proceeds to step S4310.

In step S4308, the number of times of cleaning of the fixing device is set.

In step S4310, a borderless printing process is executed.

The first exemplary embodiment and the second exemplary embodiment may be used in combination. For example, a setting in printing by the image forming device 200 may include the borderless printing. Also, determination as to whether or not the borderless printing is performed may be made using the second exemplary embodiment. Specifically, it may be as follows.

An information processing device including:

a display module that displays an image;

a determination module that determines an area which is a print target from the image displayed by the display module;

a selection module that selects one of setting for borderless printing and setting for non-borderless printing based on print data in the area; and a transmission module that, when a print instruction operation of the setting selected by the selection module, the print instruction operation targeting the area, is performed, transmits the print instruction to a printable printing device.

Figure 44:
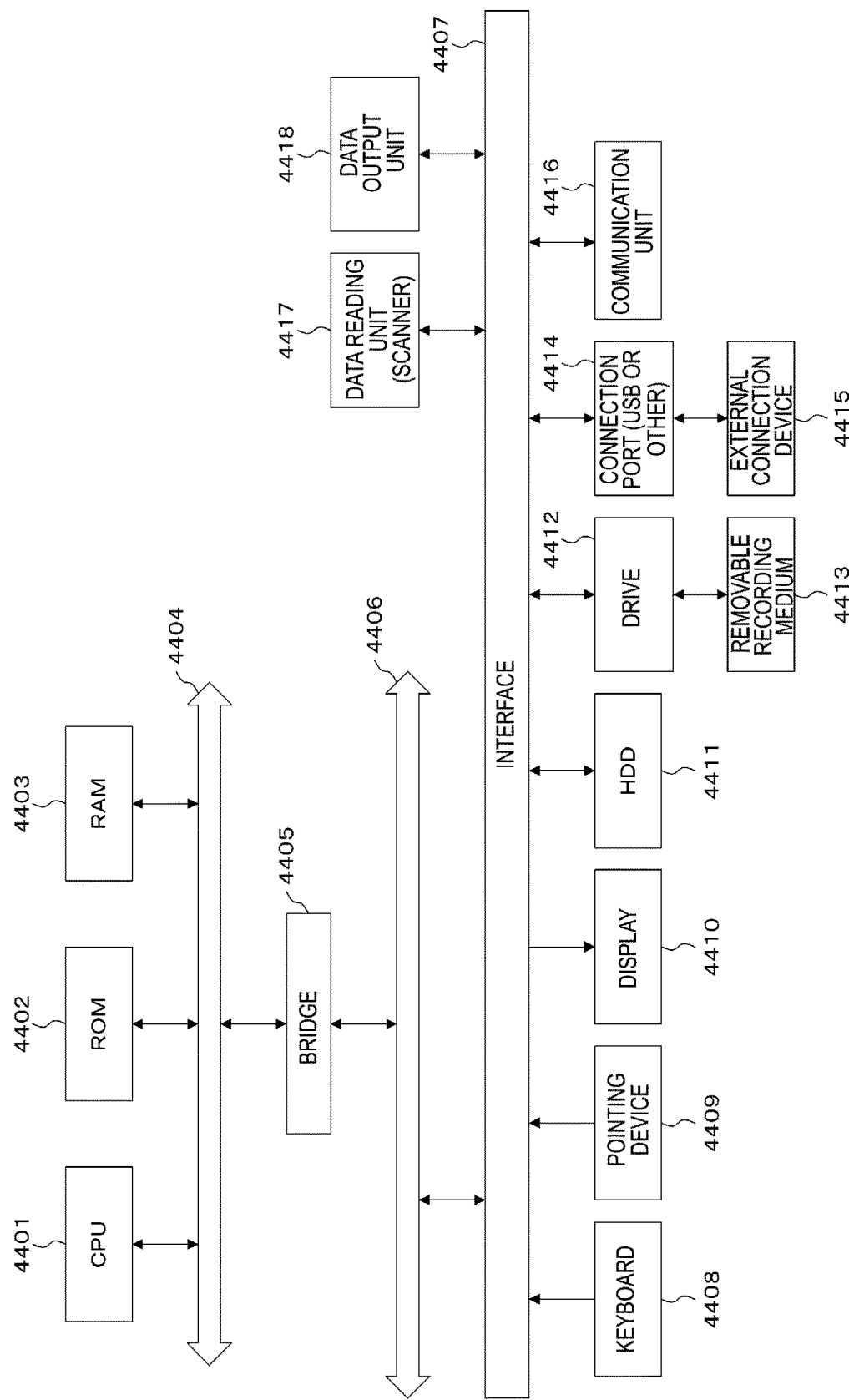
FIG. 44 is a block diagram illustrating a hardware configuration example of a computer that implements the exemplary embodiments.

A hardware configuration example of the information processing device 100, the image forming device 200 and the image forming instruction device 1900 of the exemplary embodiments will be described with reference to FIG. 44. The configuration illustrated in FIG. 44 is implemented by, for example, a personal computer (PC) or the like including a data reading unit 4417 such as a scanner and a data output unit 4418 such as a printer.

A CPU (Central Processing Unit) 4401 is a control unit that executes a process according to a computer program describing the execution sequence of various modules described in the above exemplary embodiments, including the display module 105, the operation reception module 110, the image forming device determination module 125, the communication module 130, the print data reception module 1905, the print attribute setting module 1910, the outer edge checking module 1915, the image generating process detection module 1920, the selection module 1925, the presentation module 1930, the print instruction module 1935, the control module 12, the borderless printing control module 225, the borderless printing fixing device detection module 230, the borderless printing transfer device detection module 235, the warning module 240, the borderless image forming processing module 245, the print restriction processing module 250, the borderless printing software checking module 255, the borderless printing software introduction module 260, the communication module 265, etc.

A ROM (Read Only Memory) 4402 stores programs operation parameters and the like used by the CPU 4401. A RAM (Random Access Memory) 4403 stores programs to be used in the execution by the CPU 4401, parameters appropriately changing in the execution thereof, and the like. The CPU 4401, the ROM 4402 and the RAM 4403 are interconnected by a host bus 4404 configured with a CPU bus or the like.

The host bus 4404 is connected to an external bus 4406 such as a peripheral component interconnect/interface (PCI) bus via a bridge 4405.

A keyboard 4408 and a pointing device 4409 such as a mouse are devices operated by an operator. A display 4410 includes a liquid crystal display device, a CRT (Cathode Ray Tube) and the like, and displays various information as text or image information. Further, a touch screen or the like having both functions of the pointing device 4409 and the display 4410 may be provided. In that case, in order to realize the keyboard function, a keyboard (so-called software keyboard, screen keyboard or the like) may be drawn by software on a screen (touch screen) without being physically connected, unlike the keyboard 4408.

An HDD (Hard Disk Drive) 4411 contains a hard disk (or a flash memory or the like) and drives the hard disk to record or reproduce programs and information to be executed by the CPU 4401. The hard disk stores print data, the print instruction table 2600, the borderless printing log table 3900, the per-user allowable number table 4000 and the like. Furthermore, the hard disk stores various other data, various computer programs, etc.

A drive 4412 reads data or programs recorded on a removable recording medium 4413 such as a magnetic disk, an optical disc, a magneto-optical disc, a semiconductor memory or the like mounted thereon, and supplies the data or programs to the RAM 4403 connected via the interface 4407, the external bus 4406, the bridge 4405 and the host bus 4404. The removable recording medium 4413 can also be used as a data recording area.

A connection port 4414 is a port for connecting an external connection device 4415 and has a connector such as USB, IEEE 1394 or the like. The connection port 4414 is connected to the CPU 4401 and the like via the interface 4407, the external bus 4406, the bridge 4405, the host bus 4404 and the like. A communication unit 4416 is connected to a communication line and executes a data communication process with the outside. A data reading unit 4417 is, for example, a scanner, and executes a document reading process. A data output unit 4418 is, for example, a printer, and executes a document data output process.

The hardware configuration of the information processing device 100, the image forming device 200 and the image forming instruction device 1900 illustrated in FIG. 44 is just illustrative. The exemplary embodiments are not limited to the configuration illustrated in FIG. 44 but may have any configuration as long as the modules described in the exemplary embodiments can be executed. For example, some modules may be configured with dedicated hardware (e.g., ASIC (Application Specific Integrated Circuit, etc.), and some modules may be in an external system and connected via a communication line. Further, plural systems illustrated in FIG. 44 may be interconnected via a communication line to cooperate with each other. Further, they may be incorporated in a portable information communication device (including a mobile phone, a smart phone, a mobile device, a wearable computer, etc.), an information appliance, a robot, a copying machine, a facsimile, a scanner, a printer, a multifunction machine or the like in addition to the personal computer.

Although an image forming device for forming a color image using toner of four colors has been illustrated in the exemplary embodiment, it may be an image forming device for monochrome printing or an image forming device for forming a color image using toner of three or five or more colors.

In addition, although an example using plural photoconductor drums has been illustrated, it is also possible to form an image on one photoconductor drum.

The program described above may be stored in a recording medium or may be provided by a communication unit. In that case, for example, the program described above may be grasped as an invention of "a computer-readable recording medium storing a program."

The "computer-readable recording medium storing a program" refers to a computer-readable recording medium in which a program is recorded and which is used for installation, execution, distribution and so on of programs.

Examples of the recording medium may include a digital versatile disc (DVD) such as "DVD-R, DVD-RW, DVD-RAM, etc.," which are standards formulated by the DVD forum, "DVD+R, DVD+RW, etc.," which are standards formulated by DVD+RW, a compact disc (CD) such as CD-ROM, CD recordable (CD-R), CD rewritable (CD-RW)

and the like, a Blu-ray® disc, a magneto-optical disk (MO), a flexible disk (FD), a magnetic tape, a hard disk, a read only memory (ROM), an electrically erasable and rewritable read only memory (EEPROM®), a flash memory, a random access memory (RAM), a SD (Secure Digital) memory card, and the like.

The whole or part of the above-described program may be recorded in the recording medium for storage, distribution and the like. Further, the whole or part of the above-described program may be transmitted by communications using transmission media such as a wired network, a wireless communication network or a combination thereof used for a local area network (LAN), a metropolitan area network (MAN), a wide area network (WAN), the Internet, an intranet, an extranet and the like, or may be carried on a carrier wave.

Furthermore, the above-described program may be a part or the whole of another program, or may be recorded on a recording medium together with a separate program. Further, it may be divided and recorded in plural recording media. Further, it may be recorded in any manner as long as it can be compressed or coded in a restorable manner.

The exemplary embodiments may be used in combination with the following image forming devices.

(a) An image forming device including:

an image carrier that carries a toner image;

a transfer member disposed such that a circulatively-moving endless peripheral surface faces the image carrier, an electric field being formed between the image carrier and the transfer member, the electric field that transfers the toner image onto a recording medium passing between the image carrier and the transfer member;

a cleaning member disposed to contact the peripheral surface of the transfer member, the cleaning member that removes a toner adhering to the surface of the transfer member;

a cleaning bias applying unit that applies a cleaning bias voltage between the cleaning member and the transfer member;

a printing mode switching unit that selects and switches one of plural printing modes including a borderless printing mode in which the toner image is transferred onto the entire surface of the recording medium and a normal printing mode in which the toner image is transferred while leaving a margin on an outer peripheral portion of the recording medium; and a bias voltage controller that controls such that the cleaning bias voltage applied by the cleaning bias applying unit is set to a first bias voltage in the normal printing mode and is set to a second bias voltage in the borderless printing mode, the second bias voltage making a potential difference between the cleaning member and the transfer member larger than that when the first bias voltage is applied, wherein when the formation of the image in the borderless printing mode is continuously executed, plural borderless images are formed until a predetermined condition is met, and then the second bias voltage applied between the cleaning member and the transfer member is switched to the first bias voltage so that the peripheral surface of the transfer member is circulatively driven in a state where the first bias voltage is applied.

(b) The image forming device according to (a), wherein when the formation of the image in the borderless printing mode is continuously executed, the second bias voltage is switched to the first bias voltage so that the peripheral surface of the transfer member is circulatively driven in the state where the first bias voltage is applied, and then the first bias voltage is switched to the second bias voltage so that the formation of the image in the borderless printing mode is resumed.

The above configuration achieves the following effects.

In the image forming device of item (a), as compared with a device not equipped with this configuration, even when the formation of the image in the borderless printing mode is continuously executed, it is possible to prevent the rear surface of the recording medium onto which the toner image is transferred from being contaminated by toner.

In the image forming device of item (b), as compared with a device not equipped with this configuration, even when the formation of the image in the borderless printing mode is continuously executed, it is possible to prevent the rear surface of the recording medium onto which the toner image is transferred from being contaminated by toner.

Further, the above-described exemplary embodiment may be grasped as follows. [A1] An image forming device in which a fixing device or a transfer device is replaceable, the image forming device including a warning unit that issues a warning when a borderless printing function is used and when the fixing device or the transfer device is not for borderless printing.

[A2] The image forming device according to [A1], wherein the use of the borderless printing function is restricted when the warning is issued.

[A3] The image forming device according to [A2], wherein the restriction on the use of the borderless printing function is a restriction on the number of times of use or a restriction on a user.

[A4] An image forming device including an image forming processing unit that, when a fixing unit for borderless printing or a transfer unit for borderless printing is not attached and when a designation of a borderless printing function is received, performs another image forming process different from that in a case where the fixing device for borderless printing and the transfer device for borderless printing are attached.

[A5] The image forming device according to [A4], wherein the other image forming process lowers a density of an image of a peripheral portion which is an edge.

[A6] The image forming device according to [A4], wherein the other image forming process executes cleaning of the transfer device or the fixing device more frequently than in the case where the fixing device for borderless printing and the transfer device for borderless printing are mounted.

[A7] The image forming device according to any one of [A1] to [A6], further including a checking unit that checks whether or not software capable of using the borderless printing is introduced, when a fixing device for borderless printing and a transfer device for borderless printing are attached.

[A8] The image forming device according to [A7], further including an introduction unit that, when the software capable of using the borderless printing is not introduced, introduces the software via a communication line.

[A9] A non-transitory computer readable medium storing a program that causes a computer in an image forming device in which a fixing device or a transfer device is replaceable to perform an image forming process, the process including issuing a warning when a borderless printing function is used and when the fixing device or the transfer device is not for borderless printing.

[A10] A non-transitory computer readable medium storing a program that causes a computer to perform an image forming process, the process including when a fixing unit for borderless printing or a transfer unit for borderless printing is not attached and when a designation of a borderless printing function is received, performing another image forming process different from that in a case where the fixing device for borderless printing and the transfer device for borderless printing are attached.

The above-described aspects have the following effects.

With the image forming device of [A1], when the transfer device and the fixing device suitable which are for borderless printing are not attached, it is possible to notify the fact to a user.

With the image forming device of [A2], in a case where the fixing device is not for borderless printing or the transfer device is not for borderless printing, the use of the borderless printing function can be restricted.

With the image forming device of [A3], the use of borderless printing can be restricted according to the number of times of use or a user.

With the image forming device of [A4], it is possible to prevent deterioration in image quality, failure, etc. due to the borderless printing.

With the image forming device of [A5], it is possible to reduce the load of cleaning.

With the image forming device of [A6], it is possible to reduce a cleaning leakage due to the borderless printing.

With the image forming device of [A7], it is possible to prevent software capable of using the borderless printing from not being introduced even though the fixing device for borderless printing and the transfer device for borderless printing are attached.

With the image forming device of [A8], when the fixing device for borderless printing and the transfer device for borderless printing are attached, it is possible to introduce software capable of using the borderless printing.

With the information processing program of [A9], when a transfer device and a fixing device which are suitable for borderless printing are not attached, it is possible to notify the fact to a user.

With the non-transitory computer readable medium of [A10], it is possible to prevent deterioration in image quality, failure, etc. due to the borderless printing.

Further, the above-described exemplary embodiment may be grasped as follows. [B1] An image forming device in which a fixing device or a transfer device is replaceable, the image forming device including a warning unit that issues a warning when a borderless printing function is used and when the fixing device or the transfer device is not for borderless printing, wherein when the warning is issued, the number of times of use of the borderless printing function or a user is restricted.

[B2] An image forming device including an image forming processing unit that, when a fixing device for borderless printing or a transfer device for borderless printing is not attached thereto and when a designation of a borderless printing function is received, performs another image forming process different from that in a case where the fixing device for borderless printing and the transfer device for borderless printing are attached.

[B3] The image forming device according to [B2], wherein the other image forming process lowers the density of an image of a peripheral portion which is an edge.

[B4] The image forming device according to [B2], wherein the other image forming process executes cleaning of the transfer device or the fixing device more frequently than in the case where the fixing device for borderless printing and the transfer device for borderless printing are mounted.

[B5] The image forming device according to any one of [B1] to [B4], further including a checking unit that checks whether or not software capable of using borderless printing is introduced, when the fixing device for borderless printing and the transfer device for borderless printing are attached.

[B6] The image forming device according to [B5], further including an introduction unit that, when the software capable of using the borderless printing is not introduced, introduces the software via a communication line.

[B7] A non-transitory computer readable medium storing a program that causes a computer in an image forming device to perform an image forming process, the process including issuing a warning when a borderless printing function is used and when the fixing device or the transfer device is not for borderless printing, wherein when the warning is issued, the number of times of use of the borderless printing function or a user is restricted.

[B8] A non-transitory computer readable medium storing a program that causes a computer in an image forming device to perform an image forming process, the process including when a fixing device for borderless printing or a transfer device for borderless printing is not attached and when a designation of a borderless printing function is received, performing another image forming process different from that in a case where the fixing device for borderless printing and the transfer device for borderless printing are attached.

The above-described aspects have the following effects.

With the image forming device of [B1], when a transfer device and a fixing device which are suitable for borderless printing are not attached, it is possible to notify the fact to a user. In addition, the use of the borderless printing can be restricted according to the number of times of use or a user.

With the image forming device of [B2], it is possible to prevent deterioration in image quality, failure, etc. due to the borderless printing.

With the image forming device of [B3], it is possible to reduce the load of cleaning.

With the image forming device of [B4], it is possible to reduce a cleaning leakage due to the borderless printing.

With the image forming device of [B5], it is possible to prevent software capable of using the borderless printing from not being introduced even though a fixing device for borderless printing and a transfer device for borderless printing are attached.

With the image forming device of [B6], when a fixing device for borderless printing and a transfer device for borderless printing are attached, it is possible to introduce software capable of using borderless printing.

With the non-transitory computer readable medium of [B7], when a transfer device and a fixing device which are suitable for borderless printing are not attached, it is possible to notify the fact to a user. In addition, the use of the borderless printing can be restricted according to the number of times of use or a user.

With the non-transitory computer readable medium of [B8], it is possible to prevent a deterioration in image quality, failure, etc. due to borderless printing.

Further, the above-described exemplary embodiment may be grasped as follows.

[C1] An image forming instruction device including:
a selector that selects either a setting for borderless printing or a setting for non-borderless printing based on print data.

[C2] The image forming instruction device according to [C1], wherein the selector selects either the setting for borderless printing or the setting for non-borderless printing based on an image on an outer edge of the print data.

[C3] The image forming instruction device according to [C2], wherein the selector selects the setting for borderless printing when there is an image on the outer edge of the print data.

[C4] The image forming instruction device according to [C2], wherein the selector selects the setting for non-borderless printing when there is no image on the outer edge of the print data.

[C5] The image forming instruction device according to [C1], wherein the selector selects the setting for borderless printing or the setting for non-borderless printing, for each edge of the print data.

[C6] The image forming instruction device according to [C5], further including
a generator that generates an image having a leading edge that is set to the setting for non-borderless printing when the setting for borderless printing and the setting for non-borderless printing are mixed in the print data.

[C7] The image forming instruction device according to [C6], wherein the generator generates the image having the leading edge that is set to the setting for non-borderless printing, by rotating the print data.

[C8] The image forming instruction device according to [C1], wherein the selector selects either the setting for borderless printing or the setting for non-borderless printing based on a generating process of the print data.

[C9] The image forming instruction device according to [C8], wherein the selector selects the setting for borderless printing when the print data is an image generated by taking a screenshot.

[C10] The image forming instruction device according to [C1], further including:
a presentation unit that presents a selection result obtained by the selector.

[C11] The image forming instruction device according to [C10], wherein the presentation unit presents the selection result so as to be changeable by an operator.

[C12] A non-transitory computer readable medium storing a program that causes a computer to execute an image forming instruction process, the image forming instruction process including:
selecting either a setting for borderless printing or a setting for non-borderless printing based on print data.

The above-described aspects have the following effects.

With the image forming instruction device of [C1], when a print instruction is issued to an image forming device capable of performing borderless printing, it is possible to reduce the complexity of operation related to the setting for borderless printing.

With the image forming instruction device of [C2], it is possible to select one of the setting for borderless printing and the setting for non-borderless printing by using the image on the outer edge of the print data.

With the image forming instruction device of [C3], when there is an image on the outer edge of the print data, it is possible to select the setting for borderless printing.

With the image forming instruction device of [C4], when there is no image on the outer edge of the print data, it is possible to select the setting for non-borderless printing.

With the image forming instruction device of [C5], it is possible to select the setting for borderless printing or the setting for non-borderless printing for each edge of the print data.

With the image forming instruction device of [C6], it is possible to generate an image having a leading edge that is set to the setting for non-borderless printing when the setting for borderless printing and the setting for non-borderless printing are mixed in the print data.

With the image forming instruction device of [C7], it is possible to generate an image having the leading edge that is set to the setting for non-borderless printing, by rotating the print data.

With the image forming instruction device of [C8], it is possible to select one of the setting for borderless printing and the setting for non-borderless printing based on a process of generating the print data.

With the image forming instruction device of [C9], it is possible to select the setting for borderless printing when the print data is an image generated by a screenshot.

With the image forming instruction device of [C10], it is possible to present the selection result.

With the image forming instruction device of [C11], it is possible to present the selection result so that the selection result can be changed by an operator.

With the image forming instruction program of [C12], when a print instruction is issued to an image forming device capable of borderless printing, it is possible to reduce the complexity of operation related to the setting for borderless printing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a display that displays an image;
an operation receiver that determines an area which is a print target from the image displayed by the display; and
a transmitter that transmits a print instruction to a printable printing device when a print instruction operation targeting the area is performed,
wherein the print target is enlarged to be larger than the display, and the print target being enlarged is printed,
wherein the transmitter transmits the print instruction to the printable printing device without a printing device selection operation by an operator when the instruction operation is performed, and
wherein when an area is consecutively determined by the operation receiver after the print instruction is transmitted, the transmitter transmits a print instruction to the printable printing device without the print instruction operation by the operator.

2. The information processing device according to claim 1, wherein when a setting of a printing device in the printing has already been performed, the transmitter transmits the print instruction to a printing device to which the setting is applicable.

3. The information processing device according to claim 1, wherein when there are a plurality of the printable printing devices, the display selectably displays the printing devices.

4. The information processing device according to claim 3, wherein the display selectably displays the printing devices on a map.

5. The information processing device according to claim 4, wherein according to operator's selection of a printing device, the display displays a function or operation information of the printing device.

6. The information processing device according to claim 3, wherein the display ranks and displays the printing devices in accordance with a predetermined rule.

7. The information processing device according to claim 6, wherein the rule includes one or more of:
   (1) to increase a priority of a printing device to which the information processing device is directed,
   (2) to increase the priority of the printing device having a good connection condition with the information processing device,
   (3) to increase the priority of the printing device having a short distance to the information processing device, and
   (4) to increase the priority of the printing device whose print end of a print target is earlier.

8. The information processing device according to claim 6, wherein the display uses the rule stored in a relay device that relays the information processing device and the printing devices.

9. The information processing device according to claim 1, further comprising:
   a display that issues a warning when there is no printable printing device.

10. An information processing method comprising:
   displaying an image;
   determining an area which is a print target from the displayed image; and
   transmitting a print instruction to a printable printing device when a print instruction operation targeting the area is performed,
   wherein the print target is enlarged to be larger than the display, and the print target being enlarged is printed,
   wherein the print instruction is transmitted to the printable printing device without a printing device selection operation by an operator when the instruction operation is performed, and
   wherein when an area is consecutively determined after the print instruction is transmitted, a print instruction is transmitted to the printable printing device without the print instruction operation by the operator.

11. A non-transitory computer readable medium storing a program causing a computer to execute information processing, the information processing comprising:
   displaying an image;
   determining an area which is a print target from the displayed image; and
   transmitting a print instruction to a printable printing device when a print instruction operation targeting the area is performed,
   wherein the print target is enlarged to be larger than the display, and the print target being enlarged is printed,
   wherein the print instruction is transmitted to the printable printing device without a printing device selection operation by an operator when the instruction operation is performed, and
   wherein when an area is consecutively determined after the print instruction is transmitted, a print instruction is transmitted to the printable printing device without the print instruction operation by the operator.

* * * * *